United States Patent
Takayama et al.

(10) Patent No.: US 7,998,238 B2
(45) Date of Patent: Aug. 16, 2011

(54) SINTERED SLIDING MEMBER AND CONNECTING DEVICE

(75) Inventors: Takemori Takayama, Hirakata (JP); Tetsuo Ohnishi, Hirakata (JP); Kazuo Okamura, Hirakata (JP)

(73) Assignee: Komatsu Ltd., Tokyo (JP)

( * ) Notice: Subject to any disclaimer, the term of this patent is extended or adjusted under 35 U.S.C. 154(b) by 1008 days.

(21) Appl. No.: 10/563,437

(22) PCT Filed: Jul. 30, 2004

(86) PCT No.: PCT/JP2004/010920
§ 371 (c)(1), (2), (4) Date: Jan. 5, 2006

(87) PCT Pub. No.: WO2005/012585
PCT Pub. Date: Feb. 10, 2005

(65) Prior Publication Data
US 2006/0159376 A1 Jul. 20, 2006

(30) Foreign Application Priority Data
Jul. 31, 2003 (JP) ................................. 2003-284171

(51) Int. Cl.
*C22C 30/00* (2006.01)

(52) U.S. Cl. ............... 75/246; 75/239; 75/240; 75/241; 277/541; 277/653; 428/547; 428/570; 428/618; 428/681; 428/682; 428/683; 428/684; 428/685; 148/325; 148/326; 148/906; 384/912; 384/913; 384/902

(58) Field of Classification Search ............ 75/239–241, 75/246; 277/541, 653; 428/570, 547, 613, 428/681–685; 384/912, 913, 902; 148/325, 148/326, 906
See application file for complete search history.

(56) References Cited

U.S. PATENT DOCUMENTS

| | | | | |
|---|---|---|---|---|
| 3,424,503 A | * | 1/1969 | Schulz | 384/222 |
| 5,328,772 A | * | 7/1994 | Tanaka et al. | 428/548 |
| 5,675,201 A | * | 10/1997 | Komura et al. | 310/90.5 |
| 5,936,169 A | * | 8/1999 | Pinnow et al. | 75/246 |
| 7,297,177 B2 | * | 11/2007 | Sandberg et al. | 75/246 |

FOREIGN PATENT DOCUMENTS

| | | | |
|---|---|---|---|
| JP | 58-157951 | | 9/1983 |
| JP | 360050151 | * | 3/1985 |
| JP | 363262402 | * | 10/1988 |
| JP | 02-138442 | * | 5/1990 |
| JP | 08-109450 | * | 4/1996 |

(Continued)

OTHER PUBLICATIONS

Human—English translation of Japanese patent 02-138442, Sakai et al., May 28, 1990.*
Machine-English translation of Japanese patent 08-109450, Yanase Takeshi et al, Apr. 30, 1996.*

(Continued)

*Primary Examiner* — Deborah Yee
(74) *Attorney, Agent, or Firm* — Wenderoth, Lind & Ponack, L.L.P.

(57) ABSTRACT

A sintered sliding member comprises a back metal (21a) and a ferrous sintered sliding body (20) which is sintering-bonded to the back metal (21a). The ferrous sintered sliding body (20) has martensite phase having a solid soluble carbon concentration of 0.15 to 0.5 wt % and contains carbide in a content of 5 to 50% by volume. The sintered sliding member is excellent in abrasion resistance, seizing resistance and heat crack resistance.

3 Claims, 25 Drawing Sheets

FOREIGN PATENT DOCUMENTS

| | | | |
|---|---|---|---|
| JP | 2001-152252 | | 6/2001 |
| JP | 2002-257144 | | 9/2002 |
| JP | 2004-211132 | | 7/2004 |
| WO | 02/070769 | * | 9/2002 |

OTHER PUBLICATIONS

"J. Japan Inst. Metals", 2 (1963), p .564, Fig. 3, *Carbon Concentration in Matrix Changed Accompanied with a Solid Solution of Carbide*.

* cited by examiner

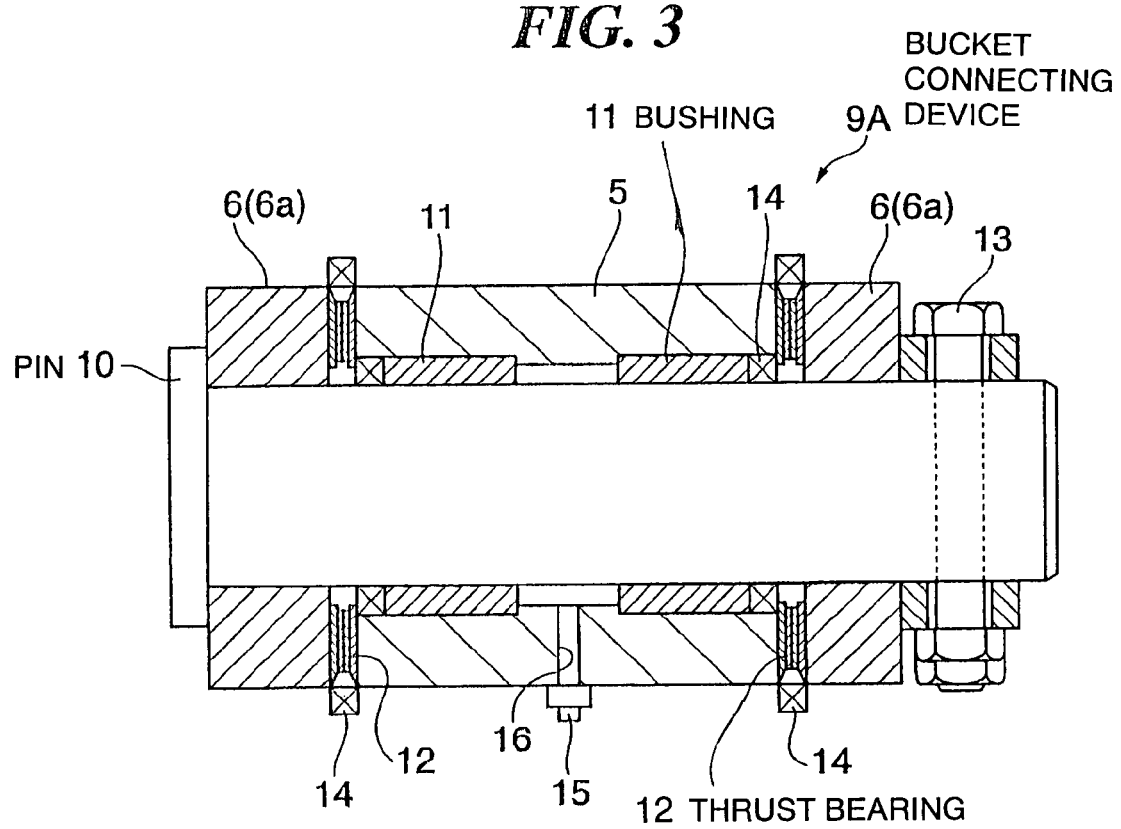

SPECIMEN

[ OSCILLATING ANGLE 120° ]
[ OSCILLATING SPEED 2m/min ]

No.28 3C 15Cr3Mo-2.5SiO

No.25 3C 15Cr3Mo-10Cu10Sn

AREA (A)
M6C-TYPE CARBIDE

| Element | wt% |
|---------|-------|
| W | 36.28 |
| Mo | 26.71 |
| Cr | 2.50 |
| V | 2.55 |
| Si | 0.60 |
| P | 0.40 |

CARBON: 2wt%

AREA (B)
MC-TYPE CARBIDE

| Element | wt% |
|---------|-------|
| W | 14.36 |
| Mo | 5.02 |
| Cr | 14.71 |
| V | 46.08 |
| Si | 0.01 |
| P | 0.01 |

CARBON: 14wt% ic # SINTERED SLIDING MEMBER AND CONNECTING DEVICE

FIELD OF THE INVENTION

The present invention relates to a double-layered sintered sliding member used for a connecting device, such as a thrust bearing, of a construction machine. More particularly, the present invention relates to a sintered sliding member, such as a sintered thrust bearing and a floating seal, which is formed with a ferrous sintered sliding material excellent in abrasion resistance, seizing resistance and heat crack resistance, at sliding surfaces thereof, in which the ferrous sintered sliding material is combined to a back metal, and a connecting device using the sintered thrust bearing.

BACKGROUND OF THE INVENTION

Conventionally, a connecting device of a construction machine is equipped with a thrust bearing to slide under a large thrust load. For such a thrust bearing, a thrust bearing made of a carburized steel or an induction hardened steel has been used in order to obtain sufficient seizing resistance and abrasion resistance for withstanding a high-bearing stress and low-speed sliding condition and a grease lubricating condition. And, recently, in view of the demand for easy maintenance, in order to extend a lubricating interval of a thrust bearing, a thrust bearing, in which a steel is coated with a superhard thermal spray material excellent in seizing resistance and abrasion resistance comprising WC and self-fluxing alloy, is sometimes put in practical use for such a thrust bearing equipped for a connecting device of a construction machine.

On the contrary, a track roller assembly of a construction machine is equipped with floating seals for the purpose of preventing leakage of a lubricating oil from inside thereof, as well as preventing sand or gravel from entering therein. Thus, in many cases, such a floating seal is made of a hard high-strength high-carbon and high-Cr cast iron which has excellent corrosion resistance and improved seizing resistance and abrasion resistance by crystallizing hard $Cr_7C_3$-type carbide in a large content of 30% or more by volume.

SUMMARY OF INVENTION

In a case of a connecting device of a construction machine, a thrust bearing operates with sand or gravel being jammed therein. And, a connecting device equipped for a bucket of a hydraulic shovel operates under a large offset load. As a result, seizing and abrasion are likely to occur in such a connecting device and therefore it is necessary to be lubricated at frequent intervals before operating.

And, in a case of a thrust bearing in which a steel is coated with a superhard thermal spray material, the superhard thermal spray material layer easily breaks down because of its insufficient seizing resistance and its thin thickness. In addition, the resultant breakage pieces may further damage the layer.

In order to improve seizing resistance and abrasion resistance of a thrust bearing, a thrust bearing, of which surfaces are made such that S45C is induction hardened, is often used. Such a thrust bearing has improved heat crack resistance, but insufficient seizing resistance, causing fouling easily. Further, the thrust bearing has insufficient abrasion resistance. When various work steels such as a cold-work steel and a high speed steel (SKD, SKH) are used, heat crack resistance thereof is so insufficient that seizing easily occurs. In addition, since such work steels are so expensive that material costs would increase in view of material yields before a product is finished.

In a floating seal used for sealing a lubricating oil in a reduction gear and a tracker roller, seal sliding surfaces thereof are abraded, while being exposed to fine particles of sand or gravel by hulling motion in the sand or gravel, and are lubricated with the lubrication oil sealed therein. Accordingly, such a floating seal is required to operate under very severe lubrication conditions. In a case of a high hard floating seal made of a high-carbon and high-Cr cast iron, when setting pressure (press force) at assembling is high, considerable quenching crack (heat crack), seizing and abnormal abrasion occur on the seal sliding surfaces, resulting in leakage of oil. In addition, sand or gravel clogs around the floating seal, resulting in damaging the floating seal.

Furthermore, in recent years, a construction machine such as a bulldozer is required to be driven at a high speed for improvement in working efficiency, and therefore, the floating seal necessarily rotates at a high speed. This also causes quenching crack, seizing and abnormal abrasion. In order to prevent such problems, a floating seal made of a high-carbon and high-alloy cast iron, in which hard carbide is dispersed in a large content, has been studied. However, such floating seal has decreased flexural strength. Thus, a damage-proof floating seal has been required.

In addition, a track roller assembly having longer life operation is demanded for the purpose of cost reduction. But, conventionally-used cast irons for a floating seal do not have sufficient abrasion resistance.

In order to solve the above-mentioned problems, an object of the present invention is to provide a sintered sliding member, a connecting device and a floating seal excellent in abrasion resistance, seizing resistance and heat crack resistance.

In order to achieve the aforesaid object, a sintered sliding material according to the present invention comprises a back metal and a ferrous sintered sliding body which is combined to the back metal, wherein the ferrous sintered sliding body comprises martensite phase prepared to have a solid soluble carbon concentration of 0.15 to 0.5 wt % and contains carbide in a content of 5 to 50% by volume.

In the present invention, the ferrous sintered sliding body may be formed with at least one of closed pores or recesses in an area ratio of 1 to 10% at a sliding surface thereof. And, the ferrous sintered sliding material may contain one or more elements selected from the group consisting of Cr of 9 wt % or more, Mo of 3.5 wt % or more, Mo and W in a total amount of 4.5 wt % or more and V of 3 wt % or more so that the martensite phase may contain one or more carbides selected from the group consisting of $Cr_7C_3$-type carbide, $M_6C$-type carbide and MC-type carbide dispersed therein.

A sintered sliding member according to the present invention comprises a back metal and a ferrous sintered sliding body which is combined to the back metal, wherein the ferrous sintered sliding body contains carbon of 0.9 to 3.8 wt %, Cr of 9 to 35 wt %, and V of 0 to 3 wt %, in which a content of carbon satisfies the following equation: $0.143 \times Cr(wt\%) - 1.41 + 14 \times MC$-type carbide (volume fraction) $\leq$ Carbon(wt %) $\leq 0.156 \times Cr(wt\%) - 0.58 + 14 \times MC$-type carbide (volume fraction), and has martensite phase, in which the martensite phase, forming a solid solution with carbon of 0.2 to 0.45 wt % and Cr of 6.5 to 12 wt %, contains $Cr_7C_3$-type carbide in a content of 5 to 40% by volume and MC-type carbide in a content of 5% or less by volume dispersed therein with a total content of the carbides being 5 to 40% by volume, and wherein the ferrous sintered sliding body contains one or more elements selected from the group consisting of Si, Mn, Ni, P, S, B, N, Mo, W, Ti, Co, Cu and Al.

A sintered sliding member according to the present invention comprises a back metal and a ferrous sintered sliding body which is combined to the back metal, wherein the ferrous sintered sliding body contains carbon of 1.8 to 4.5 wt %, Cr of 12 to 30 wt %, V of 3.5 to 10 wt % and either one of Mo of 2 to 6.4 wt % or Mo and W in a total amount of 2 to 6.4 wt %, and has martensite phase, in which the martensite phase, forming a solid solution with carbon of 0.2 to 0.45 wt %, Cr of 6.5 to 12 wt % and further one or more elements selected from the group consisting of Mo of 1 to 3.5 wt %, Mo and W in a total amount of 1 to 3.5 wt %, and V of 0.4 to 0.6 wt %, contains $Cr_7C_3$-type carbide in a content of 10 to 35% by volume and MC-type carbide in a content of 5 to 15% by volume dispersed therein with a total content of the carbides being 15 to 40% by volume, and wherein the ferrous sintered sliding body contains one or more elements selected from the group consisting of Si, Mn, Ni, P, S, B, N, Mo, W, Co, Cu and Al.

A sintered sliding member according to the present invention comprises a back metal and a ferrous sintered sliding body which is combined to the back metal, wherein the ferrous sintered sliding body contains carbon of 0.6 to 1.9 wt %, Cr of 1 to 7 wt %, V of 0 to 3 wt %, Mo of 3.5 wt % or more and Mo+0.5×W of 4.5 to 30 wt %, in which 0.5×W represents half of a real amount of W, and has martensite phase, in which the martensite phase, having a solid soluble carbon concentration of 0.2 to 0.45 wt %, contains $M_6C$-type carbide in a content of 5% or more by volume and MC-type carbide in a content of 5 to 40% by volume dispersed therein, and wherein the ferrous sintered sliding body contains one or more elements selected from the group consisting of Si, Mn, Ni, P, S, B, N, Ti, Co, Cu and Al.

A sintered sliding member according to the present invention comprises a back metal and a ferrous sintered sliding body which is combined to the back metal, wherein the ferrous sintered sliding body contains carbon of 1.3 to 3 wt %, Cr of 1 to 5 wt %, V of 3 to 12 wt %, Mo of 10 wt % or more and Mo and W of 10 to 23 wt % and has martensite phase, in which the martensite phase, having a solid soluble carbon concentration of 0.2 to 0.45 wt %, contains $M_6C$-type carbide in a content of 15 to 35% by volume and MC-type carbide in a content of 5 to 15% by volume dispersed therein, and wherein the ferrous sintered sliding body contains one or more elements selected from the group consisting of Si, Mn, Ni, P, S, B, N, Ti, Co, Cu and Al.

A sintered sliding member according to the present invention comprises a back metal and a ferrous sintered sliding body which is combined to the back metal, wherein the ferrous sintered sliding body contains carbon of 0.8 to 3.4 wt %, Cr of 9 to 28 wt %, V of 0 to 5 wt %, Mo of 5 wt % or more and, Mo and W, of 5 to 18 wt % and has martensite phase, in which the martensite phase, having a solid soluble carbon concentration of 0.2 to 0.45 wt %, contains $Cr_7C_3$-type carbide in a content of 5 to 25% by volume, $M_6C$-type carbide in a content of 5 to 25% by volume and MC-type carbide in a content of 0 to 5% by volume dispersed therein with a total content of the carbides being 10 to 40% by volume, and wherein the ferrous sintered sliding body contains one or more elements selected from the group consisting of Si, Mn, Ni, P, S, B, N, Ti, Co, Cu and Al.

A sintered sliding member according to the present invention comprises a back metal and a ferrous sintered sliding body which is combined to the back metal, wherein the ferrous sintered sliding body contains carbon of 1.5 to 3.2 wt %, Cr of 7 to 25 wt %, Mo of 3.5 wt % or more, Mo and W of 5 to 15 wt % and also at least either one of V or Ti in a total amount of 3 to 8 wt % and has martensite phase, in which the martensite phase, having a solid soluble carbon concentration of 0.2 to 0.45 wt %, contains $Cr_7C_3$-type carbide in a content of 5 to 20% by volume, $M_6C$-type carbide in a content of 5 to 20% by volume, and MC-type carbide in a content of 5 to 15% by volume dispersed therein with a total content of the carbides being 15 to 50% by volume, and wherein the ferrous sintered sliding body contains one or more elements selected from the group consisting of Si, Mn, Ni, P, S, B, N, V, Ti, Co, Cu and Al.

In the present invention, the sintered sliding member is a thrust bearing, wherein the ferrous sintered sliding body contains $Cr_7C_3$-type carbide, $M_6C$-type carbide and MC-type carbide dispersed therein with a total content thereof being 5 to 25% by volume and the back metal has a hardness of Hv170 or more. And, sliding surfaces of the thrust bearing may be formed with at least either one of closed pores or recesses in an area ratio of 1 to 10%.

In the present invention, the sintered sliding member is a floating seal, wherein the ferrous sintered sliding body contains $Cr_7C_3$-type carbide, $M_6C$-type carbide and MC-type carbide dispersed therein with a total content thereof being 20 to 40% by volume. And, the back metal may have a hardness of Hv170 or more. In addition, sliding surfaces of the floating seal may be formed with at least either one of closed pores or recesses in an area ratio of 1 to 10%.

A connecting device according to the present invention comprises a bearing made of a sintered sliding member having a back metal and a ferrous sintered sliding body which is combined to the back metal, in which the ferrous sintered sliding body has martensite phase having a solid soluble carbon concentration of 0.15 to 0.5 wt % and contains carbide in a content of 5 to 25% by volume, and another bearing to slide with respect to the bearing.

EFFECT OF THE INVENTION

According to the present invention, a sintered sliding member and a connecting device, which are excellent in abrasion resistance, seizing resistance and heat crack resistance, can be provided.

BRIEF DESCRIPTION OF THE DRAWINGS

FIG. 3 is a cross sectional view schematically showing a structure of the bucket-connecting device according to the first embodiment of the present invention.

DETAILED DESCRIPTION OF THE INVENTION

First Embodiment

Figure 2A:
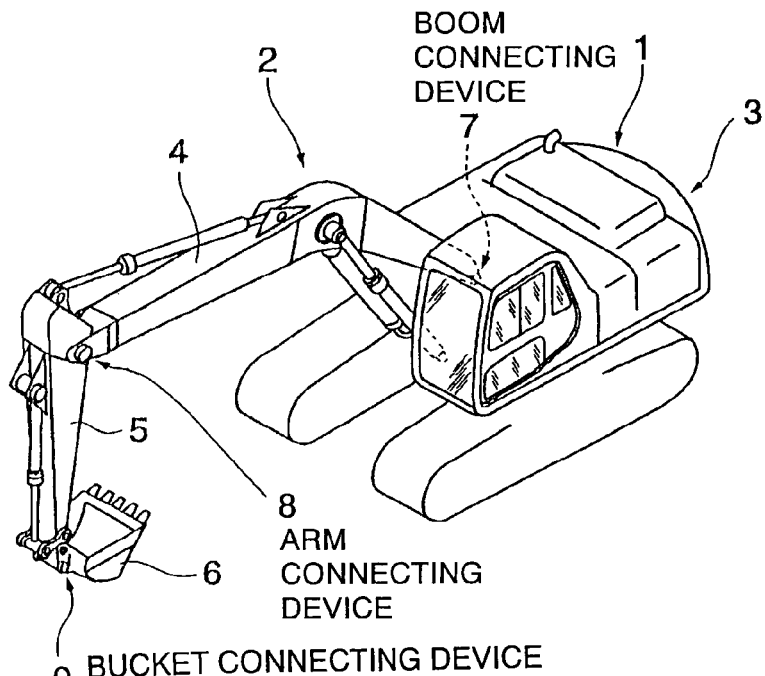
FIG. 2A is a perspective view showing a hydraulic shovel according to a first embodiment of the present invention.
Figure 2B:
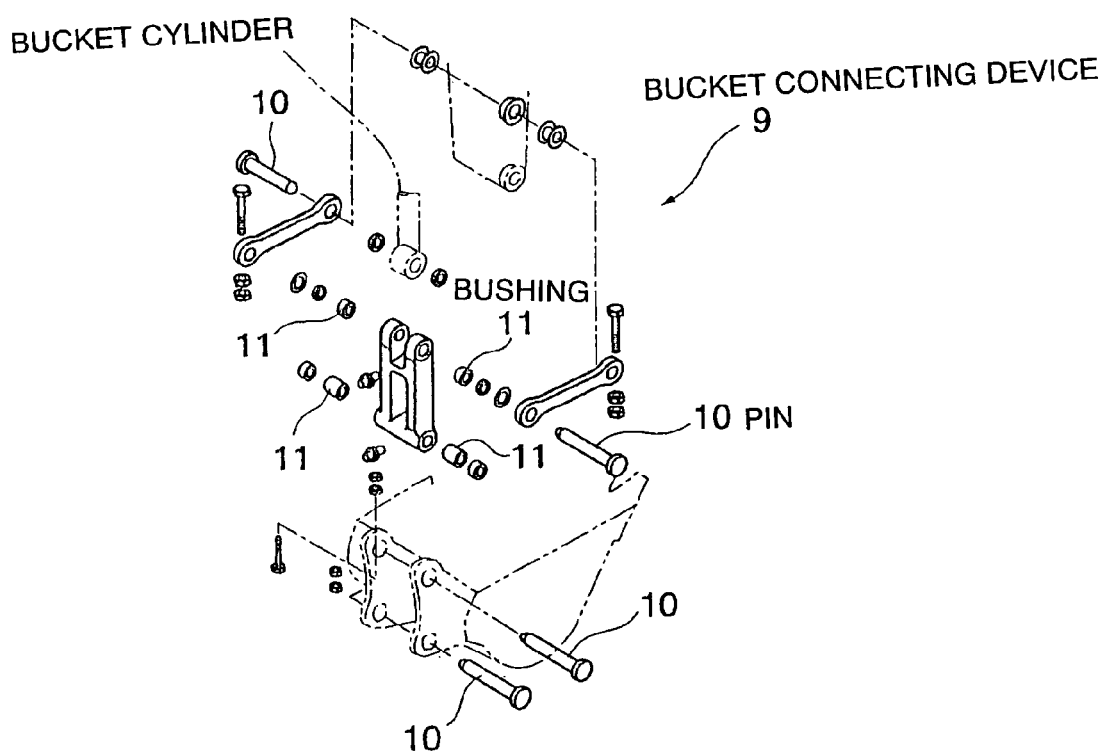
FIG. 2B is an exploded perspective view showing a bucket-connecting device of the hydraulic shovel.
Figure 4A:
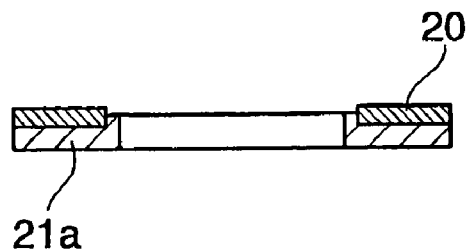
FIGS. 4A to 4C show a structure of a thrust bearing.
Figure 4B:
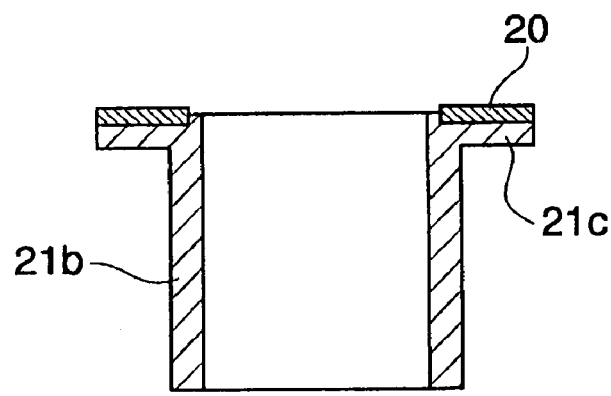
Figure 4C:
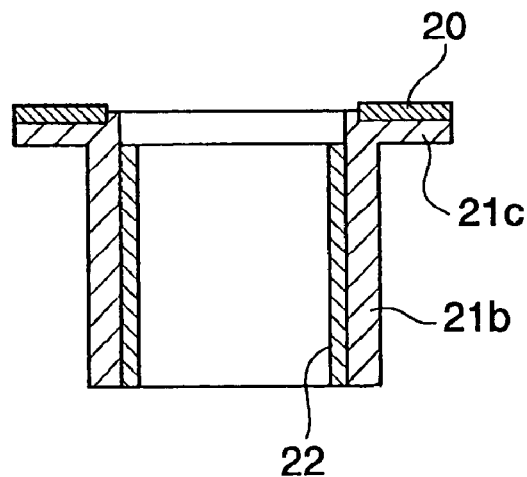

FIG. 2A is a perspective view showing a hydraulic shovel according to the first embodiment of the present invention and FIG. 2B is an exploded perspective view showing a bucket-connecting device of the hydraulic shovel. FIG. 3 is a cross sectional view schematically showing a structure of the bucket connecting device according to the first embodiment of the present invention. FIGS. 4A to 4C show a structure of a thrust bearing.

As shown in FIG. 2A, an operating portion 2 of a hydraulic shovel 1, according to this embodiment, is provided with an upper turning body 3 to which a boom 4 is connected by a boom-connecting device 7. The boom 4 is connected to an arm 5 by an arm-connecting device 8, and the arm 5 is connected to a bucket 6 by a bucket-connecting device 9. The connecting devices 7, 8 and 9 have the same principal structure. For example, the bucket-connecting device 9, as shown in FIG. 2B, is provided with connecting pins 10 and bushings 11. Hereinafter, the bucket connecting device 9A arranged at a connecting portion of the arm 5 and the bucket 6 will be described in detail with reference to FIG. 3.

As shown in FIG. 3, the bucket connecting device 9A is provided with two thrust bearings 12 which connect a bucket (one component) 6 to an arm (the other component) 5 in a rotatable manner and receive a thrust load applied between the bucket 6 and the arm 5. The arm 5 is arranged via a connecting pin (a support shaft) 10 supported by brackets 6a formed on the buckets 6 and bushings (bearing bushings) 11 fitted onto the connecting pins 10. The bushings 11 are forced into a distal end of the arm 5. The connecting pin 10 is fixedly mounted to the bracket 6a by a bolt 13. A seal member 14 and a lubricating oil supply port 15, a lubricating oil supply passage 16 are shown in the figure.

The thrust bearing 12 rotatably oscillates while being applied with a thrust load on sliding surfaces thereof (an upper surface in the figure) as shown in FIGS. 4A, 4B and 4C, and is constructed such that a hard ferrous sintered sliding body 20, excellent in abrasion resistance, seizing resistance and heat crack resistance, is sintering-bonded to each of back metals 21a and 21b. That is, a connecting device (connecting devices 7, 8 and 9) is provided with a bearing, comprising a back metal and a ferrous sintered sliding body which is combined to the back metal, and another bearing to slide with respect to the former bearing. And, the back metal is preferably made of steel.

The ferrous sintered sliding body 20 is made of a ferrous sintered sliding material in which martensite phase prepared to have a solid soluble carbon concentration of 0.15 to 0.5 wt % contains carbide, effective for improvement in abrasion resistance and seizing resistance, dispersed therein in a content of 5 to 50% by volume. In order to have a solid soluble carbon concentration within the aforesaid range easily and contain a harder carbide excellent in seizing resistance, the ferrous sintered sliding body 20 preferably contains one or more elements selected from Cr of 9 wt % or more, Mo of 3.5 wt % or more, Mo and W in a total amount of 4.5 wt % or more and V of 3 wt % or more, and the martensite phase preferably contains one or more carbides of $Cr_7C_3$-type carbide, $M_6C$-type carbide and MC-type carbide dispersed therein. In such a case, a total content of the carbides is preferably set to 5 to 50% by volume (volume fraction; 0.05 to 0.5).

FIG. 4A shows an example of a thrust bearing made such that a hollow disk-shaped ferrous sintered sliding body 20 is combined to a hollow disk-shaped back metal 21a. When the thrust bearing is supported in a bucket connecting device, as shown in FIG. 4B, a cylindrical back metal 21b is formed with a collar 21c, which slides under a thrust load, at one end surface thereof. And, the ferrous sintered sliding body 20 0.5 mm or more thick is sintering-bonded to a sliding surface of the collar 21c. The thrust bearing may have a flat-plate shaped structure or a doughnut-shaped structure. However, in which case, the thrust bearing is necessarily formed with a supporting structure for supporting itself separately. So, the thrust bearing is preferably made such that a cylindrical back metal is formed with a collar, which slides under a thrust load, at one end surface thereof and the ferrous sintered sliding body is sintering-bonded and combined to a sliding surface of the collar.

And, as shown in FIG. 4C, a thrust bearing in which a bushing 22 is sintering-bonded and combined to an inner surface of the cylindrical back metal 21b may be used. Alternatively, a thrust bearing in which a cylindrical Cu alloy based porous sintered sliding material or a cylindrical Fe alloy based porous sintered sliding material is sintering-bonded and combined to an inner surface or an outer surface of the cylindrical back metal may be also used. The bushing 22 is made of a Fe alloy based or a Cu alloy based porous sintered compact in which a lubricating oil material, in other words, a lubricating oil or a lubricating compound of a lubricating oil and a wax, having a dropping point under 60° C., is filled in the pores (air holes) thereof. This makes it possible to increase a pressure with which the thrust bearing is forced into the end of the arm, resulting in preventing the bushing from slipping out because a thrust load is applied to the collar 21C.

In exchange for the bushing made of the Fe alloy based or the Cu alloy based porous sintered compact, the following bushing may be usable. For example, a ferrous sintered sliding material, having substantially the same abrasion resistance, seizing resistance and heat crack resistance as the hard ferrous sintered sliding body 20, is formed with oil pockets or lubricating grooves at sliding surfaces thereof. Such a bushing can achieve sufficient abrasion resistance even under an operating condition in which friction resistance is high at a high bearing stress and a slow sliding speed condition.

In a thrust bearing in which a back metal thereof is coated with a superhard thermal spraying film, when the back metal has a hardness of about Hv400 or less, the film is easy to break by sand or gravel jammed therein. So, it is necessary to form the film more thick, resulting in economical disadvantage. On the contrary, when the back metal is made by a hard material, a thermal spraying film can be thinned as 0.5 mm or less. However, bonding strength of the film to the back metal weakens, whereby the film is easy to break or peel due to sand or gravel jammed therein and a large offset load. Accordingly, in the present invention, a thickness of a ferrous sintered sliding body is set to 0.5 mm or more, more preferably 1 mm or more in order to prevent a ferrous sintered sliding body sintering-bonded to a soft back metal having hardness of Hv170 (yield strength of 20 kgf/mm2) from breaking or peeling by sand or gravel jammed therein. And, a ferrous sintered sliding body preferably has flexural strength of at least 30 kgf/cm2 or more. And, even if the thrust bearing is used in a operating condition with severe abrasion, it is not preferred that the ferrous sintered sliding body has a thickness of 4 mm or more because breakage due to bending caused by a offset load would occur easily. In addition, economical efficiency decreases. And, bonding strength of a conventional sintering-bonded surface is higher than bonding strength of a thermal spraying film (5 to 10 kgf/cm2) and has almost the same strength as a share strength of a sintered material.

A thrust bearing with a collar, according to the present invention, is fixedly mounted to a construction machine in such a manner that a cylindrical portion thereof is forced into the construction machine. So, in order to force the cylindrical portion into the construction machine easily and prevent the cylindrical portion from slipping out therefrom after forcing, the back metal is preferably prepared to have a hardness of Hv170 or more, more preferably Hv220 or more. Particularly, in view of machinability at post-process, the back metal preferably has a hardness of Hv400 or less.

When the thrust bearing with a collar is forced into a construction machine body, it is difficult to adjust a clearance between the collar and the body to 0.2 mm or less. And, in view of bending amount of the body applied with an offset load, it is desired for the ferrous sintered sliding body not to break by bending amount of about 0.4 mm.

Figure 5A:
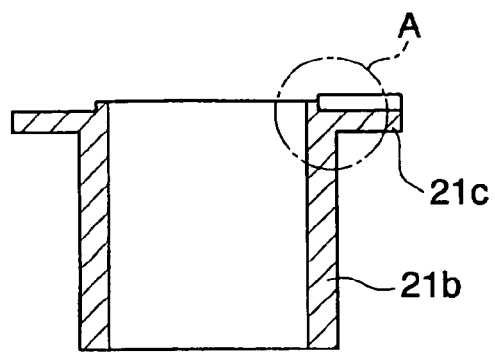
FIG. 5A is a cross-sectional view showing an example of a thrust bearing in which a ferrous back metal shown in FIG. 4C is formed with a venthole and a groove.
Figure 5B:
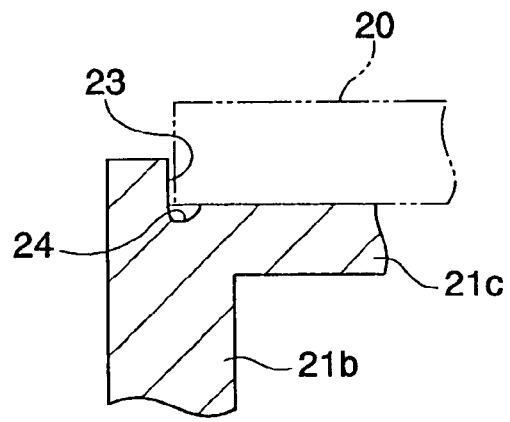
FIG. 5B is a cross-sectional enlarged view showing a A part of FIG. 5a and FIG. 5C is a plane view of the thrust bearing of FIG. 5A.
Figure 5C:
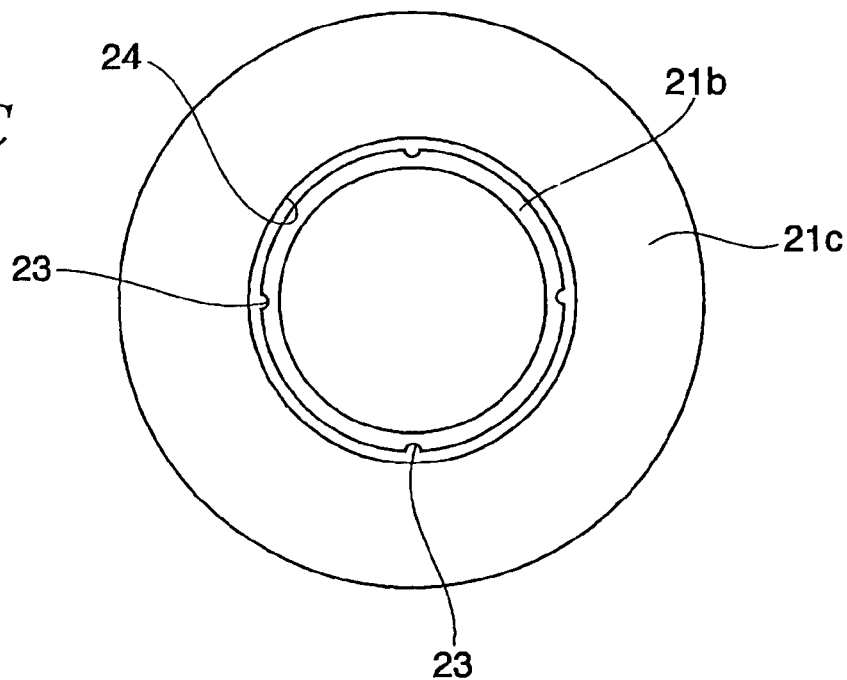

FIG. 5A is a cross-sectional view showing an example of a thrust bearing in which a ferrous back metal shown in FIG. 4C is formed with a venthole and a groove, FIG. 5B is a cross-sectional enlarged view showing a A part of FIG. 5a and FIG. 5C is a plane view of the thrust bearing of FIG. 5A.

In this embodiment, as shown in FIG. 5B, a bonded surface of a ferrous back metal 21b to a ferrous sintered sliding body 20 is formed with ventholes 23 and a groove 24. The ferrous sintered sliding body 20 preferably has a structure in which martensite phase, prepared to have a solid soluble carbon concentration of 0.2 to 0.45 wt %, contains carbide in a content of 5 to 25% by volume. When a ferrous sintered sliding body is sintering-bonded to a ferrous back metal, a great deal of gas is usually generated and therefore accumulated gas may cause defect in bonding of the ferrous sintered sliding body and the ferrous back metal. However, in this embodiment, the ventholes 23 enables the generated gas to be discharged therethrough and the groove 24 enables formation of liquid phase on the ferrous sintered sliding body at sintering-bonding. Accordingly, the ferrous sintered sliding body 20 can be sintered so as to have a high density and also bonded to the ferrous back metal with high bonding strength. It is not necessary to form both the ventholes 23 and the groove 24, like this embodiment, but either one of them may be formed.

In this embodiment, the ventholes and the groove are formed at a bonded surface of the ferrous back metal to which the ferrous sintered sliding body is bonded. However, when a ferrous sintered sliding body is formed with closed pores or grooves at a sliding surface thereof in an area ratio of 1 to 10%, it is not necessary to form the ventholes and recesses on the bonded surface of the ferrous back metal owing to its excellent characteristics for discharging the gas generated at sintering-bonding (outgassing characteristics).

The closed pores and the recesses can work as oil pockets (in which lubricant is retained) on a sliding surface of a ferrous sintered sliding body, causing improvement in heat crack resistance, in addition to the aforesaid effects.

A height of an ingate on which the ventholes are formed is preferably adjusted to be higher than a half thickness of the ferrous sintered sliding body 20 which is placed on the ferrous back metal 21c.

A counterpart sliding body, which slide with respect to the thrust bearing of FIG. 5, may be a steel thrust bearing to which a hardening heat treatment such as a carburized quenching and an induction quenching is subjected. The same is applicable to other embodiments and examples.

For a method for combining a back metal to a ferrous sintered sliding body, a ferrous sliding body sintered previously may be combined to a back metal by brazing. However, since such a method hardly ensure dimensional stability at a high-density process in the sintering, it is necessary to machine the sliding body before bonding, resulting in remarkable cost rise. Accordingly, this embodiment develops a sintered thrust bearing such that a ferrous sintered sliding body is formed into a doughnut-shaped compact (a doughnut-shaped plate) and then the compact is placed on a ferrous back metal so that at least a part of an inner surface and an under surface of the compact will be sintering-bonded to an outer surface of a cylindrical portion and an upper surface of a collar of a ferrous back metal. At the same time, in order to prevent occurrence of defects caused by gas generated from the sintered compact at sintering-bonding, ventholes (gas-vent holes) and grooves through which the gas is discharged are formed on a part of a bonded surface of at least either one of the outer surface or the upper surface of the ferrous back metal. At least either one of the ventholes or the groove may be formed on the bonded surface.

Figure 6A:
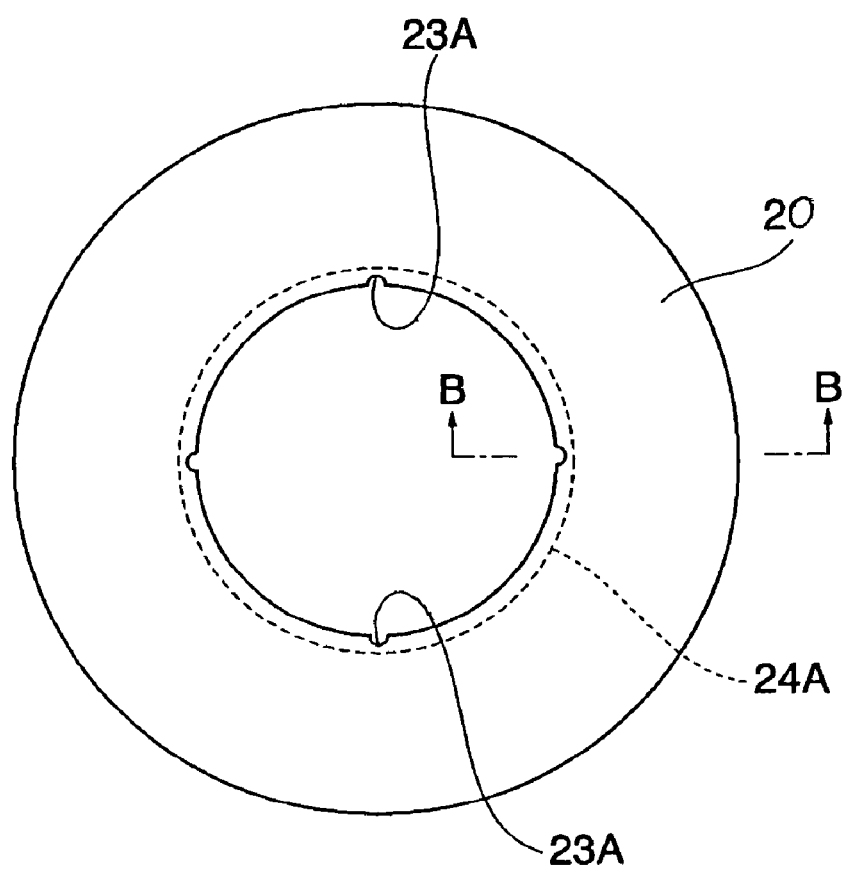
FIG. 6A is a plane view showing the ferrous sintered sliding body of FIG. 4 in which ventholes and a groove are formed and FIG. 6B is a cross-sectional view along B-B line in FIG. 6A.
Figure 6B:
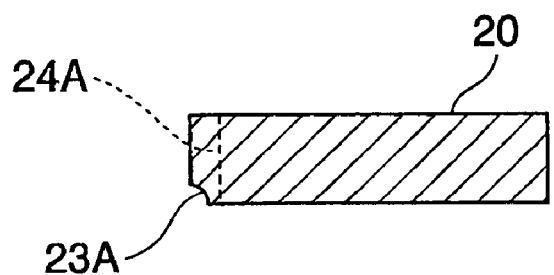

FIG. 6A is a plane view showing the ferrous sintered sliding body of FIG. 4 in which ventholes and a groove are formed and FIG. 6B is a cross-sectional view along B-B line in FIG. 6A.

In this embodiment, ventholes 23A and a groove 24A are formed on a ferrous sintered sliding body 20. This embodiment can obtain the same effect as that of FIG. 5.

The ferrous sintered sliding body 20, according to the present invention, has a structure comprising carbide in a content of at least 5% or more by volume and martensite phase having a solid soluble carbon concentration of 0.15 to 0.5 wt %. This structure enables withstanding a high thrust load and improving abrasion resistance, seizing resistance and heat crack resistance under bad lubricating conditions.

In the ferrous sintered sliding body 20, a dispersion amount of the carbide preferably does not exceed 25% by volume, more preferably 15% by volume, and a solid soluble carbon concentration of the martensite phase is preferably set to 0.2 to 0.45 wt %, more preferably 0.2 to 0.35 wt %. In addition, the ferrous sintered sliding body 20 is preferably tempered at 150 to 600° C. for the purpose of improvement in toughness and flexural strength. This structure allows withstanding a large offset load applied to the thrust bearing.

The carbide includes mainly at least either one of hard and inexpensive $Cr_7C_3$-type carbide or $M_6C$-type carbide excellent in heat-resistance strength. It is preferable to disperse such carbide in a sintered sliding material from an economical viewpoint. Further more, the carbide may include MC-type carbide. In which case, a content of the MC-type carbide is preferably set to 5% or less by volume from an economical viewpoint. Especially, it is most preferable to disperse inexpensive $Cr_7C_3$-type carbide mainly and $M_6C$-type carbide and MC-type carbide in a content of 5% or less by volume additionally.

And, adding P in the form of FeP alloy in an amount of 0.1 to 1.5 wt % can increase a sintered density and improve sintering bonding ability of the ferrous sintered sliding material 20. In fact, concentrating P in at least either one of martensite phase or $M_6C$-type carbide moves a melting point of the ferrous sintered sliding body to lower, causing improvement in sintering ability and sintering bonding ability. And, precipitating phosphorus compound such as $Fe_3P$, $Cr_2P$, FeMoP, $V_2P$ and FeTiP can improve seizing resistance. In a case of a ferrous sintered sliding material in which carbide comprising $M_6C$-type carbide mainly is dispersed, even if P containing therein is concentrated in the $M_6C$-type carbide, P improves bonding stability, whereby P is preferably added in an amount of 0.3 wt % or more.

And, it is preferable to add Cu based alloy phase to a ferrous sintered sliding material in granular form in a content of 1 to 10% by volume. In order to improve sliding performance, the Cu-based alloy phase preferably contains one or more elements selected from the group consisting of P, Sn, Al, Fe and Ni. This improves conformability of a sliding surface. And, since the granulated Cu based alloy is particularly abraded at the beginning of sliding, oil pockets are formed on the sliding surface. Such oil pockets can improve seizing resistance and heat crack resistance.

In order to more improve heat crack resistance, a sintered sliding member, according to this embodiment, preferably comprises a ferrous sintered sliding body and a ferrous back metal to which the ferrous sintered sliding body is sintering-bonded, wherein the ferrous sintered sliding body has a structure in which martensite phase, having a solid soluble carbon concentration of 0.15 to 0.5 wt %, contains $Cr_7C_3$-type, MC-type and $M_6C$-type carbides dispersed therein in a total content of 5 to 50% by volume and closed pores, having an average pore diameter of 0.03 to 11.0 mm, scattered therein in a content of 3 to 10% by volume. Alternatively, the ferrous sintered sliding body is preferably formed with holes at a sliding surface thereof, in which recesses comprising the holes are dispersed in the sliding surface in an area ratio of 3 to 10% and the recess has an average diameter of 3 mm or less.

Furthermore, it is more preferable to add $SiO_2$ particles, for example, to a ferrous sintered sliding material from an economical viewpoint. This makes it possible that $SiO_2$ is reduced at sintering and remaining Si is diffused in the ferrous sintered sliding material and also forms a solid solution therewith. As a result, closed pores formed at portions where the $SiO_2$ particles had existed can be used as oil pockets on a sliding surface, causing improvement in seizing resistance and heat crack resistance.

A ferrous sintered sliding body is preferably formed with recesses having a depth of 0.1 to 3 mm on at least a sliding surface thereof at forming thereof. Because, by sintering-bonding the ferrous sintered sliding body formed with the recesses to a ferrous back metal, oil pockets are formed on the sliding surface.

And, a thickness of a ferrous sintered sliding body is preferably 0.5 mm or more based on the fact that a conventionally used thermal spraying coating film, which is prepared to have a thickness of 0.1 to 0.3 mm, causes peeling and breakage of the coating film due to sand or gravel jammed therein and an offset load. Especially, the upper limit of a thickness of the ferrous sintered sliding body is preferably set in view of abrasion life.

From an abrasion resistant viewpoint, a ferrous sintered sliding body other than the closed pores preferably has a Vickers hardness of Hv500 or more, more preferably Hv700 or more.

Second Embodiment

Figure 7:
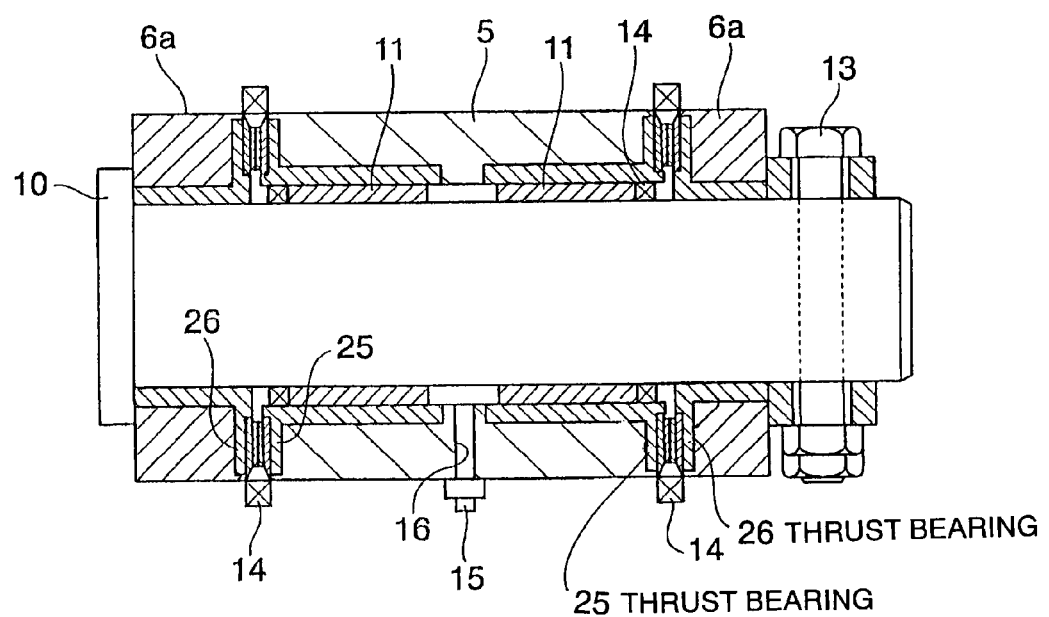
FIG. 7 schematically shows a structure of a bucket connecting device according to the second embodiment of the present invention.
Figure 8A:
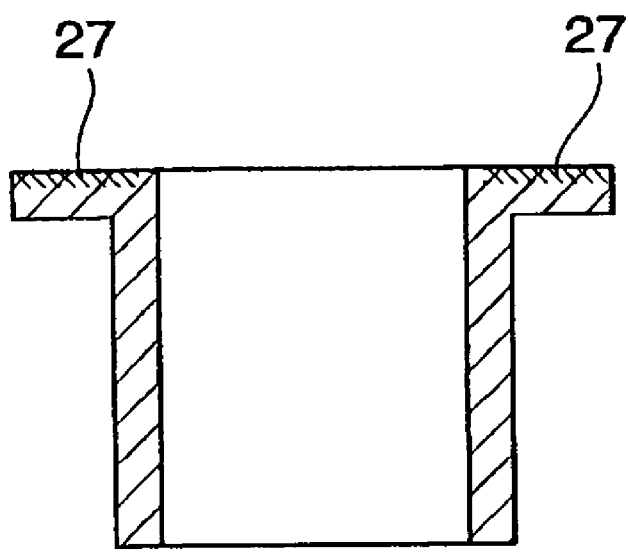
FIG. 8A is a cross-sectional view showing a thrust bearing and FIG. 8B is a plane view showing various oil grooves and recesses formed on a sliding surface of the thrust bearing of FIG. 8A.

FIG. 7 schematically shows a structure of a bucket-connecting device according to the second embodiment of the present invention. FIG. 8A is a cross-sectional view showing a thrust bearing and FIG. 8B is a plane view showing various oil grooves and recesses formed on a sliding surface of the thrust bearing of FIG. 8A.

In this embodiment, as shown in FIG. 7, a thrust bearing 25 forced into the arm 5 and a thrust bearing 26 mounted on the bucket bracket 6a have the form of a thrust bearing with a collar. Since the bucket 6 is sometimes exchanged depending on work and requires easy maintenance, a sliding surface of the thrust bearing 26 equipped for the bucket bracket 6a is not necessarily made of a ferrous sintered sliding material. So, the sliding surface of the bearing is preferably made of an induction quenched carbon steel or low-alloy steel and a carburized material from an economical viewpoint.

Figure 8B:
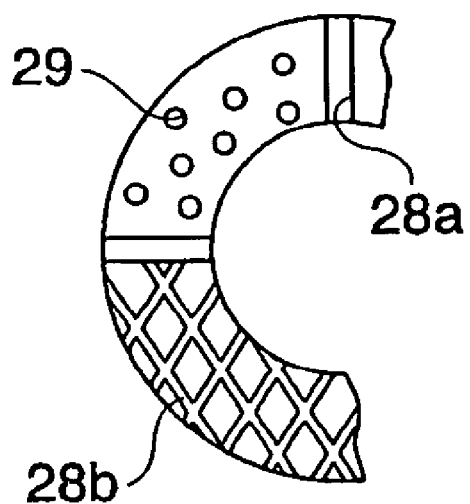

As shown in FIG. 8B, a sliding surface (an induction quenching hardened sliding surface) 27 is preferably formed with suitable grooves (rounded grooves 28a and diamond-shaped grooves 28b) and recesses (dimples or holes 29). Such grooves and recesses make it easy to supply a lubricating grease and another lubricating compound to the sliding surface 27, causing improving seizing resistance and heat crack resistance.

Third Embodiment

Figure 9:
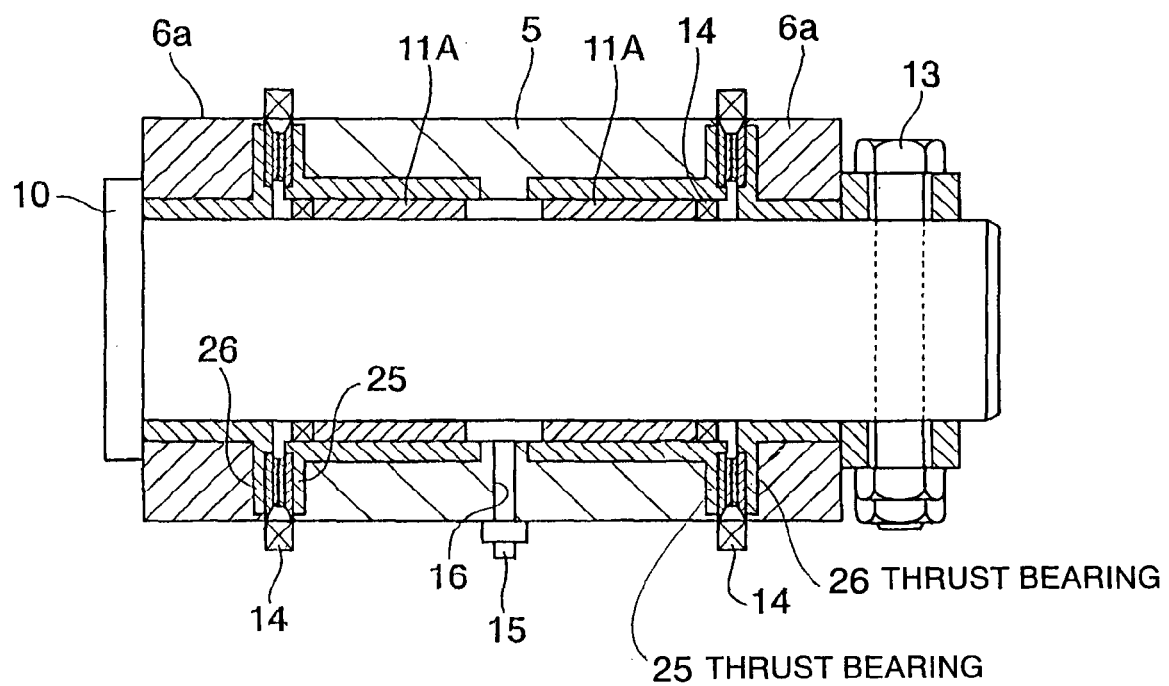
FIG. 9 schematically shows a structure of a bucket-connecting device according to the third embodiment of the present invention.

FIG. 9 schematically shows a structure of a bucket-connecting device according to the third embodiment of the present invention.

In this embodiment, the bucket-connecting device has almost the same principal structure as that of the second embodiment except for the bushing. A bushing 11A, according to this embodiment, is made of a porous iron alloy based sintered body containing a lubricating compound filled in the pores. Such porous iron alloy based sintered body allows extending a lubricating interval of the bucket connecting device. In this embodiment, it is preferable to engage the bushing 11A with the thrust bearing according to the first or second embodiment.

Figure 10:
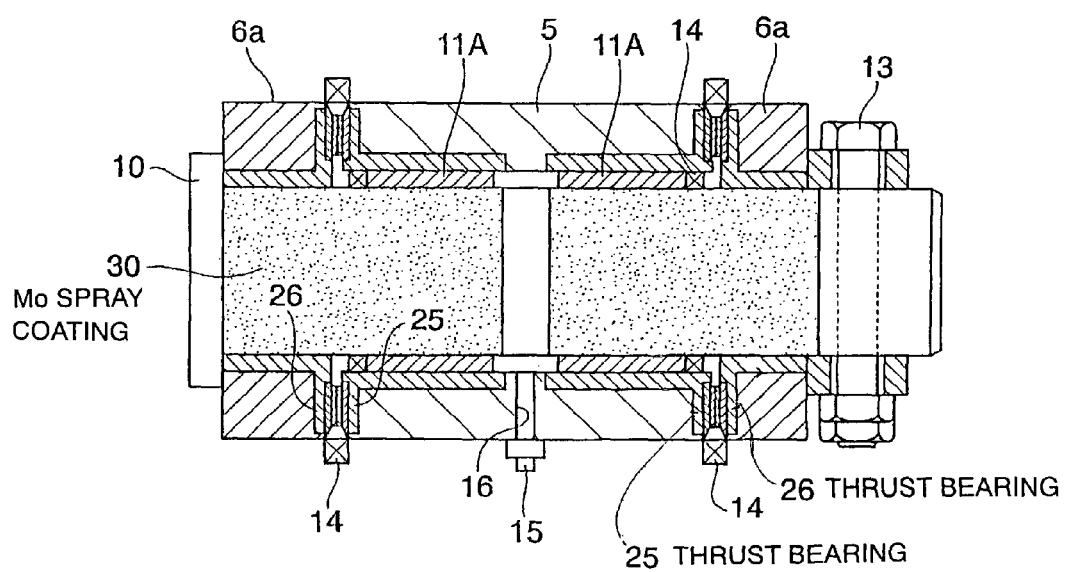
FIG. 10 schematically shows another structure of a bucket-connecting device according to the third embodiment of the present invention.

FIG. 10 schematically shows another structure of a bucket-connecting device according to the third embodiment of the present invention. This structure is preferred than the third embodiment.

In this embodiment, by coating a connecting pin with a hard thermal spraying coating film 30, having a thickness of 0.1 mm or more, made of Mo mainly, a lubricating interval of the connecting pin and thus the bucket connecting device can be extended.

Fourth Embodiment

Figure 11:
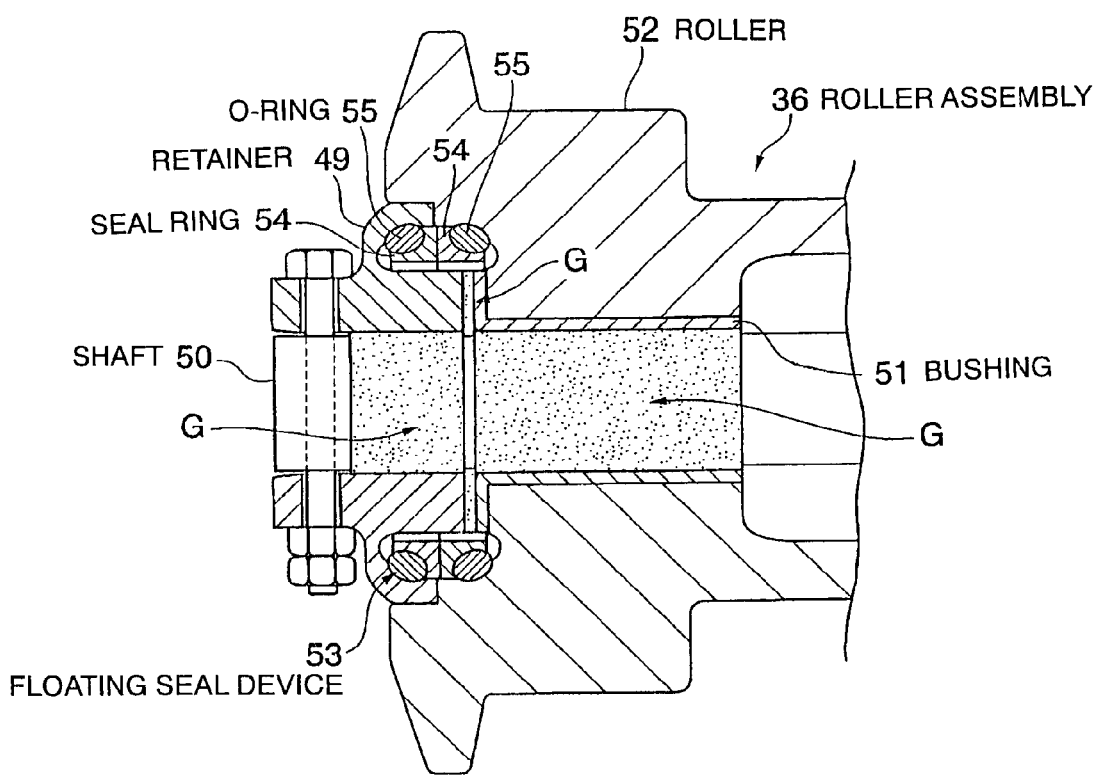
FIG. 11 shows a principal part of a roller assembly.
Figure 12:
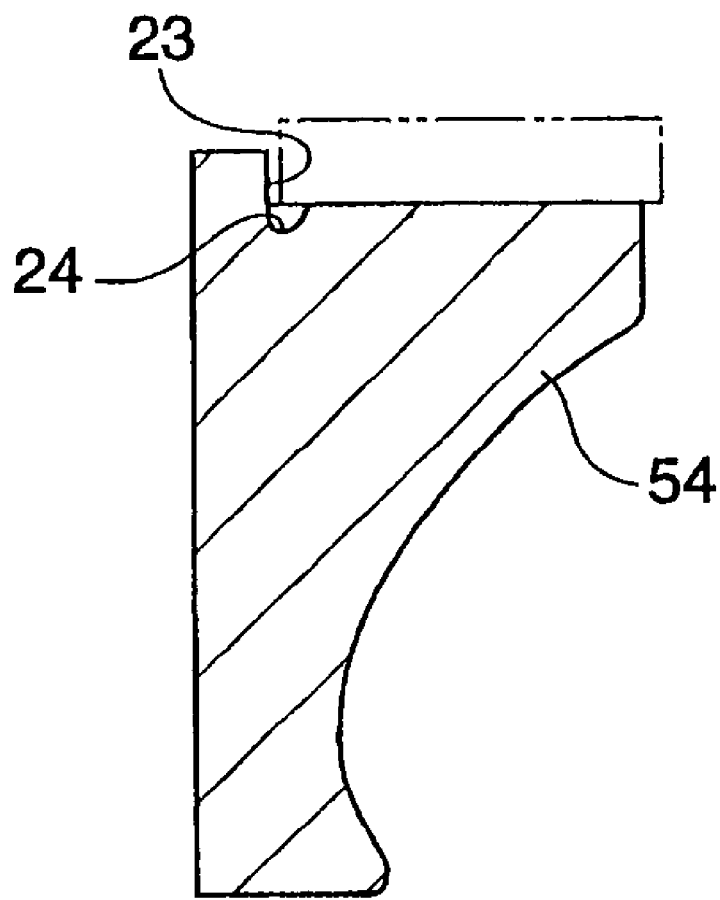
FIG. 12 is a cross-sectional view showing a structure of a double-layered floating seal.

FIG. 11 shows a principal part of a roller assembly. In this embodiment, the present invention is applied to a floating seal device equipped for the roller assembly. FIG. 12 is a cross-sectional view showing a structure of a double-layered floating seal (a floating seal).

As shown in FIG. 11, the roller assembly 36, according to the embodiment, has a roller retainer 49, a roller shaft 50 supported by the retainer 49, a roller bushing (collar bushing) 51 fitted onto the shaft 50 and a roller 52 arranged through the bushing 51, in which the bushing 51 and the roller 52 are rotatably connected each other. A floating seal device 53 is provided with one pair of seal rings 54 with seal surfaces thereof being contacted each other and an O-ring 55 fitted onto each of the seal rings 54. In the roller assembly 36, the floating seal device 53 is arranged such that the contacted seal surfaces of the seal rings 54 are pressed toward the shaft 50 by elastic force of the compressed O-rings 55. The seal surfaces are relatively slidable while being pressed each other at an adequate pressure so as to prevent entering water, sand or gravel from outside, as well as preventing leakage of lubricating oil from inside. To the seal surfaces of the seal rings 54, a ferrous sintered sliding body is sintering-bonded, in which the ferrous sintered sliding body comprises carbide in a content of at least 5 to 50% by volume and martensite phase prepared to have a solid soluble carbon concentration of 0.15 to 0.5 wt %. In order to have a solid soluble carbon concentration in the aforesaid range easily and contain a harder carbide excellent in seizing resistance, the ferrous sintered sliding body preferably contains one or more elements selected from the group of Cr of 9 wt % or more, Mo of 3.5 wt % or more, Mo and W in a total content of 4.5 wt % or more and V of 3 wt % or more, and the martensite phase preferably contains one or more carbide of $Cr_7C_3$-type carbide, $M_6C$-type carbide and MC-type carbide dispersed therein. As shown in FIG. 12, this embodiment has the same sintering bonding method and the same structure, in which ventholes 23 and grooves 24 are formed, as those of the thrust bearings shown in FIG. 5 and FIG. 6. In FIG. 11, a high-speed roller shaft 50 is subjected to a heat treatment for improving sliding performance at the surface G thereof, such as a chemical treatment using zinc phosphate or magnesium phosphate, a chrome plating and a Mo thermal spraying coating treatment.

According to this embodiment, a floating seal device excellent in seizing resistance and heat crack resistance can be provided. In order to improve abrasion resistance further, a floating seal device is preferably made of a sintered sliding member, in which a ferrous sintered sliding body, having a structure in which martensite phase, prepared to have a solid soluble carbon concentration of 0.2 to 0.45 wt %, contains $Cr_7C_3$-type carbide, $M_6C$-type carbide and MC-type carbide dispersed therein in a total content of 20 to 40% by volume, is sintering-bonded to a ferrous back metal having a Vickers hardness of Hv170 or more.

In a large diameter floating seal used for a reduction gear apparatus, a diameter of the seal ring becomes so large that a sliding speed of the seal surface becomes high. Accordingly, a floating seal ring excellent in higher seizing resistance and higher heat crack resistance is required. In order to obtain such a floating seal ring, according to this embodiment, the ferrous sintered sliding material preferably contains at least either one or more groups, in which one group consists of Cu particles and Cu based alloy particles and the other group consists of Mo particles and closed pores, dispersed therein in a content of 1 to 10% by volume. In such a case, the closed pores are preferably scattered in a content of 3 to 10% by volume and preferably have an average diameter of 0.03 to 11.0 mm. In addition, it is also preferable to form recesses at a sliding surface (a seal surface) of the floating seal in an area ratio of 1 to 30%, more preferably 1 to 10% or 3 to 10%. And, a size of the closed pore and the recess preferably has about half or less of a width of the seal surface, more preferably 0.5 mm or less in the width direction of the seal surface. However, a size of the closed pore and the recess may be 1 mm or less in the width direction of the seal surface.

For an inexpensive ferrous sintered sliding material excellent in abrasion resistance, a material in which $Cr_7C_3$-type carbide are dispersed and precipitated in martensite, as with a high-carbon and high-Cr based work steel such as SKD1, SKD2 and SKD11, is used. This embodiment pays attention to a phase diagram of a Fe—C—Cr ternary alloy at 900 to 1000° C. (referring to FIG. 15, described below) and an equilibrium relation (a constant carbon activity) in the phase diagram. The phase diagram shows that a solid soluble carbon concentration in martensite phase is 0.2 to 0.45 wt % in a two phase region of austenite and $Cr_7C_3$-type carbide between Tie Lines A and B. Consequentially, in this embodiment, each amount of carbon and Cr to be added to a ferrous sintered sliding body shall satisfy the following equation;

$$0.143 \times Cr(wt\%) - 1.41 \leq Carbon(wt\%) \leq 0.156 \times Cr(wt\%) - 0.58.$$

And, in order to disperse $Cr_7C_3$-type carbide in a content of 5 to 50% by volume, an addition amount of Cr is set to 9 to 35 wt %. Since V contributes to improve tempering-softening resistance of martensite phase and disperse $Cr_7C_3$-type carbide uniformly, addition amounts of carbon and Cr are determined based on the case that V is added of such amount that MC-type carbide is not precipitated. However, when V is added in an amount such that a slight amount of MC-type carbide (5% or less by volume) is precipitated and dispersed, the aforesaid performance of V can be demonstrated fully. In which case, V is added in an amount of 0 to 3 wt %, and amounts of carbon and Cr added to the ferrous sintered sliding material shall satisfy the following equation;

$$0.143 \times Cr(wt\%) - 1.41 + 14 \times MC\text{-type carbide(volume fraction)} \leq Carbon(wt\%) \leq 0.156 \times Cr(wt\%) - 0.58 + 14 \times MC\text{-type carbide(volume fraction)}.$$

Specifically, a ferrous sintered sliding body preferably contains carbon of 0.9 to 3.8 wt %, Cr of 9 to 35 wt % and V of 0 to 3 wt % so that a content of carbon satisfies the following equation;

$$0.143 \times Cr(wt\%) - 1.41 + 14 \times MC\text{-type carbide(volume fraction)} \leq Carbon(wt\%) \leq 0.156 \times Cr(wt\%) - 0.58 + 14 \times MC\text{-type carbide(volume fraction)},$$

and has a structure in which martensite phase, which forms a solid solution with carbon of 0.2 to 0.45 wt % and Cr of 6.5 to 12 wt %, contains $Cr_7C_3$-type carbide in a content of 5 to 40% by volume and MC-type carbide in a content of 5% or less by volume dispersed therein with a total content of the carbide being 5 to 40% by volume, wherein the ferrous sintered sliding body further contains one or more elements selected from the group consisting of Si, Mn, Ni, P, S, B, N, Mo, W, Ti, Co, Cu and Al. In view of Si, a content of carbon contained in the ferrous sintered sliding material preferably satisfies the following equation;

$$0.143 \times Cr(wt\%) - 1.41 + 0.15 \times Si(wt\%) + 14 \times MC\text{-type carbide(volume fraction)} \leq Carbon(wt\%) \leq 0.156 \times Cr(wt\%) - 0.58 + 0.15 \times Si(wt\%) + 14 \times MC\text{-type carbide(volume fraction)}.$$

And, the ferrous sintered sliding body preferably has martensite phase which forms a solid solution with carbon of 0.2 to 0.45 wt %, Cr of 6.5 to 12 wt % and at least either one of Si of 1 to 5 wt % or Al of 0.5 to 4 wt %.

In the ferrous sintered sliding material in which $Cr_7C_3$-type carbide and MC-type carbide are precipitated and dispersed, concentrations of carbon and alloy elements, such as Cr, V and W, and an amount of carbide in the martensite phase of the ferrous sintered sliding material are important factors for determining seizing resistance, heat crack resistance and abrasion resistance of the ferrous sintered sliding material. So, hereinafter, such concentrations and amount will be examined correctly. In a ferrous sintered sliding material according to this embodiment, a carbon amount (Cwt %) and an element (X) amount (Xwt %) added thereto are expressed by the following equations using volume fractions ($fCr_7C_3$, fMC) of $Cr_7C_3$-type carbide and MC-type carbide dispersed therein, concentrations (CMar, XMar) of carbon and alloy element in the martensite, concentrations (C73, X73) of carbon and alloy element in the $Cr_7C_3$-type carbide and concentrations (CMC, XMC) of carbon and alloy element in the MC-type carbide, $$Cwt\% = CMar \times (1 - fC_7C_3) + C73 \times fCr_7C_3 + CMC \times fMC$$

$$Xwt\% = XMar \times (1 - fCr_7C_3) + X73 \times fCr_7C_3 + XMC \times fMC = XMar\{(1 - fCr_7C_3) + KX7 \times fCr_7C_3 + KXMC \times fMC\}$$

In the aforesaid range according to this embodiment, C73 can approximate 8.7 wt % and CMC can approximate 14 wt %. By using those values, a suitable range of a carbon concentration is expressed by the following equation;

$$0.2 \times (1 - fCr_7C_3) + 8.7 \times fCr_7C_3 + 14 \times fMC \leq Carbon(wt\%) \leq 0.45 \times (1 - fCr_7C_3) + 8.7 \times fCr_7C_3 + 14 \times fMC.$$

And, a suitable range of an alloy element concentration is expressed by the following equation;

$$Xwt\% = XMar\{(1 - fCr_7C_3 - fMC) + KX7 \times fCr_7C_3 + KXMC \times fMC\}.$$

Here, KX7 and KXMC (distribution coefficients) are a ratio of a concentration of an alloy element X in $Cr_7C_3$-type carbide and MC-type carbide, respectively, to a concentration of an alloy element X in martensite phase (that is, KX7=X73/XMar, KXMC=XMC/XMar). In this embodiment, suitable amounts of carbon, Cr, Mo, W, V, Si, Al, Ni and Co added to the ferrous sintered sliding material can be calculated using measured distribution coefficients of such alloy elements (KXMC is described as KXM/C, later).

In this embodiment, each distribution coefficient is measured as follows: KCr7=8, KMo7 and KW7=7, KV7=13, KSi7 and KAl7=0, KNi7=0.1, KCo7=0.23, KCrM/C=3.8, KMoM/C=3, KMWM/C=8.2, KVM/C=119, KSiM/C and KAlM/C=0, KNiM/C and KCoM/C=0.05. In this embodiment, a concentration of Cr in martensite phase is set to 6.5 to 12 wt %. However, as described later, each concentration of Mo, W and V is adjusted as following: Mo; 0 to 4 wt %, W; 0 to 8 wt %, Mo+0.5×W; 0 to 4 wt %, in which 0.5×W represents half of a real amount of W, and V; 0 to 0.6 wt %, for the purpose of obtaining sufficient sintering ability of the martensite phase and adjusting tempering-softening resistance of the martensite phase.

Since a distribution coefficient KCr7 of Cr covers Cr concentrations in a wide range, KCr7 in this embodiment is preferably set to the following using Cr concentration (CrMar (wt %)) in martensite, $$KCr7 = -0.48 \times CrMar(wt\%) + 11.8.$$

When a sliding surface is heated under a boundary lubricating condition generated under severe lubricating conditions and therefore martensite phase in the sliding surface is suddenly softened, seizing resistance and abrasion resistance thereof are deteriorated. In this embodiment, in order to improve tempering-softening resistance, a double layered sintered sliding member (a sintered sliding member) improved in tempering-softening resistance is developed, in which the double layered sintered sliding member contains at least either one of inexpensive Si of 1 to 3.5 wt % or Al of 0.5 to 2 wt % so that at least either one of Si or Al are concentrated in the martensite phase to be 1 to 5 wt % and 0.5 to 4 wt %, respectively.

When Mo coexists with the martensite phase, as described in Japanese Patent No. 2002-380203 proposed by the inventors, Si will decrease the maximum concentration of Mo, demonstrating tempering-softening resistance effectively. Accordingly, in this embodiment, from an economical viewpoint, a concentration of Mo or Mo and W in the martensite phase is adjusted to 0 to 4.0-0.5×(Si(wt %)+Al(wt %)). Consequently, Mo in an amount of 0 to 5.5 wt % or Mo and W in an amount of 0 to 5.5 wt % is added to the ferrous sintered sliding material. In order to ensure quench-hardening ability by gas cooling after sintering-bonding, Mo is preferably added in an amount of 1 to 5.5 wt %. And, an effective concentration of Mo in martensite phase for improving tempering-softening resistance of the martensite is 0 to 2.5 wt %. Accordingly, in this embodiment, from an economical viewpoint, addition amounts of Si and Mo are preferably 1 to 2.5 wt % and 1 to 2.8 wt %, respectively, more preferably 1.5 to 2.5 wt % and 1 to 2 wt %, respectively.

Si forms a solid solution with martensite phase in a large amount and therefore improves tempering-softening resistance of the martensite phase remarkably. And, Si is inexpensive. So, Si is positively added to hot-tool steels such as SKD6, SKD61 and SKD62 which are used without dispersing carbide. In a ferrous sintered sliding material, Si increases a sintering ability remarkably, and also increases carbon activity in austenite phase at sintering and quenching so that a solid soluble carbon concentration in martensite decreases in a relationship of 0.15×Si(wt %) Accordingly, in this embodiment, an adequate concentration of carbon in the aforesaid ferrous sintered sliding material is preferably adjusted to higher in a relationship of 0.15×Si(wt %).

Figure 1A:
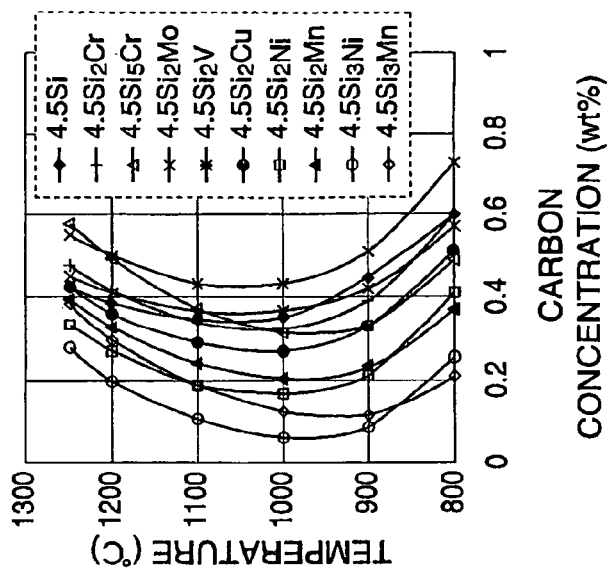
FIGS. 1A to 1C shows a phase diagram of a Fe—Si—C—X ternary alloy.
Figure 1B:
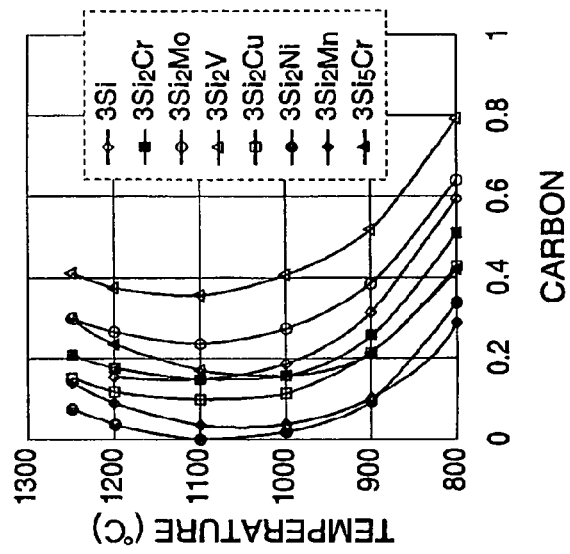
Figure 1C:
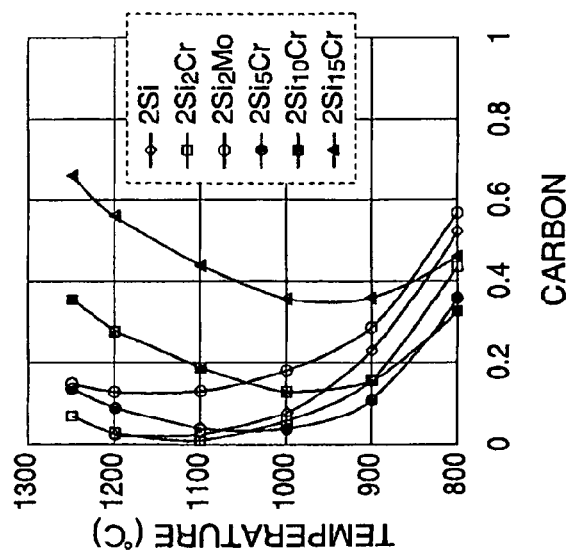

And, since Si stabilizes α Fe phase remarkably and addition of Si moves A3 transformation temperature to higher, Si is expected to work for increasing heat track resistance of a sliding surface. In addition, A3 transformation temperature changes per unit weight of various alloy elements (ΔA3=° C./wt %, Si: +40, Al: +70, Mo: +20, V: +40, W: +12, Mn: −30, Ni: −15 and C: −220) shows that Al, Mo, V and W, in addition to Si, can improve heat crack resistance. However, when a large amount of Si and such elements coexist, ferrite phase is more stabilized and therefore it becomes impossible to perform an adequate quenching treatment. Accordingly, the upper limit of addition amount of Si is set to 3.5 wt % based on phase diagrams of a Fe—Si—C—X quaternary alloy (as shown in FIGS. 1A, 1B and 1C) thermodynamically calculated. The phase diagrams show that Si can be added in an amount of 3.5 wt % in view of a composition of martensite (0.2 wt % Carbon–6.5 to 12 wt % Cr) in which $Cr_7C_3$-type carbide is dispersed mainly. And, in another embodiment (0.45 wt % Carbon–3 wt % Mo–0.5 wt % V) in which $M_6C$-type carbide is dispersed mainly, described later, the upper limit of addition amount of Si is preferably set to 2.5 wt % (as shown in FIGS. 1A, 1B and 1C).

As for Al, Al stabilizes α Fe phase more than Si. So, an addition amount of Al is set to an about half of an addition amount of Si. And, a ferrous sintered sliding material, to which Si and Al are added in a high density, preferably contains one or more elements of Ni of 1 to 5 wt %, Mn of 0.5 to 2 wt % and Cu of 1 to 10 wt %, which stabilize austenite phase (as shown in FIGS. 1A, 1B and 1C).

When a temperature of a sliding surface under a boundary lubricating condition exceeds 500° C., it is required to increase tempering-softening resistance of martensite phase of the sliding surface. Accordingly, this embodiment takes advantage of Mo, W and V, which demonstrate tempering-softening resistance at 500° C. or higher more effectively than Si. So, in order to keep a Rockwell hardness of HRC50 or more, more preferably HRC55 or more, by a quenching treatment (1 hour) at 600° C., a ferrous sintered sliding material preferably contains at least either one of Mo of 1.6 (preferably 2) to 6.5 wt % or Mo and W of 1.6 (preferably 2) to 6.5 wt % so that martensite phase thereof contains one or more elements selected from the group consisting of Mo of 1.5 to 4 wt %, Mo and W of 1.5 to 4 wt % and V of 0 to 0.6 wt %.

In view of a solid solubility of $M_6C$-type carbide at quenching temperatures within 900 to 1000° C., Mo and W can form a solid solution with martensite up to about 4 wt %. The lower limit of each concentration of Mo and W in the martensite phase is not limited. However, in view of a tempering-softening curve of the SKD tool steel and the hot-work tool steel, in order to obtain tempering-softening resistance higher than that of such tool steels, the lower limit thereof is set to 1.5 wt % or more, more preferably 2 wt % or more.

Mo and W, which are added to the ferrous sintered sliding material, concentrates in $Cr_7C_3$-type carbide dispersed in the material. So, addition amounts of Mo and W will be obtained from a relation between the lower and upper limits of dispersion amount of the $Cr_7C_3$-type carbide and the lower and upper limits of a concentration of at least one of Mo and W in the martensite phase by means of distribution coefficients KMo7 and KW7 of Mo and W between the $Cr_7C_3$-type carbide and the martensite phase, obtained in a later embodiment. As a result, an addition amount of Mo is preferably set to 1.6 to 6.4 wt % and an addition amount of Mo and W is preferably set to 1.6 to 6.4 wt %. And, when at least one of Mo and W in the martensite is set to 2 to 4 wt %, in a suitable case for the thrust bearing containing $Cr_7C_3$-type carbide in a content of 10 to 25% by volume, an addition amount of Mo is preferably set to 2.3 to 5.5 wt %, and in a suitable case for the floating seal containing $Cr_7C_3$-type carbide in a content of 20 to 40% by volume, an addition amount of Mo is preferably set to 2.6 to 6.4 wt %. More preferably, when $Cr_7C_3$-type carbide is contained in a content of 25 to 40% by volume, an addition amount of Mo is set to 3.5 to 6.4 wt %.

V is examined as with Mo and W. V in martensite phase increases tempering-softening resistance than Mo and W. A concentration of V in martensite, which forms a solid solution with carbon of 0.2 to 0.45 wt %, is 0.2 to 0.6 wt % within a temperature range of 900 to 1100° C. because MC-type carbide is remarkably suitable carbide. In view of a concentration of V concentrated in $Cr_7C_3$-type carbide, in this embodiment, V can be added to the ferrous sintered sliding material, containing $Cr_7C_3$-type carbide precipitated therein in a content of 50% by volume, up to an amount of about 3.5 wt % without MC-type carbide being precipitated. And, as described later, the strength of the material decreases as a larger amount of carbide is dispersed. So, in viewpoint of such fact and an economical efficiency, in a case of a ferrous sintered sliding material containing $Cr_7C_3$-type carbide dispersed therein in a content of 5 to 40% by volume, V is preferably added in an amount of 0.5 to 3.0 (more properly, 2.9) wt % in proportion to a content of the $Cr_7C_3$-type carbide. In order to take full advantage of V for increasing tempering-softening resistance of martensite phase effectively, MC-type carbide is preferably precipitated and dispersed in an economically allowable small amount. Accordingly, in this embodiment, MC-type carbide is preferably dispersed in a content of 5% or less by volume. And, since a concentration of V in the MC-type carbide is about 45 wt % according to this embodiment, an addition amount of V is set to 5 wt % or less, more preferably 4 wt % or less.

And, for a ferrous sintered sliding material used for a thrust bearing which requires an adequate abrasion resistance and toughness, it is preferable to disperse $Cr_7C_3$-type carbide and MC-type carbide in a total content of 10 to 20% by volume therein. So, an addition amount of each element is preferably set to the followings: C; 1.1 to 2.4 wt %, Cr; 10 to 29 wt %, Mo; 1.8 to 5 wt % and V; 1.1 to 3.5 wt %. Furthermore, in order to improve seizing resistance, it is preferable to disperse MC-type carbide in a small content of 0.5 to 5% by volume therein and therefore disperse $Cr_7C_3$-type carbide and MC-type carbide in a total content of 20 to 40% by volume therein. Accordingly, an addition amount of each element is set to the followings: C; 1.9 to 4 wt %, Cr; 15 to 35 wt %, Mo; 2 to 6.4 wt % and V; 2 to 5 wt %.

In a case of a ferrous sintered sliding material used for a floating seal which requires higher abrasion resistance than the thrust bearing, it is necessary to further improve abrasion resistance and seizing resistance of the ferrous sintered sliding material. Consequentially, in the present invention, a sintered sliding member using a ferrous sintered sliding material is developed, in which the ferrous sintered sliding material contains at least carbon of 1.8 to 4.5 wt %, Cr of 12 to 30 wt %, V of 3.5 to 10 wt %, either one of Mo of 2 to 6.4 wt % or Mo and W in a total amount of 2 to 6.4 wt % and has martensite phase, wherein the martensite phase, having a solid soluble carbon concentration of 0.2 to 0.45 wt %, contains MC-type carbide, harder than $Cr_7C_3$-type carbide, dispersed and precipitated therein in a content of 5 to 15% by volume. And, the martensite phase preferably forms a solid solution with carbon of 0.2 to 0.45 wt % and Cr of 6.5 to 12 wt % and further one or more elements selected from the group consisting of Mo of 1 to 3.5 wt %, Mo and W in a total amount of 1 to 3.5 wt % and V of 0.4 to 0.6 wt %. In view of toughness of the ferrous sintered sliding material, the martensite phase preferably contains $Cr_7C_3$-type carbide in a content of 10 to 35% by volume and MC-type carbide in a content of 5 to 15% by volume precipitated and dispersed therein with a total amount of the carbides being 15 to 40% by volume. In addition, the ferrous sintered sliding material preferably contains one or more elements in Si, Mn, Ni, P, S, B, N, Co, Cu and Al.

In order to improve toughness of the ferrous sintered sliding material, a total amount of the carbides is preferably set to 15 to 30% by volume.

And, when V and Ti are added so as to disperse MC-type carbide, the lower limit of dispersion amount of the MC-type carbide is set to 5% by volume which is an average content of MC-type carbide dispersed in a high-speed steel, described later, and the upper limit thereof is set to 15% by volume from an economical viewpoint. Especially, when MC-type carbide is dispersed while coexisting with $Cr_7C_3$-type carbide, V concentrates in the $Cr_7C_3$-type carbide in a high density. So, from an economical viewpoint, a content of $Cr_7C_3$-type carbide is preferably limited to 10 to 25% by volume. And, in order to ensure toughness of the ferrous sintered sliding material, at least carbon of 1.8 to 3.7 wt %, V of 3.7 to 9 wt %, Mo of 2.5 to 5.5 wt % and Mo and W of 2.5 to 5.5 wt % is preferably contained so that a total content of the carbides is regulated to 15 to 30% by volume.

Alloy elements such as Ti, Zr, Nb and Hf, producing MC-type carbide remarkably, hardly forms a solid solution with martensite phase and almost all amounts thereof seem to be dispersed as MC-type carbide. And, since such elements are very expensive, adding such elements in a large amount is not desirable from an economical viewpoint. Accordingly, an addition amount of each of the elements is set to 3 wt % or more, and also carbon is added in an amount (wt %) calculated stoichiometrical compositions of TiC, ZrC and NbC so as to regulate a suitable addition amount of carbon.

A ferrous sintered sliding material is sintering-bonded to a ferrous back metal at about 1150 to 1220° C. In such a case, even if the ferrous sintered sliding material is continuously quenched by gas cooling from temperatures near the sintering-bonding temperatures, no trouble may occur as long as a solid soluble carbon concentration in martensite phase thereof is regulated to 0.2 to 0.45 wt %. The higher the quenching temperature, the larger the concentrations of V, Mo and W in the martensite phase. This fact is preferable for tempering-softening resistance.

Tempering-softening resistance of martensite phase at 600° C. is improved in relation to the following equation using a tempering parameter $\Delta HRC$ represented by Rockwell hardness HRC and concentrations of alloy elements in the martensite phase. Accordingly, on basis of tempering hardness (about HRC43) of SKD1 (carbon of 2.02 wt %, Si of 0.34 wt %, Cr of 13.03 wt % and V of 0.04 wt %) at 600° C., concentrations of each element in martensite phase are preferably controlled so that $\Delta HRC$ is 7 or more, more preferably 12 or more.

$$\Delta HRC = 0.5 \times (11 \times MoMar + 7.5 \times WMar + 25.7 \times Vmar + 5.8 \times SiMar + 5.8 \times SiMar).$$

For example, in order to satisfy a condition of $\Delta HRC \geq 12$, when each of Mo, W and V is added independently, it is necessary to add Mo of 2.2 wt % or more, W of 3.2 wt % or more and V of 0.93 wt % or more to the martensite phase. And, since a maximum solid soluble V concentration is about 0.6 wt %, when V is added by itself without adding Mo and W, tempering-softening resistance cannot be improved sufficiently. Accordingly, it becomes necessary to add Mo therewith so that the martensite phase contains Mo in an amount of 1 wt % or more.

As described above, when a ferrous sintered sliding material contains MC-type carbide together with $Cr_7C_3$-type carbide dispersed therein, an adequate amount of carbon to be added to the ferrous sintered sliding material is modified. In addition, Cr, Mo and W added thereto concentrate in MC-type carbide remarkably. Accordingly, using distribution coefficients of each elements between the MC-type carbide and martensite makes it possible to calculate suitable addition amounts of Cr, Mo and W to be added to the ferrous sintered sliding material for adjusting concentrations of each elements in the martensite phase adequately. However, since Mo, W, V and Cr concentrate in MC-type carbide in a significant high density, using plain distribution coefficients cannot provide sufficient exact values. So, assuming that MC-type carbide is precipitated as $V_4C_3$, $Mo_4C_3$, $W_4C_3$ or $Cr_4C_3$-type composite carbide and the carbide comprises V+Mo+W+Cr of 80 wt %, carbon of 15 wt %, Fe+Mn of 5 wt % and the like, each concentration of V, Mo, W and Cr in the MC-type carbide is modified such that a total amount of the element is 80 wt % with a concentration ratio of each of the element, in which the concentration ratio is determined by distribution coefficients of each element between MC-type carbide of each element and martensite (the distribution coefficient of each element is the followings: KVM/C=119, KMoM/C=3, KWM/C=8.2 and KCrM/C=3.8). For example, an amount (VMC(wt %)) of MC-type carbide of V is modified as the following:

$$VMC(wt\%) = (VMar \times KVMC/((VMar \times KVMC + CrMar \times KCrMC + MoMar \times KMoMC + WMar \times KWMC)/0.8)$$

(here, KXM/C is represented by KXMC for short). For example, from a composition (Mo of 2.0 wt %, W of 2.0 wt %, Cr of 4.5 wt % and V of 0.45 wt %) of martensite of No. 32 MC-type carbide shown in FIG. 21 described later, a composition of MC-type carbide dispersed in the martensite phase is calculated as follows; V of 46.0 wt %, Mo of 5.2 wt %, W of 14.1 wt % and Cr of 14.7 wt %. The results are well agreed with analysis shown in FIG. 21 described later, whereby the modification is proved to be preferred.

A high-hard high speed steel such as SKH2(T1), SKH10 (T15), SKH54(M4, M6) and SKH57, containing a large amount of W and Mo, is quenched from quenching temperatures higher than 1200° C. and tempered (at about 550 to 580° C.) twice or more so as to decompose retained austenite almost entirely. As a result, the high-speed steel is prepared to have a solid soluble carbon concentration of 0.5 to 0.6 wt % so as to have a Rockwell hardness of HRC65 or more. The high speed steel is a material in which a high alloy martensite phase, which forms a solid solution with Mo+W+V of 5 to 10 wt % and Cr of 3.5 to 4/5 wt %, contains $M_6C$-type carbide, having a basic crystal structure of $Fe_3Mo_3C$ or $Fe_3W_3C$, in a content of 5 to 12% by volume and MC-type carbide, having a basic crystal structure of $V_4C_3$, in a content of 1 to 9% by volume dispersed therein with a total content of the carbide being 7 to 12% by volume so to demonstrate remarkable tempering-softening resistance (referring to J. Japan Inst. Metals, 2 (1963), Sato, Nishizawa, P. 564). So, the high-speed steel does not have sufficient heat crack resistance as with the high-Cr based work steels. And, when the high-speed steel is used for the floating seal, sufficient seizing resistance and abrasion resistance are not obtained because of a small amount of carbide. Accordingly, in the present invention, adequate addition amounts of carbon and alloy elements in the case of dispersing a large amount of $M_6C$-type carbide are necessarily set in the same manner for setting adequate addition amounts of carbon and alloy elements in the case of dispersing the $Cr_7C_3$-type carbide and the MC-type carbide in a martensite phase. Therefore, in the present invention, referring to a phase diagram of a Fe—C—Mo ternary alloy at 900 to 1000° C. (shown in FIG. 16 described below), a ferrous sintered sliding material is developed, in which the ferrous sintered sliding material has martensite phase, having a solid soluble carbon concentration of 0.2 to 0.45 wt %, contains $M_6C$-type carbide dispersed therein. For this purpose, a suitable addition amount of carbon to an addition amount of Mo is approximately represented so as to satisfy the following equation;

$$0.043 \times Mo(wt\%) \leq Carbon(wt\%) \leq 0.038 \times Mo(wt\%) + 0.36.$$

And, in view of a phase diagram of a Fe—C—W ternary alloy (shown in FIG. 17 described below), as with the Fe—C—Mo ternary alloy, gradients of Tie Line A and Tie Line B constructing a two-phase region of austenite ($\gamma$) and $M_6C$-type carbide are about ½ of gradient of Tie Line of the phase diagram of the Fe—C—Mo ternary alloy (FIG. 16) and a solid solubility of $M_6C$-type carbide with austenite in the phase diagram of a Fe—C—W ternary alloy can be approximately equal to that of the Fe—C—Mo ternary alloy. So, when both Mo and W are added together, in order to adjust a solid soluble carbon concentration in martensite phase of the ferrous sintered sliding material to 0.2 to 0.45 wt %, a suitable amount of carbon is required to satisfy the following equation;

$$0.043 \times (Mo(wt\%) + 0.5 \times W(wt\%)) \leq Carbon(wt\%) \leq 0.038 \times (Mo(wt\%) + 0.5 \times W(wt\%)) + 0.36.$$

In addition, the ferrous sintered sliding material contains $M_6C$-type carbide dispersed therein in a content of 5 to 40% by volume and Mo+0.5×W dispersed therein in a content of 4.5 to 30 wt %. The present invention develops a double layered sintered sliding material in which a ferrous sintered sliding material is sintering-bonded to a high strength and high toughness ferrous back metal, in which the ferrous sintered sliding material contains at least carbon of 0.6 to 1.9 wt %, Cr of 1 to 7 wt %, V of 0 to 3 wt, Mo of 3.5 wt % or more and Mo+0.5×W of 4.5 to 30 wt % (or Mo and W of 6 to 30 wt %) and has a structure in which martensite phase, having a solid soluble carbon concentration of 0.2 to 0.45 wt % (more preferably, a solid soluble Mo concentration of 2 to 4 wt %, a solid soluble Mo and W concentration of 2 to 4 wt %, a solid soluble Cr concentration of 1 to 7 wt % and a solid soluble V concentration of 0 to 0.6 wt %), contains $M_6C$-type carbide in a content of 5% or more by volume (more preferably, 5 to 40% by volume) and MC-type carbide in a content of 5 to 40% by volume dispersed therein. In addition, the ferrous sintered sliding material further contains one or more alloy elements of Si, Mn, Ni, P, S, N, B, Ti, Co, Cu and Al if necessary.

Since a modified addition amount of carbon and addition amounts of alloy elements depending on a dispersion amount of MC-type carbide are set according to the aforesaid manner, it is apparent that a ferrous sintered sliding material, in which martensite phase, having a solid soluble carbon concentration of 0.2 to 0.45 wt %, contains $M_6C$-type carbide and MC-type carbide dispersed therein, requires that an adequate addition amount of carbon to addition amounts of Mo and W satisfies the following equation;

$$0.043 \times (Mo(wt\%) + 0.5 \times W(wt\%)) + 14 \times MC\text{-type carbide(volume fraction)} \leq Carbon(wt\%) \leq 0.038 \times (Mo(wt\%) + 0.5 \times W(wt\%)) + 0.36 + 14 \times MC\text{-type carbide(volume fraction)}.$$

It is necessary to discuss a ferrous sintered sliding material in which $M_6C$-type carbide is dispersed in the same manner for accurately discussing a composition of a ferrous sintered sliding material in which the $Cr_7C_3$-type carbide and the MC-type carbide are precipitated and dispersed. When a volume fraction $fM_6C$ of $M_6C$-type carbide and a carbon concentration $CM_6C(wt\%)$ of the $M_6C$-type carbide in this embodiment are used, an adequate amount of carbon added to the ferrous sintered sliding material is shown in the following equation using solid soluble carbon concentrations of martensite phase of 0.2 wt % and 0.45 wt %:

$$0.2 \times (1 - fM_6C - fMC) + CM_6C \times fM_6C + 14 \times fMC \leq Carbon(wt\%) \leq 0.45 \times (1 - fM_6C - fMC) + CM_6C \times fM_6C + 14 \times fMC.$$

Furthermore, when the upper limit of a solid soluble carbon concentration in martensite phase is set to 0.35 wt % in order to improve hart crack resistance, a solid soluble carbon concentration of 0.35 wt % is preferably applied to the aforesaid equation.

While a carbon concentration ($CM_6C$) of $M_6C$-type carbide varies depending on a rate of contents of Mo and W in the $M_6C$-type carbide, since distribution coefficients of Mo and W between $M_6C$-type carbide and martensite phase can be approximately represented as $KMo6 \approx KW6$ from a result of the later embodiment, a carbon concentration ($CM_6C$) of $M_6C$-type carbide can be approximately expressed by the following equation:

$$CM_6C = 0.91 \times (Mo(wt\%)/(Mo(wt\%) + W(wt\%))) + 1.74.$$

A distribution coefficient of each alloy element between $M_6C$-type carbide and martensite phase is measured as follows: KMo6=20, KW6=23, KV6=5.7, KCr6=0.95, KSi6=2.3, KAl6=2.3, KNi6=0.4, KCo6=0.5 and KP6=2. By using these distribution coefficients, an addition amount of each alloy element can be calculated as with a case of the aforesaid ferrous sintered sliding material. And, concentrations of Mo and W in $M_6C$-type carbide are high, for example, Mo of up to 58 wt % forms a solid solution in $Fe_3Mo_3C$, and W of up to 70 wt % forms a solid solution in $Fe_3W_3C$. So, as with the case for modifying a concentration of each element in MC-type carbide, when Mo coexists with W, an amount (wt %) of $MoM_6C$ and $WM_6C$ is preferably calculated depending on a value of $MoM_6C/(MoM_6C+WM_6C)$.

For a ferrous sintered sliding material with a high regard for heat crack resistance and toughness, the upper limit of a solid soluble carbon concentration in martensite is set to 0.35 wt % so that the martensite phase contains $M_6C$-type carbide in a content of 5 to 20% by volume and MC-type carbide in a content of 5% or less by volume dispersed therein with a total content of the carbides being 10 to 25% by volume. Such prepared ferrous sintered sliding material is suitable for a double layered thrust bearing (a thrust bearing). For a suitable ferrous sintered sliding material for use in a floating seal which requires excellent seizing resistance and abrasion resistance, it is preferable to disperse $M_6C$-type carbide in a content of 15 to 40% by volume and MC-type carbide in a content of 5% or less by volume with a total content of the carbides being 20 to 40% by volume larger than that of the high speed steel.

As described above, since a high speed steel contains retained austenite phase in a content of 20% or more by volume in a quenched state, the high speed steel used is tempered at 550 to 580° C. twice or more so as to decompose the retained austenite and also be remarkably hardened to have a hardness of HRC65 or more by secondary hardening. So, when the high speed steel is used in a floating seal, initial conformability of a sliding surface thereof is insufficient, resulting in oil leakage and seizing frequently. Accordingly, in a ferrous sintered sliding material according to the present invention, in order to improve the conformability so as to ensure seizing resistance and obtain a suitable sealing width of about 0.3 to 2.0 mm, retained austenite is dispersed in the matrix in a content of 5% or more by volume, more preferably 10 to 40% by volume, after tempering. However, when retained austenite will be dispersed in a content of 40% or more by volume, abrasion resistance of the material is deteriorated. So, the upper limit of the retained austenite to be dispersed is set to 40% by volume.

In order to ensure an adequate amount of retained austenite, in the present invention, one or more elements of Ni of 1 to 5 wt %, Mn of 2 wt % or less and Cu of 10 wt % or less are added to the material, in which such elements are not added to a conventional high speed steel.

Since a floating seal requires a sufficient sealing width even during a hulling motion, it is necessary to select a ferrous sintered sliding material capable of obtaining an adequate sealing width. A too narrow sealing width causes not only an insufficient sealing performance but also an increased sliding-bearing stress applied to a seal surface, resulting in occurrence of seizing and heat crack at the seal surface frequently. On the contrary, a too wide sealing width demonstrates stable sealing performance; lubricating performance of the seal surface becomes harsh, resulting in occurrence of seizing and heat crack at the seal surface. So, in a conventionally used sealing member, a sealing width is selected to be 0.3 to 2 mm. The present invention provides a method for improving lubricating ability of a seal surface.

For a method for adjusting a solid soluble carbon concentration in martensite phase, according to the present invention, based on data of heat-treated high speed steels having a conventional composition (J. Japan Inst. Metals 2 (1963), Sato, Nishizawa, p. 564), a quenching treatment for quenching at 900 to 1150° C., more preferably 900 to 1000° C., is used.

As described above, in a ferrous sintered sliding material, an addition amount of Cr is limited to 1 to 7 wt % so that $Cr_7C_3$-type carbide may not be dispersed. In which case, a concentration of Cr in martensite is about 1 to 7 wt %. The higher the Cr concentration, the more the corrosion resistance of the ferrous sintered sliding material efficiently demonstrates. However, as disclosed in Japanese Patent Application No. 2002-380203 proposed by the inventors, when a concentration of Cr in martensite exceeds 3.5 wt %, tempering treatment precipitates $Cr_7C_3$-type carbide so as to deteriorate tempering-softening resistance by Mo, W and V. So, when high tempering-softening resistance is required as described above, the upper limit of a concentration of Cr in martensite phase is preferably set to 3.5 wt % and the lower limit thereof is preferably set to 1 wt % in view of quenching hardenability. And, quenching ability can be sufficiently adjusted by contents of Ni, Mn and Mo in martensite phase. In addition, corrosion resistance can be sufficiently improved by addition of Mo, Ni, Cu, P, Si and Al other than Cr even if a concentration of Cr in martensite is 1 wt %. For example, a Ni-hard cast iron suitably used in a floating seal without troubles in corrosion resistance has martensite having a composition of Ni of about 5 wt %, Cr of 1 wt % and Si of 1.5 wt %.

A maximum addition amount of V added to a sintered sliding material, in which $M_6C$-type carbide is dispersed in a content of 40% by volume and MC-type carbide ($V_4C_3$) is not precipitated, is 1.2 wt % (more accurately, 1.15 wt %). When such maximum addition amount is compared with a maximum addition amount of V added to a sintered sliding material in which $Cr_7C_3$-type carbide is dispersed in a content of 40% by volume and MC-type carbide ($V_4C_3$) is not precipitated, it is shown that a ferrous sintered sliding material according to the present invention is suitable for a ferrous sintered sliding material in which V increases tempering-softening resistance of martensite phase economically.

In view of taking full advantage of V improving tempering-softening resistance, when $M_6C$-type carbide is dispersed in a content of 5, 15, 30 and 40% by volume and MC-type carbide is not dispersed, an addition amount of V is 0.5, 0.7, 1.0 and 1.2 wt %, respectively. And, when MC-type carbide is dispersed in a content of 5% by volume, an addition amount of V is 2.2 to 4.5 wt % obtained by calculation. Accordingly, in the present invention, an addition amount of V is preferably set to 0.5 to 4.5 wt %. In a ferrous sintered sliding material, used in a thrust bearing, which contains $M_6C$-type carbide in a content of 5 to 25% by volume and MC-type carbide in a content of 5% or less by volume dispersed therein with a total content of the carbides being 10 to 25% by volume, carbon of 0.6 to 1.6 wt %, Cr of 1 to 3 wt %, Mo of 7.5 wt % or more, Mo and W of 7.5 to 15 wt % and V of 0.9 to 4 wt % are added thereto. In a ferrous sintered sliding material suitable, used in a floating seal, which contains $M_6C$-type carbide in a content of 20 to 40% by volume and MC-type carbide in a content of 5% or less by volume dispersed therein with a total content of the carbides being 20 to 40% by volume, carbon of 0.8 to 1.9 wt %, Cr of 1 to 3.5 wt %, Mo of 13 wt % or more, Mo and W of 13 to 25 wt % and V of 1.3 to 4.5 wt % are preferably added thereto.

When a concentration of Cr in martensite phase is 3.5 wt % or less, a tempering-softening parameter ΔHRC is shown in the following equation using a concentration (XMar(wt %)) of each alloy element X (referring to Japanese Patent Application No. 2002-389203), $$\Delta HRC = 2.8 \times CrMar + 11 \times MoMar + 7.5 \times WMar + 25.7 \times VMar + 5.8 \times (SiMar + AlMar).$$

In order to obtain a hardness of HRC50 or more, more preferably HRC55 or more, by a tempering treatment (1 hour) at 600° C., ΔHRC27 or more, more preferably ΔHRC31 or more, is required. Such ΔHRC can be obtained in a range in which MoMar is 2 to 4 wt %, MoMar+WMar is 2 to 4 wt %, CrMar is 1 to 3.5 wt %, VMar is 0 to 0.6 wt %, SiMar is 0 to 7 wt % and AlMar of 0 to 4 wt %. As described above, when Si and Al are added in a total amount of 1.5 wt % or more, effects of Mo, W and V on improvement in tempering-softening resistance are decreased. Accordingly, in a ferrous sintered sliding material according to the present invention, an amount (wt %) of Si and Al is preferably adjusted to 0.5 to 1.5 wt %. When Ni and Al coexist, in which the elements are added in order to obtain retained austenite phase and improve quenching ability and abrasion resistance, remarkable age-hardening is demonstrated and therefore tempering-softening resistance is improved. Accordingly, Ni is preferably added to a ferrous sintered sliding material to which Al is added.

A ferrous sintered sliding material, in which a large amount of $M_6C$-type carbide is dispersed, requires a large amount of Mo and W. So, an economical method for adding Mo and W will be discussed. An amount of $M_6C$-type carbide precipitated by addition of expensive W is about 0.8 times an amount of $M_6C$-type carbide precipitated by addition of Mo. And, an effect of W on tempering-softening resistance is about 0.7 times that of Mo. In addition, when MC-type carbide is dispersed coexistent therewith, W is precipitated in the MC-type carbide in a larger amount than Mo. From the results, it is economical to add Mo mainly than W. And, in view of sintering ability, in the present invention, it is desirable that W does not add. Furthermore, in view of availability in a market of sintering powder, it is not economical to add W in an amount larger than an amount (7 wt %) of W added to a conventional Mo-type high-speed steel.

When a ferrous sintered sliding material is used in a floating seal, in order to improve abrasion resistance and seizing resistance, MC-type carbide is preferably dispersed in a large volume (5 to 15& by volume), and a total content of carbides is preferably increased up to 20 to 50% by volume. Consequentially, the present invention develops a double layered sintered sliding material to which a high hard ferrous sintered sliding material is sintering-bonded, in which the ferrous sintered sliding material contains at least carbon of 1.3 to 3 wt %, Cr of 1 to 5 wt %, V of 3 to 12 wt %, Mo of 10 wt % or more and Mo and W of 10 to 23 wt % and has a structure in which martensite phase, having a solid soluble carbon concentration of 0.2 to 0.45 wt %, contains $M_6C$-type carbide in a content of 15 to 35% by volume and MC-type carbide in a content of 5 to 15% by volume (a total content of the carbides is 20 to 40% by volume) dispersed therein. Further, the ferrous sintered sliding material contains alloy elements such as Si, Mn, Ni, P, S, B, N, Ti, Co, Cu and Al.

As described above, a double layered sintered sliding material to which a ferrous sintered sliding material comprising Mo and W mainly is sintering-bonded is not more economical than a ferrous sintered sliding material in which $Cr_7C_3$-type carbide is dispersed mainly. Accordingly, the present invention develops a double layered sintered sliding material in which a ferrous sintered sliding material is sintering-bonded to a high hard ferrous back metal, in which the ferrous sintered sliding material contains at least carbon of 0.8 to 3.4 wt %, Cr of 9 to 28 wt %, Mo of 5 wt % or more, Mo and W of 5 to 18 wt % and V of 5 wt % or more and has a structure in which martensite phase, having a solid soluble carbon concentration of 0.2 to 0.45 wt %, contains $Cr_7C_3$-type carbide, excellent in abrasion resistance, in a content of 5 to 25% by volume, MC-type carbide in a content of 5% or less by volume and $M_6C$-type carbide, excellent in seizing resistance, in a content of 5 to 25% by volume dispersed therein with a total content of the carbides being 10 to 40% by volume. Further, the ferrous sintered sliding material contains one or more elements of Si, Mn, Ni, P, S, B, N, Ti, Cu, Co and Al if necessary.

In a ferrous sintered sliding material for a floating seal, $Cr_7C_3$-type carbide in a content of 10 to 25% by volume, MC-type carbide in a content of 0.5 to 5% by volume and $M_6C$-type carbide, excellent in seizing resistance, in a content of 10 to 20% by volume are dispersed with a total content of the carbides being 20 to 40% by volume. Such ferrous sintered sliding material preferably contains at least carbon of 1.34 to 3.4 wt %, Cr of 11 to 28 wt %, Mo of 8 wt % or more, Mo and W of 8 to 16 wt % and V of 1 to 5 wt %. In a ferrous sintered sliding material for a thrust bearing, $Cr_7C_3$-type carbide in a content of 5 to 10% by volume, MC-type carbide in a content of 0.5 to 5% by volume and $M_6C$-type carbide, excellent in seizing resistance, in a content of 5 to 10% by volume are dispersed with a total content of the carbides being 10 to 20% by volume. Such ferrous sintered sliding material preferably contains at least carbon of 0.8 to 2.0 wt %, Cr of 9 to 20 wt %, Mo of 4.5 wt % or more, Mo and W of 4.5 to 12 wt % and V of 1 to 4 wt %.

In a ferrous sintered sliding material which contains $Cr_7C_3$-type carbide and $M_6C$-type carbide and comprises martensite phase having a solid soluble carbon concentration of 0.2 to 0.45 wt %, a suitable concentration (Cwt %) of carbon contained therein preferably approximately satisfies the following equation using $KCr6 \approx 1$:

$$0.043 \times (Mo(wt\%) + 0.5 \times W(wt\%)) + 2 \times 0.085 \times (Cr(wt\%) - 6.5) \leq Carbon(wt\%) \leq 0.038 \times (Mo(wt\%) + 0.5 \times W(wt\%)) + 0.33 + 2 \times 0.085 (Cr(wt\%) - 6.5).$$

More correctly, a suitable concentration range of carbon of a ferrous sintered sliding material is shown in the following equation:

$$0.2 \times (1 - fCr_7C_3 - fM_6C - fMC) + 8.7 \times fCr_7C_3 + 2.65 \times fM_6C + 14 \times fMC \leq Carbon(wt\%) \leq 0.45 \times (1 - fCr_7C_3 - fM_6C - fMC) + 8.7 \times fCr_7C_3 + CM_6C \times fM_6C + 14 \times fMC.$$

An addition amount of each alloy element is preferably obtained by calculation using the aforesaid equations.

In the present invention, each addition amount of Cr, Mo, W and V can be calculated using the aforesaid method by setting an amount of each carbide of adequate $fCr_7C_3$, $fM_6C$ and fMC within each range of CrMar of 6.5 to 12 wt %, MoMar+WMar of 2 to 4 wt % and V of 0 to 0.6 wt %.

In view of availability of raw powder of a ferrous sintered sliding material and economical efficiency, the raw powders are preferably used mixed at a specified mixing ratio. And, when Cr, Mo, W and V powder or high alloy powder are added to a base alloy steel powder of a ferrous sintered sliding material for preparation of a composition of the material, $Cr_7C_3$-type carbide, $M_6C$-type carbide and MC-type carbide, which are coarsened to an average grain size of 40 μm or more, can be easily precipitated. In order to improve abrasion resistance and seizing resistance, one or more such coarse carbides are preferably precipitated and dispersed in a content of 3% or more by volume.

In order to improve abrasion resistance and toughness of the ferrous sintered sliding material, a double layered sintered sliding material in which a ferrous sintered sliding material is sintering-bonded to a high hard ferrous back metal is developed, in which the ferrous sintered sliding material contains at least carbon of 0.8 to 3.4 wt %, Cr of 9 to 28 wt %, Mo of 5 wt % or more, Mo and W of 5 to 18 wt % and V of 0 to 5 wt % and has a structure in which martensite phase, having a solid soluble carbon concentration of 0.2 to 0.45 wt %, contains $Cr_7C_3$-type carbide in a content of 5 to 25% by volume, $M_6C$-type carbide in a content of 5 to 25% by volume and MC-type carbide in a content of 0 to 5% by volume dispersed and precipitated therein with a total content of the carbides being 10 to 40% by volume. Further, the ferrous sintered sliding material contains one or more elements of Si, Mn, Ni, P, S, B, N, Ti, Cu, Co and Al if necessary.

And, in order to improve abrasion resistance of a ferrous sintered sliding material further so as to be used in a floating seal, the ferrous sintered sliding material preferably contains at least carbon of 1.34 to 3.4 wt %, Cr of 11 to 28 wt %, Mo of 8 Wt % or more, Mo and W of 8 to 16 wt % and V of 1 to 5 wt % so as to contain $Cr_7C_3$-type carbide in a content of 10 to 25% by volume, MC-type carbide in a content of 0.5 to 5% by volume and $M_6C$-type carbide, excellent in seizing resistance, in a content of 10 to 20% by volume dispersed therein with a total content of the carbides being 20 to 40% by volume. And, for a ferrous sintered sliding material suitable used for a thrust bearing, the ferrous sintered sliding material preferably contains at least carbon of 0.8 to 2 wt %, Cr of 9 to 20 wt %, Mo of 4.5 wt % or more, Mo and W of 4.5 to 12 wt % and V of 1 to 4 wt % so as to contain $Cr_7C_3$-type carbide in a content of 5 to 10% by volume, MC-type carbide in a content of 0.5 to 5% by volume and $M_6C$-type carbide, excellent in seizing resistance, in a content of 5 to 10% by volume dispersed therein with a total content of the carbides being 10 to 20% by volume.

In order to improve abrasion resistance of the ferrous sintered sliding material further, a double layered sintered sliding material in which a ferrous sintered sliding material is sintering-bonded to a high hard ferrous back metal is developed, in which the ferrous sintered sliding material contains at least carbon of 1.5 to 3.2 wt %, Cr of 7 to 25 wt %, Mo of 3.5 wt % or more, Mo and W of 5 to 15 wt % and V of 3 to 8 wt % and has a structure in which martensite phase, having a solid soluble carbon concentration of 0.2 to 0.45 wt %, contains $Cr_7C_3$-type carbide in a content of 5 to 20% by volume, $M_6C$-type carbide in a content of 5 to 20% by volume and MC-type carbide in a content of 5 to 15% by volume dispersed and precipitated therein with a total content of the carbides being 15 to 50% by volume. Further, the ferrous sintered sliding material contains one or more elements of Si, Mn, Ni, P, S, B, N, Ti, Cu, Co and Al if necessary. In addition, in order to improve toughness, a total amount of the carbide is preferably adjusted to 15 to 35% by volume.

Ni, Mn and Cu contained in the ferrous sintered sliding material are austenite stabilized elements, described above, and therefore effective on lowering quenching temperatures, and also increases sintering ability. In addition, theses elements form retained austenite phase in a ferrous sintered sliding material and therefore improve conformability of a sliding surface thereof thereby to suppress occurrence of heat crack and to improve seizing resistance. However, excess addition of such elements increases retained austenite, resulting in deterioration in abrasion resistance. So, Ni is added in an amount of 1 to 5 wt % because it is expensive. Mn is added in an amount of 1 to 2 wt % because it easily blocks sintering ability. And, Cu is added in an amount of 0 to 10 wt % for improving sintering ability.

And, when Ni coexists with Al or Mo, age-hardening ability is demonstrated by tempering. In addition, when Cu is added coexistent with Ni, the age-hardening ability is promoted. So, such elements are positively added, preferably.

And, an addition of Co in an amount of 2 to 12 wt % moves magnetic transformation temperatures of martensite parent phase to higher so as to increase tempering-softening resistance of the martensite phase. And, an addition of Si in an amount of 0.5 to 3.5 wt % or an addition of Al in an amount of 0.2 to 2.0 wt % increases tempering-softening resistance of martensite phase. However, since Si decreases tempering-softening resistance demonstrated by Mo, W and V, Si is preferably added in an amount of 1.5 wt % or less.

Specifically, a ferrous sintered sliding material preferably contains one or more elements selected from the group consisting of Ni of 1 to 5 wt %, Mn of 1 to 2 wt %, Co of 2 to 12 wt % and Al of 0.2 to 1.5 wt %.

In a double layered sintered sliding member in which a ferrous sintered sliding material is sintering-bonded to a high hard ferrous back metal, the ferrous sintered sliding material is preferably densified to have a relative density of at least 95% or more so as to prevent leakage of gas or oil and also hardened after quenching to have a hardness of HRC55 or more. Preferably, the ferrous sintered sliding material is tightly combined to the back metal. So, a double layered sintering sliding member to which a ferrous sintered sliding material is sintering-bonded is developed, in which the ferrous sintered sliding material contains one or more compounds selected from the group consisting of $Fe_3P$, $Cr_2P$, FeMoP, $V_2P$ and FeTiP dispersed therein in a content of 10% or less by volume by adding one or more elements of P of 0.1 to 1.5 wt % and B of 0.01 to 0.2 wt %, in which such elements produce a sufficient amount of liquid phase component at the sintering-bonding.

An addition of P is effective on improvement in densification of the ferrous sintered sliding material and sintering-bonding ability. So, the lower limit of addition amount of P is set to 0.1 wt % at which improvement in sintering ability is demonstrated clearly. When P is added in an amount of 0.5 wt % or more, phosphide such as $Cr_2P$, FeMoP, $V_2P$ and FeTiP is precipitated and dispersed thereby to improve seizing resistance. However, excess addition of P embrittles the material. So, the upper limit of addition amount of P is set to 1.5 wt %.

And, as with P, an addition of B is effective on improvement in densification of the ferrous sintered sliding material and sintering-bonding ability. However, an addition of B in an amount of 0.2 wt % or more embrittles the material easily. So, an adequate addition range of B is set to 0.01 to 0.2 wt %.

In order to improve sintering-bonding ability and heat crack resistance, a double layered sintered sliding member is developed, in which the ferrous sintered sliding material contains soft Cu based alloy phase dispersed therein in granular form in a content of 1 to 10% by volume so as to increase conformability of a sliding surface thereof and form local oil pockets easily.

In order to improve sliding performance, the Cu based alloy preferably contains one or more elements of Sn, Al, Si, P, Fe, Ni and Ti in a total amount of 5 to 15 wt %.

And, a double layered sintered sliding material improved in seizing resistance of a ferrous sintered sliding material is developed, in which the ferrous sintered sliding material contains at least one of Mo metal particles, W metal particles and graphite particles dispersed therein a content of 1 to 10% by volume and the dispersed particles are surrounded with the Cu or the Cu alloy phase so as to demonstrate solid lubricating performance inherent in Mo and W.

The reason that at least either one of Mo or W coexists with Cu particles or Cu alloy particles is for preventing at least either one of Mo or W from being reacted with a ferrous sintered sliding material at sintering-bonding. In which case, the ferrous sintered sliding material is preferably prepared such that Cu element is adjusted to an approximate saturation. When such element will be partially reacted with a ferrous sintered sliding material, at least one carbide of $M_6C$-type carbide, $Mo_2C$-type carbide and MC-type carbide (WC) is selected for improvement in abrasion resistance.

Furthermore, a double layered sintered sliding member to which a ferrous sintered sliding material is tightly sintering-bonded is developed, in which the ferrous sintered sliding material is formed with closed pores having an average diameter of 0.03 to 3 mm scattered in a sliding surface thereof in a content of 1 to 10% by volume so as to improve lubricating ability of the sliding surface. The lower limit of content of the pores is set to 1% by volume at which the pores begin to work as oil pockets effectively. Since a large content of the pores embrittles the ferrous sintered sliding material, the upper limit of volume of the pores is set to 10% by volume. In view of a content of pores formed on a sliding surface of an oil retaining bearing, a content of pores is preferably adjusted to 3 to 10% by volume. An average size of the pores is adjusted depending on application of the double-layered sintered sliding member. For example, in the double layered floating seal, an average size of pores are adjusted to about ½ of the width of the sealing surface, preferably 1 mm or less, more preferably 0.5 mm or less.

One method for forming the closed pores having the aforesaid average size is follows: $SiO_2$, Ni oxide particles, Co oxide particles, Cu oxide particles, Fe oxide particles, Mo oxide particles and W oxide particles (empty particle and granular particle are possible) having an suitable size are mixed to a raw powder of the ferrous sintered sliding material in an suitable amount and then formed. Then, such oxide particles are carbothermically reduced at sintering and residual components forms a solid solution in the ferrous sintered sliding material, resulting in forming pores easily. Alternatively, SiC, Cu and resin having an average diameter of 0.1 to 1 mm are mixed to a raw powder of the ferrous sintered sliding material and formed. And then, such SiC, Cu and resin are allowed to form a solid solution or to disappear in the ferrous sintered sliding material at sintering, resulting in forming pores. $SiO_2$, Cu and resin are material easy to be worked into short fibers. The pores may be formed by using such short fibers. In this case, it is necessary that the pores be perfectly closed.

Dispersing the closed pores causes increasing cost of production. And, it is difficult to scatter the pores uniformly owing to segregation, resulting in lowering strength of the ferrous sintered sliding material. Consequentially, a double layered sintered sliding member to which a ferrous sintered sliding material is sintering-boded is developed, in which the ferrous sintered sliding material is formed with concave oil pockets on at least sliding surfaces thereof in an area ratio of 3 to 10%. In the double layered floating seal, the concave oil pocket preferably has a size of about ½ or less of a seal width, or 1 mm or less in the width direction (a width direction of the seal surface), more preferably 0.5 mm or less, for preventing oil leakage.

And, for forming carbide, Zr, Nb, Hf, Ta, Ca, S and N may be added in a necessary amount.

The ferrous sintered sliding material used is gas quenched at a quenching temperature of 1100° C. or less, more preferably 900 to 1000° C., lowered down from sintering-bonding temperatures. In order to recover toughness and flexural strength of martensite phase, the martensite is preferably tempered at 150 to 600° C. to turn tempered martensite phase.

In a case of a floating seal, when the ferrous sintered sliding material is tempered at high temperatures of 550 to 580° C. thereby to be hardened by secondary hardening to have a hardness of HRC65 or more, initial conformability of a sliding surface thereof is bad and therefore initial oil leakage is easy to occur. So, in the present invention, it is preferable to set the upper limit of tempering temperature to 500° C. or less. Accordingly, in the present invention, an after-mentioned method for producing a ferrous sintered sliding material is preferable from an economical viewpoint. After sintering-bonding, the double-layered sintered sliding material is maintained in a furnace at a temperature lowered down to 900 to 1100° C. and then gas-cooled so as to form martensite phase. And then, the double-layered sintered sliding material is tempered at 150 to 500° C. once.

As an amount of carbide in the ferrous sintered sliding material increases to 5% or more by volume, abrasion resistance and seizing resistance of the ferrous sintered sliding material are improved. However, increasing the amount of carbide necessarily results in decrease of strength and toughness of the material. Especially, in a case of a thrust bearing easy to be applied with an offset load, sufficient flexural strength and maximum flexural amount thereof are required. Specifically, it is required to have flexural strength of 400 MPa or more (breaking strength of a bonded surface; 200 MPa or more) and maximum flexural amount of 0.4 mm or more at the breaking. Accordingly, a total amount of the carbides in the ferrous sintered sliding material is adjusted to 30% or less by volume. And, the quenched ferrous sintered sliding material is preferably tempered at 100 to 600° C. once. In addition, from an economical viewpoint, a total amount of the carbides in the ferrous sintered sliding material is adjusted to 20% or less by volume.

A quenching treatment of the ferrous sintered sliding material after sintering-bonding is performed as below: after lowering temperature down to 1100° C. or less, or 900 to 1000° C. after sintering-bonding and maintaining the temperature, the ferrous sintered sliding material is quenched by gas-cooling to be hardened sufficiently. In such a case, the ferrous back metal preferably has a mixed composition of ferrite, perlite, bainite and martensite phase so as to prevent quenching crack and peeling of the ferrous sintered sliding material which is sintering-bonded to the back metal. And, the ferrous sintered sliding material preferably contains $Cr_7C_3$-type carbide, $M_6C$-type carbide and MC-type carbide dispersed therein in a total content of 5 to 25% by volume. However, when a counterpart to the ferrous sintered sliding material is made of a carburizing quenched material or an induction quenching material, in view of damage of the counterpart, it is more preferable to disperse the carbides in a total content of 5 to 15% by volume. And, in a case of a thrust bearing provided with a collar at one end of a cylindrical back metal, the cylindrical back metal is necessarily forced into a body of a working machine and tightly mounted thereto. Accordingly, the back metal preferably has Vickers hardness of at least Hv170 or more. And, in order for the back metal to have yield stress withstanding the lower limit of flexural strength of the ferrous sintered sliding material, the back metal is preferably formed by a steel hardened to Hv240 or more. And, when the ferrous sintered sliding material is formed with at least either one of closed pores or recesses in a sliding surface thereof in an area ratio of 1 to 10%, more preferably 3 to 10%, the closed pores or the recesses work as oil pockets (a portion in which lubricant is pooled) on the sliding surface so as to improve heat crack resistance.

In a case of a thrust bearing provided with a collar at one end of a cylindrical back metal, improving seizing resistance and heat crack resistance of a thrust surface thereof can extend a grease-lubricating interval to 500 hours or more. Accordingly, maintenance work of the thrust bearing is easier than that of conventionally used thrust bearings produced by an induction quenching method or a carburizing quenching method. And, since a cylindrical bushing (a bearing) is combined to an inner surface of the cylindrical back metal, it is necessary to extend a lubricating interval of the cylindrical bushing. So, a double layered sintered sliding material in which a cylindrical bushing is sintering-bonded and combined to an inner surface of a cylindrical back metal is developed, in which the cylindrical bushing is made of a permeable copper based or ferrous porous sintered sliding material which retains lubricating oil or lubricating compound of lubricating oil and wax filled in the pores. The porous sintered sliding material is not limited thereto and another porous sintered sliding material other than the copper based or the ferrous material may be used.

As with a thrust bearing, a bushing (a cylindrical bearing) equipped for a construction machine is used applied with an offset load. So, the copper based or the ferrous porous sintered sliding material retaining lubricating oil therein does not show sufficient seizing resistance and abrasion resistance. Consequentially, a double layered sintered bushing is developed, in which the double layered sintered bushing is formed such that the ferrous sintered sliding material for aforesaid thrust bearing is sintering-bonded and combined to an inner surface of a cylindrical ferrous back metal.

For a method for combining the ferrous sintered sliding material to the inner surface of the cylindrical ferrous back metal, a method for forcing and shrinkage fitting the ferrous sintered sliding material or a method for sintering-bonding simultaneously with being sintered is preferable. In a method for sintering-bonding simultaneously with being sintered, the ferrous sintered sliding material preferably contains one or more elements of Al, Cu, Sn, Ti and P.

As an amount of carbide in the ferrous sintered sliding material increases up to 5% or more by volume, abrasion resistance and seizing resistance thereof are improved. When the ferrous sintered sliding material is used in a floating seal for an oil seal device equipped for a reduction gear and a tracker roller of a construction machine, it is necessary to have sufficient abrasion resistance against sand or gravel and sufficiently improved seizing resistance. Accordingly, a total content of the carbides in the ferrous sintered sliding material is preferably set to 20 to 40% by volume, more preferably 25 to 40% by volume.

Example 1

Equilibrium Composition of Ferrous Sintered Sliding Material after Sintering

In this example, four kinds of mixed alloy powder (A to D), as shown in Table 1, were prepared in such a manner that Fe-0.6 wt % carbon-0.3 wt % Si-0.45 wt % Mn-15 wt % Cr-3 wt % Mo-1.2 wt % V alloy powder and Fe-0.6 wt % carbon-0.3 wt % Si-0.35 wt % Mn-9 wt % Cr-6 wt % Mo-4 wt % W-2 wt % V alloy powder and Fe-0.6 wt % carbon-0.3 wt % Si-4.5 wt % Cr-5 wt % Mo-6 wt % W-2 wt % V alloy powder were used mainly and each powder of Ni, Co, Si, FeAl and FeP each having a grain size under #350 mesh and graphite powder having an average grain size of 6 μm or less were mixed thereto. Then, each of the prepared mixed alloy powders to which paraffin wax of 3 wt % was added was press-formed at a pressure of 1.0 ton/cm$^2$ to prepared compacts each having a composition A, B, C and D. Next, the compacts having compositions A and B were vacuum sintered at 1190° C. for two hours, the compact having a composition C was vacuum sintered at 1135° C. for two hours, and the compact having a composition D was vacuum sintered at 1230° C. for two hours. Then, after cooling in the furnace down to 1000° C. and maintained for one hour, the compacts were cooling-quenched under nitrogen gas atmosphere at a pressure of 400 torr, and then abrasive machining was applied to a cut surface of each compact. The cut surface of each compact was analyzed by using an X-ray micro analyzer (EPMA) so as to obtain each concentration of alloy elements contained in martensite parent phase and contained in carbide precipitated in the martensite parent phase. The analysis is shown in Table 2.

The sintered alloy A and B are alloys in which Co of 3 wt % and Ni of 2 wt % or 4 wt %, respectively, are added to a 15Cr-3Mo based alloy enriched with Cr so that $Cr_7C_3$-type carbide comes to equilibrium with martensite phase (parent phase). The sintered alloy C is an alloy in which Cr, Mo and W are contained in an increased amount so that $Cr_7C_3$-type carbide and $M_6C$-type carbide come to equilibrium with martensite parent phase. The sintered alloy D is an alloy in which $M_6C$-type carbide and a small amount of MC-type carbide come to equilibrium with martensite parent phase.

In Table 2, columns of parent phase, $M_7C_3$ and $M_6C$ show concentrations of alloy elements contained in the parent phase and each carbide. And, KM7 shows a distribution coefficient of an alloy element M between $Cr_7C_3$-type carbide and the parent phase (an amount (wt %) of the alloy element in the $Cr_7C_3$-type carbide/an amount (wt %) of the alloy element in the parent phase), KM6 shows a distribution coefficient of an alloy element M between $M_6C$-type carbide and the parent phase (an amount (wt %) of the alloy element in the $M_6C$-type carbide/an amount (wt %) of the alloy element in the parent phase), and KMM/C shows a distribution coefficient of an alloy element M between MC-type carbide and the parent phase (an amount (wt %) of the alloy element in the MC-type carbide/an amount (wt %) of the alloy element in the parent phase). Comparison of such distribution coefficients of each alloy element shows characteristics of each alloy element.

Figure 13:
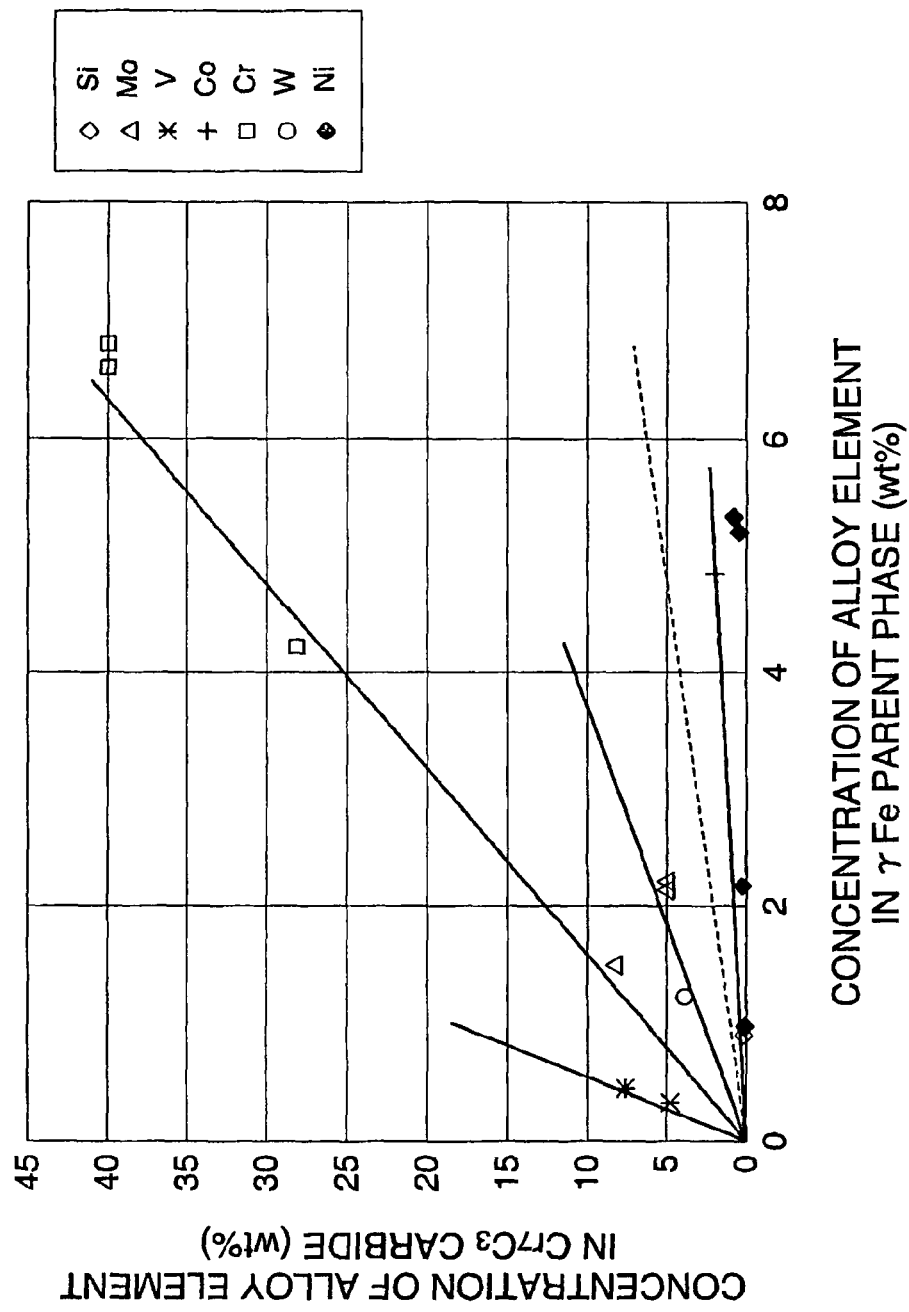
FIG. 13 is a graph showing a relation between concentrations of alloy elements contained in $Cr_7C_3$-type carbide and concentrations of alloy elements contained in a parent phase which comes to equilibrium with the $Cr_7C_3$-type carbide.
Figure 14:
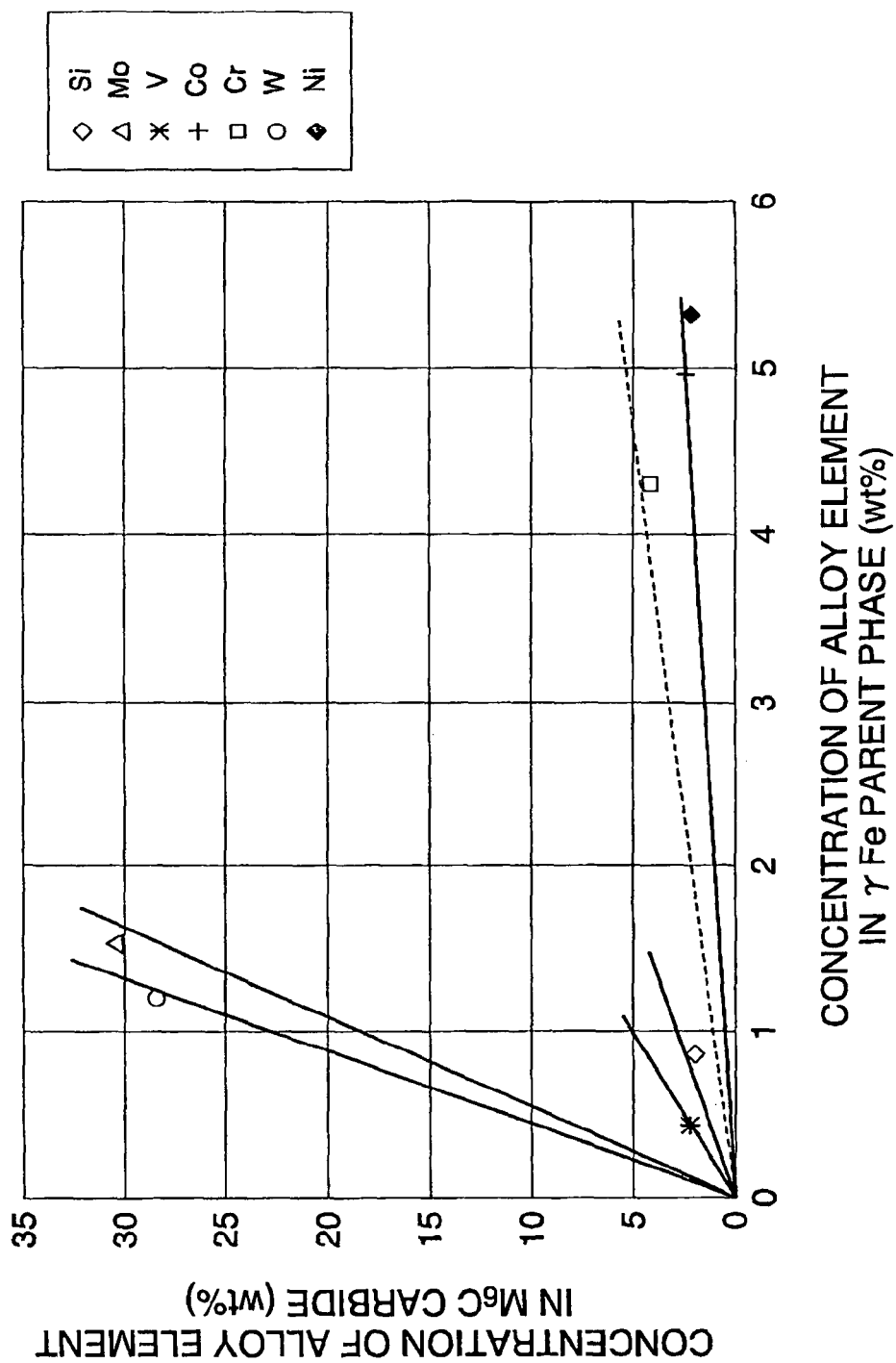
FIG. 14 is a graph showing a relation between concentrations of an alloy element contained in $M_6C$-type carbide and concentrations of alloy elements contained in a parent phase which comes to equilibrium with the $M_6C$ type carbide.

FIG. 13 is a graph showing a relation between concentrations of alloy elements contained in $Cr_7C_3$-type carbide and concentrations of alloy elements contained in a parent phase which comes to equilibrium with the $Cr_7C_3$-type carbide. And, FIG. 14 is a graph showing a relation between concentrations of an alloy element contained in $M_6C$-type carbide and concentrations of alloy elements contained in a parent phase which comes to equilibrium with the $M_6C$ type carbide. FIG. 13 and FIG. 14 show that each of the alloy elements is distributed at an almost fixed ratio therebetween and distribution coefficients of the alloy elements are invariable regardless of composition of the ferrous sintered sliding materials.

TABLE 1

|   | C | Si  | Al  | Mn  | Cr  | Mo | V   | W | Ni | Co | P    |
|---|---|-----|-----|-----|-----|----|-----|---|----|----|------|
| A | 3 | 0.6 | 0.7 | 0.4 | 15  | 3  | 1.3 | — | 2  | 3  | 0.25 |
| B | 3 | 0.6 | —   | 0.4 | 15  | 3  | 1.5 | — | 4  | —  | 0.25 |
| C | 3 | 0.6 | —   | 0.2 | 9   | 6  | 2   | 4 | 4  | —  | 0.3  |
| D | 3 | 0.3 | —   | 0.3 | 4.5 | 5  | 2   | 6 | —  | —  | 0.5  |

TABLE 3

| DISTRIBUTION COEFFICIENT | Si  | Cr   | Mo  | W    | V    | Ni   | Co   | P |
|---|-----|------|-----|------|------|------|------|---|
| KM7   | 0   | 8    | 2.5 | 2.5  | 13   | 0.1  | 0.23 | 0 |
| KM6   | 2.3 | 0.95 | 20  | 23   | 5.7  | 0.4  | 0.5  | 2 |
| KMM/C | 0   | 3.8  | 3   | 8.2  | 119  | 0.05 | 0.05 | 0 |

} 111.92

TABLE 2

|             | No. | PHASE, K     | C    | Si   | Al   | Cr   | Mo    | V     | W     | Ni   | Co   |
|-------------|-----|--------------|------|------|------|------|-------|-------|-------|------|------|
| PM15Cr3Mo3Co | A   | PARENT PHASE | 0.4  | 0.8  | 0.9  | 6.2  | 2.1   | 0.27  |       | 2.1  | 4    |
|             |     | M7C3         | 8.45 | 0.04 | 0.02 | 40   | 4.9   | 4.7   |       | 0.2  | 0.9  |
|             |     | KM7          |      | 0.05 | 0.02 | 6.45 | 2.33  | 17.41 |       | 0.10 | 0.23 |
| PM15Cr3Mo4Ni | B   | PARENT PHASE | 0.43 | 0.86 |      | 7.12 | 2.16  | 0.34  |       | 5.2  |      |
|             |     | M7C3         | 8.42 | 0.03 |      | 39.9 | 4.96  | 4.67  |       | 0.36 |      |
|             |     | KM7          |      | 0.03 |      | 5.60 | 2.30  | 13.74 |       | 0.07 |      |
| PM9Cr6Mo4W  | C   | PARENT PHASE | 0.44 | 0.85 |      | 4.27 | 1.52  | 0.37  | 1.23  | 5.33 | 4.96 |
|             |     | M7C3         | 7.61 | 0.04 |      | 27.7 | 3.72  | 6.79  | 3.61  | 0.49 | 1.2  |
|             |     | KM7          |      | 0.05 |      | 6.49 | 2.45  | 18.35 | 2.93  | 0.09 | 0.24 |
|             |     | M6C          | 1.85 | 2.02 |      | 4.08 | 30.3  | 2.1   | 28.4  | 2.11 | 2.46 |
|             |     | KM6          |      | 2.38 |      | 0.96 | 19.93 | 5.68  | 23.09 | 0.40 | 0.50 |
| PM4Cr5Mo6W2V | D   | PARENT PHASE | 0.25 |      |      | 2.75 | 1.34  | 0.41  | 1.57  |      |      |
|             |     | M6C          |      | 0.6  |      | 2.5  | 26.7  | 2.55  | 36.3  |      |      |
|             |     | KM6          | 2.40 |      |      | 0.91 | 19.93 | 6.22  | 23.12 |      |      |
|             |     | MC           | 0.01 |      |      | 14.7 | 5.02  | 46.1  | 14.4  |      |      |
|             |     | KMM/C        | 0.04 |      |      | 5.35 | 3.75  | 112.4 | 9.17  |      |      |

Table 3 shows distribution coefficients of each alloy element between each of $Cr_7C_3$-type carbide, $M_6C$-type carbide and MC-type carbide, which are used in the present invention, and austenite phase (martensite phase after quenching). By means of such distribution coefficients of the alloy elements, the following facts are shown quantitatively.

(1) Si and Al does not form a solid solution with $M_7C_3$-type carbide; almost all of Si and Al concentrate in martensite parent phase, enhancing tempering-softening resistance of the martensite phase.

parent phase contains $Cr_7C_3$-type carbide in a content of 8 to 18% by volume and MC-type carbide in a content of 7% or less by volume dispersed therein. Since a solid soluble carbon concentration of the martensite parent phase is high, heat crack resistance of the steel is insufficient compared with hot work tool steels (for example, SKD7, SKD6, SKD61 and SKD62) excellent in heat crack resistance. And also, in SKH steels (SKH2, SKH9), since a solid soluble carbon concentration of the martensite phase is high as 0.5 to 0.55 wt %, sufficient heat crack resistance cannot be achieved.

TABLE 4

| STEEL | | C | Si | Mn | Cr | Mo | W | V | Co | CARBIDE (% BY VOLUME) | | |
|---|---|---|---|---|---|---|---|---|---|---|---|---|
| | | | | | | | | | | Cr7C3 | M6C | MC |
| SKD1 | STEEL | 2.1 | 0.35 | 0.52 | 12.9 | | | | | 18% | | |
| 950° C. | PARENT PHASE | 0.7 | 0.43 | | 5.5 | | | | | | | |
| SKD2 | STEEL | 2.08 | 0.32 | 0.53 | 12.7 | | 2.7 | | | 17% | | |
| 950° C. | PARENT PHASE | 0.7 | 0.4 | | 5.5 | | 2.1 | | | | | |
| SKD11 | STEEL | 1.46 | 0.37 | 0.44 | 11.8 | 0.95 | | 0.31 | 3.48 | 10% | | |
| 1000° C. | PARENT PHASE | 0.65 | | | 7 | 0.8 | | 0.31 | 3.8 | | | |
| D7 | STEEL | 2.25 | 0.31 | 0.41 | 12.4 | 1.07 | | 4 | | 8% | | 7% |
| 1000° C. | PARENT PHASE | 0.7 | 0.4 | | 6.3 | 0.82 | | 0.33 | | | | |
| SKD12 | STEEL | 0.99 | 0.29 | 0.68 | 4.7 | 0.89 | | 0.39 | | 0% | | |
| 1000° C. | PARENT PHASE | 0.9 | 0.3 | | 4.5 | 0.89 | | 0.28 | | | | |
| SKD61 | STEEL | 0.38 | 1.02 | 0.36 | 4.8 | 1.2 | | 0.89 | | 0% | | |
| 1030° C. | PARENT PHASE | 0.38 | 1 | | 4.8 | 1.2 | | 0.89 | | | | |
| SKD62 | STEEL | 0.37 | 1.01 | 0.36 | 4.9 | 1.11 | 1.09 | 0.34 | | 0% | | |
| 1030° C. | PARENT PHASE | 0.37 | 1.01 | 0.36 | 4.9 | 1.11 | 1.09 | 0.34 | | | | |
| SKH2 | STEEL | 0.73 | 0.2 | 0.41 | 4.21 | 0 | 18.6 | 1 | | | 17% | |
| 1260° C. | PARENT PHASE | 0.55 | 0.16 | | 4.3 | 0 | 8.4 | 0.6 | | | | |
| SKH9 | STEEL | 0.89 | 0.26 | 0.42 | 4.49 | 4.73 | 6.72 | 2.5 | | | 10% | 1.30% |
| 1220° C. | PARENT PHASE | 0.5 | 0.21 | | 4.5 | 2.3 | 3 | 1.1 | | | | |

NOTE)
Cr7C3-type Carbide; 8.5 wt % C, (Fe, Mo)6C-type Carbide; 2.7 wt % C, (Fe, W)6C; 17 wt % C, MC-type Carbide; 14 wt % C (2) V concentrates in $M_7C_3$-type carbide in a larger amount than Cr, Mo and W and causes $Cr_7C_3$-type carbide to have a fine-grained structure. And, V hardly concentrates in $M_6C$-type carbide. In a steel comprising $M_6C$-type carbide and martensite phase, V is easily precipitated as MC-type carbide and therefore improves tempering-softening resistance of martensite phase.

(3) Mo and W concentrate in $M_6C$-type carbide more densely than $M_7C_3$-type carbide.

(4) Cr remarkably concentrates in $Cr_7C_3$-type carbide; it hardly concentrates in $M_6C$-type carbide.

(5) Ni and Co concentrate in a martensite parent phase more than each carbide.

And, using the distribution coefficients allows determining suitable concentrations of carbon and each alloy element in martensite phase in the present invention. And, by setting types and amounts of carbides dispersed therein, a suitable composition of a ferrous sintered sliding material can be obtained.

On the basis of distribution coefficients of the alloy elements, a composition of martensite and a content of carbide a typical SKD work steel or SKH work steel quenched from a typical quenching temperature can be analyzed from a composition of the steel. Table 4 shows a composition of the martensite phase of each quenched steel and a content of carbide dispersed in the steel. As shown in Table 4, the SKD steels (SKD1, SKD2, SKD11, D7 and SKD12, a quenching temperature; 950 to 1000° C.) have martensite parent phase prepared to contain Cr of 4.5 to 7 wt % and carbon of 0.65 to 0.9 wt % so as to have a structure in which the martensite In high-carbon and high-Cr based work steels such as SKD1, SKD2 and SKD11 quenched in a standard manner, $Cr_7C_3$-type carbide is dispersed and precipitated in martensite phase, which forms a solid solution with carbon of 0.5 to 0.7 wt %, in a content of 10 to 15% by volume. Therefore, heat crack resistance thereof is not sufficient because of the martensite having a high carbon concentration. Thus, in view of a phase diagram of a Fe—C—Cr ternary alloy at 900 to 1000° C. (FIG. 15, described later), which are adequate quenching temperatures of SKD steels, and an equilibrium relation (constant carbon activity) in the phase diagram, in this embodiment, a sintered sliding member to which a ferrous sintered sliding body is sintering-bonded is preferred, in which the ferrous sintered sliding body contains at least carbon of 0.9 to 3.8 wt %, Cr of 9 to 35 wt % and V of 0 to 3 wt % so that martensite phase, having a solid soluble carbon concentration of 0.2 to 0.45 wt %, a solid soluble Cr concentration of 6.5 to 12 wt % and a solid soluble V concentration of 0 to 0.6 wt %, contains $Cr_7C_3$-type carbide in a content of 5 to 40% by volume and MC-type carbide in a content of 0 to 5% by volume dispersed therein with a total content of the carbides being 5 to 40% by volume. In addition, amounts of Cr, V and carbon to added to the sintered sliding body are adjusted so that the following equation is satisfied: 0.143×Cr(wt %)−1.41+14×MC-type carbide (volume fraction)≦Carbon(t %)≦0.156×Cr(wt %)−0.58+14×MC-type carbide (volume fraction). Further, the ferrous sintered sliding body contains one or more elements selected from the group consisting of Si, Mn, Ni, P, S, B, N, Mo, W, Ti, Co, Cu and Al if necessary. Alternatively, an addition amount of carbon may be adjusted so that the following equation is satisfied: 0.143×Cr(wt %)−1.41+0.15×Si(wt %)+14×MC-type carbide (volume fraction)≦Carbon(t %)≦0.156×Cr(wt %)−0.58+0.15×Si (wt)+14×MC-type carbide (volume fraction), in exchange for adjusting addition amounts of Cr, V and carbon for satisfying the following equation:

0.143×Cr(wt %)−1.41+14×MC-type carbide(volume fraction)≦Carbon(t %)≦0.156×Cr(wt %)−0.58+ 14×MC-type carbide(volume fraction).

Accordingly, in order to demonstrate abrasion resistance equal to or more than that of SKD work steels, it is preferable to disperse carbide (for example, $Cr_7C_3$-type carbide) in a content of 10% or more by volume. For the purpose, a ferrous sintered sliding material preferably contains carbon of 1.05 to 3.8 wt % and Cr of 12 to 35 wt %. In order to improve abrasion resistance further, it is preferable to contain carbon of 1.45 to 3.8 wt % and Cr of 14 to 35 wt % so as to disperse $Cr_7C_3$-type carbide in a content of 15% or more by volume. When a ferrous sintered sliding material is used in a floating seal, an adequate wear life is required. So, it is preferable to contain carbon of 1.85 to 3.8 wt % and Cr of 16.5 to 35 wt % so as to disperse $Cr_7C_3$-type carbide in a content of 20% or more by volume. The upper limit of an amount of Cr to be added to a ferrous sintered sliding material is determined such that the upper limit of content of $Cr_7C_3$-type carbide to be dispersed is preferably 40% by volume in view of sufficient abrasion resistance and strength and economical efficiency.

In order to produce a ferrous sintered sliding material excellent in heat crack resistance equal to that of hot work steels, at least, martensite phase preferably has a solid soluble carbon concentration of 0.45 wt % or less, more preferably 0.35 wt % or less. So, in order to increase heat crack resistance, the upper limit of solid soluble carbon concentration in martensite phase is preferably adjusted to 0.35 wt %. For adjusting a solid soluble carbon concentration to 0.35 wt %, the upper limit of addition amount of carbon is shown by the following equation:

Carbon(wt %)≦0.156×Cr(wt %)−0.68+14×MC-type carbide(volume fraction).

Such fact corresponds to a fact that carbon steel or alloy steel having a solid soluble carbon concentration of 0.5 wt % or less is selected for an induction quenching method in which quenching crack may be troubling issue.

In a ferrous sintered sliding material comprising $Cr_7C_3$-type carbide and martensite phase mainly, in a case in which quenching temperature after sintering-bonding is set to 900 to 1000° C., in order to adjust a solid soluble carbon concentration in martensite phase to 0.2 to 0.45 wt %, an adequate amount (wt %) of carbon to an amount of Cr in a ferrous sintered sliding material, which is shown in a range between Tie-Lines A and B in a phase diagram of a Fe—C—Cr ternary alloy at 900° C. (FIG. 15), is shown by the following equation:

0.143×Cr(wt %)−1.41≦Carbon(wt %)≦0.156×Cr(wt %)−0.58.

Figure 15:
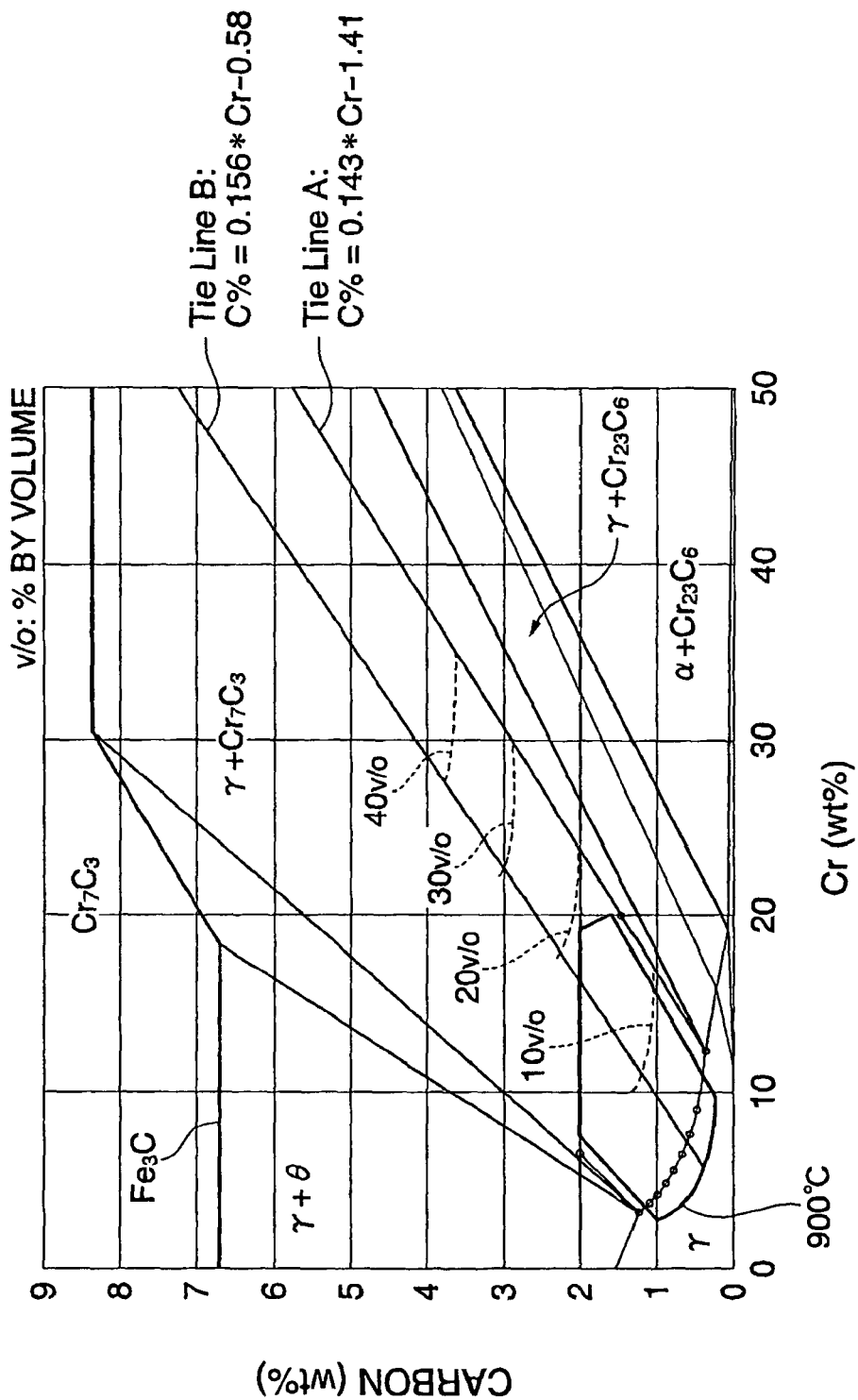
FIG. 15 is a phase diagram of a Fe—C—Cr ternary alloy.

In FIG. 15, compositions for dispersing $Cr_7C_3$-type carbide in a content of 10, 20, 30 and 40% by volume are represented by broken lines. For dispersing $Cr_7C_3$-type carbide in a content of 10% by volume, Cr(wt %)≧10 wt %, and for dispersing $Cr_7C_3$-type carbide in a content of 40% or less by volume, Cr(wt %)≦35 wt %.

As described in Japanese Patent Application No. 2002-380203 proposed by the inventors, increasing tempering-softening resistance of martensite phase remarkably improves seizing resistance and abrasion resistance of a sliding surface exposed to sand or gravel under a lubricating boundary condition. And, it is preferable to maintain hardness of HRC50 or more, more preferably HRC55 or more, even if tempered at 600° C. In addition, alloy compositions are preferably designed in such a manner that concentration of each alloy element which form a solid solution with martensite phase having a solid soluble carbon concentration of 0.15 to 0.45 wt % are applied to the aforesaid equation for obtaining tempering-softening parameter ΔHRC.

Figure 16:
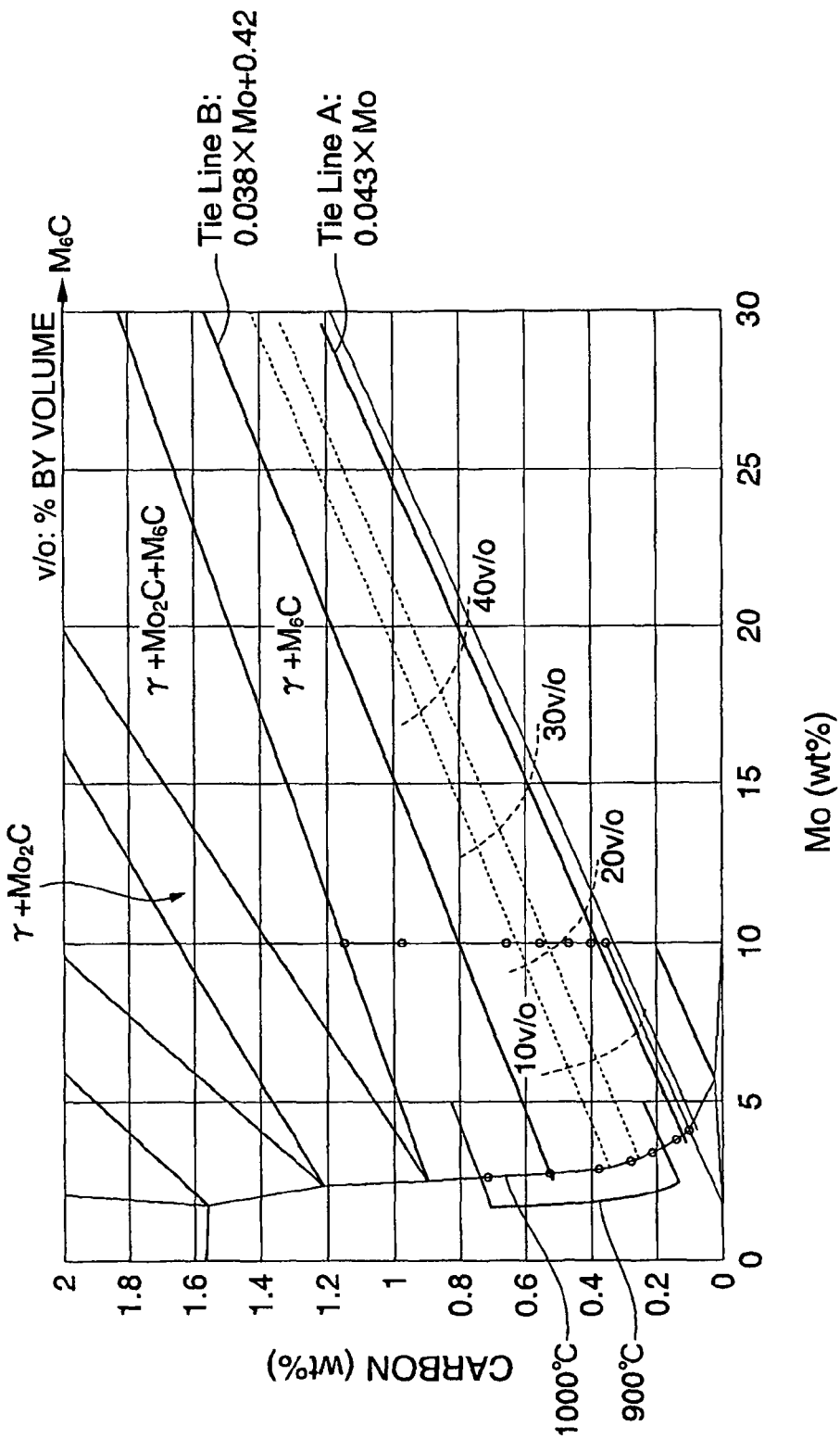
FIG. 16 is a phase diagram of a Fe—C—Mo ternary alloy.

In view of FIG. 16 (a phase diagram of a Fe—C—Mo ternary alloy), a maximum Mo solid solubility at which $Fe_6C$ or $Mo_6C$-type carbide is hardly dispersed and precipitated is about 4 wt % (at 900, 1000° C.). And, in view of Mo concentrated in $Cr_7C_3$-type carbide dispersed in a content of 10 to 40% by volume, a suitable addition amount of Mo is 0.6 to 6.5 wt %.

Figure 17:
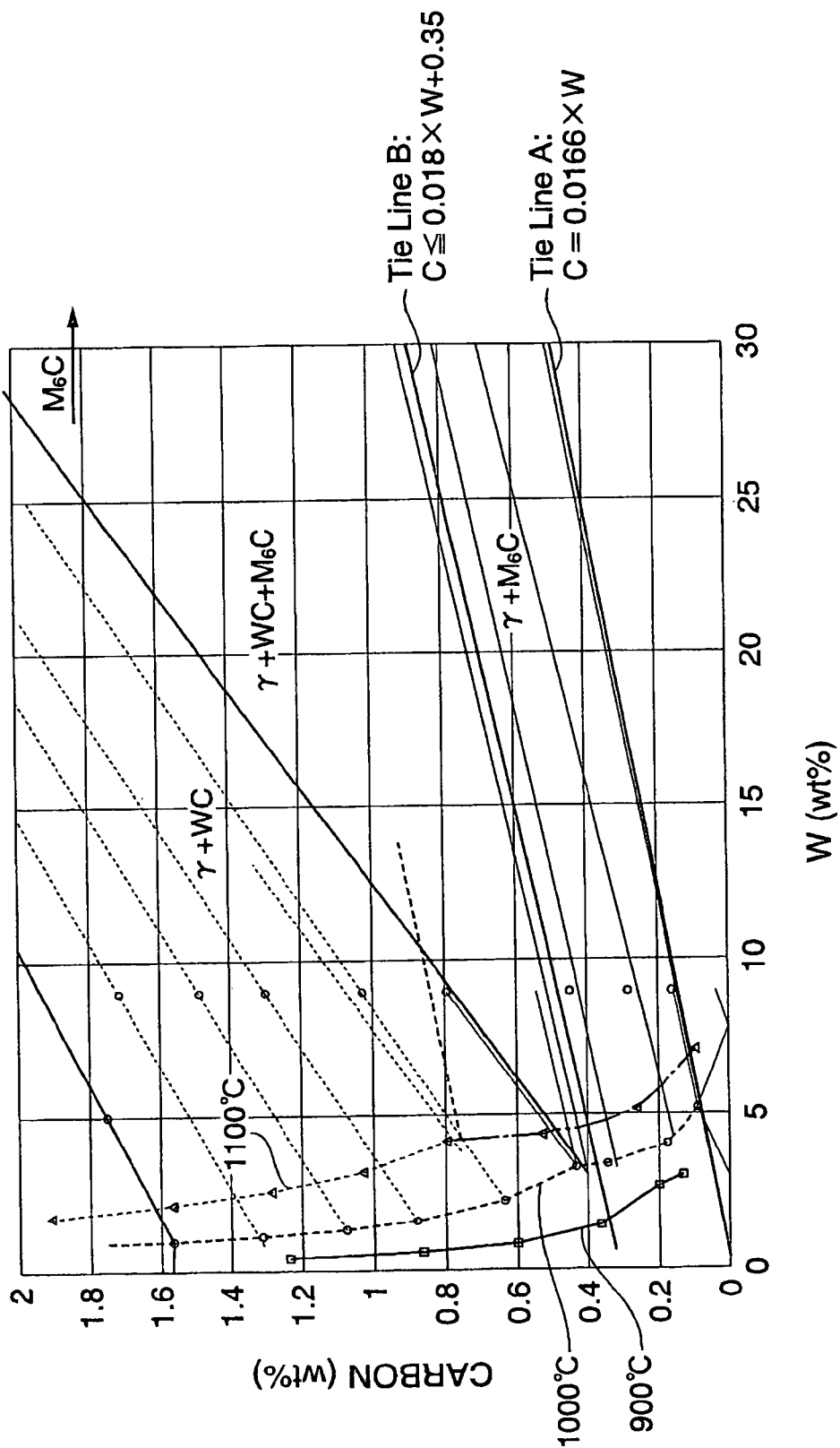
FIG. 17 is a phase diagram of a Fe—C—W ternary alloy.

In view of FIG. 17 (a phase diagram of a Fe—C—W ternary alloy), the same discussion as the above description is applied to W. As a result, an amount of each of Mo and W added to a ferrous abrasion resistant sliding material is 0.6 to 7 wt %. Especially, from an economical standpoint, a maximum solid soluble amount of each of Mo and W with a matrix phase is set to 2.5 wt % or less, in which case tempering-softening resistance is efficiently enhanced, so that each addition amount of Mo and W is preferably maintained as small as 4 wt % or less. This is preferred from an economical viewpoint.

As described above, since V concentrates in $Cr_7C_3$-type carbide and therefore an amount of V remained in martensite phase decreases remarkably, it is not preferred as an element which increases tempering-softening resistance of the martensite phase. However, V works to turn $Cr_7C_3$-type carbide into a fine-grain structure. Accordingly, to a ferrous sintered sliding material in which martensite phase forms a solid solution with V in a maximum amount of 0.5 wt %, V is added in an amount of 1.1 to 3.9 wt % ($Cr_7C_3$-type carbide in a content of 10 to 40% by volume). And, in a ferrous sintered sliding material in which $Cr_7C_3$-type carbide is dispersed mainly, it is preferable from an economical viewpoint to maintain an addition amount of V to 4 wt % or less.

In a SKH based sintered sliding material in which MC-type carbide, in addition to $M_6C$-type carbide, are dispersed, a solid soluble carbon concentration of martensite phase of the sintered sliding material is reported in "J. Japan Inst. Metals" 2 (1963), P 564, FIG. 3, "Carbon Concentration in Matrix Changed Accompanied with a Solid Solution of Carbide". The report recommends that in order to regulate a solid soluble concentration of carbon in the martensite to be 0.4 wt % or less easily, a quenching temperature after sintering-bonding is set to the range within 900 to 1100° C., which is lower than quenching temperatures of a conventional SKH high speed steel of 1200 to 1350° C. Quenching in such lower temperatures is one of the features of the present invention.

Furthermore, the same discussion as the above description of a phase diagram of a Fe—C—Cr ternary alloy is applied to a phase diagram of a Fe—C—Mo ternary alloy as shown in FIG. 16 and a phase diagram of a Fe—C—W ternary alloy as shown in FIG. 17. In these figures, Tie-lines A and B, which pass 0.15 wt % and 0.4 wt %, respectively, of a solid soluble carbon concentration of martensite phase equilibrium with $M_6C$-type carbide, are represented as mathematical formulas. Comparison the Tie-line of a Fe—C—Mo ternary alloy with the Tie-line of a Fe—C—W ternary alloy shows that a gradient of the Tie-line of a Fe—C—W ternary alloy is about half of a gradient of the Tie-line of a Fe—C—Mo ternary alloy, and an amount (wt %) of Mo in the martensite phase of the Fe—C—Mo ternary alloy equilibrium with $M_6C$-type carbide is almost equal to an amount (wt %) of W in the martensite phase of the Fe—C—W ternary alloy equilibrium with $M_6C$-type carbide. So, when Mo is added coexistent with W, an equilibrium relation between compositions of $M_6C$-type carbide and martensite phase is shown as $0.5 \times W(wt\%) = Mo(wt\%)$ from the phase diagram of a Fe—C—Mo ternary alloy. And, from the mathematical formulas of the Tie-lines A and B, a suitable concentration (Cwt%) of carbon in a ferrous sintered sliding material is simply shown in the following equation:

$$0.043 \times (Mo(wt\%)+0.5 \times W(wt\%)) \leq Carbon(wt\%) \leq 0.038 \times (Mo(wt\%)+0.5 \times W(wt\%))+0.33.$$

In view of MC-type carbide, it is possible that a content of carbon in a ferrous sintered sliding material (a ferrous sintered sliding body) is within a range shown in the following equation:

$$0.043 (\text{more preferably } 0.05) \times (Mo(wt\%)+0.5 \times W(wt\%))+14' MC\text{-type carbide(volume fraction)} \leq Carbon(wt\%) \leq 0.038 \times (Mo(wt\%)+0.5 \times W(wt\%))+ 0.33+14 \times MC\text{-type carbide(volume fraction)}.$$

Furthermore, in view of $Cr_7C_3$-type carbide, it is possible that a content of carbon in a ferrous sintered sliding material (a ferrous sintered sliding body) is within a range shown in the following equation:

$$0.043 \times (Mo(wt\%)+0.5 \times W(wt\%))+8.5 \times Cr_7C_3\text{-type carbide(volume fraction)}+14 \times MC\text{-type carbide(volume fraction)} \leq Carbon(wt\%) \leq 0.038 \times (Mo(wt\%)+0.5 \times W(wt\%))+0.33+8.5 \times Cr_7C_3\text{-type carbide(volume fraction)}+14 \times MC\text{-type carbide(volume fraction)}.$$

In view of theses results, it is preferable from an economical viewpoint to add Mo positively with maintaining an addition amount of W as small as possible. And, for the purpose for enhancing sinterability of a ferrous sintered sliding material and tempering-softening resistance of martensite phase thereof, it is preferable to add Mo mainly and W is not necessarily added.

And, it becomes possible to calculate a suitable composition of a ferrous sintered sliding material by setting concentrations of carbon and alloy elements in martensite phase and also amount of $M_6C$-type carbide to be dispersed by means of distribution coefficients KM6 of alloy elements such as Mo, W and Cr.

Example 2

Figure 18:
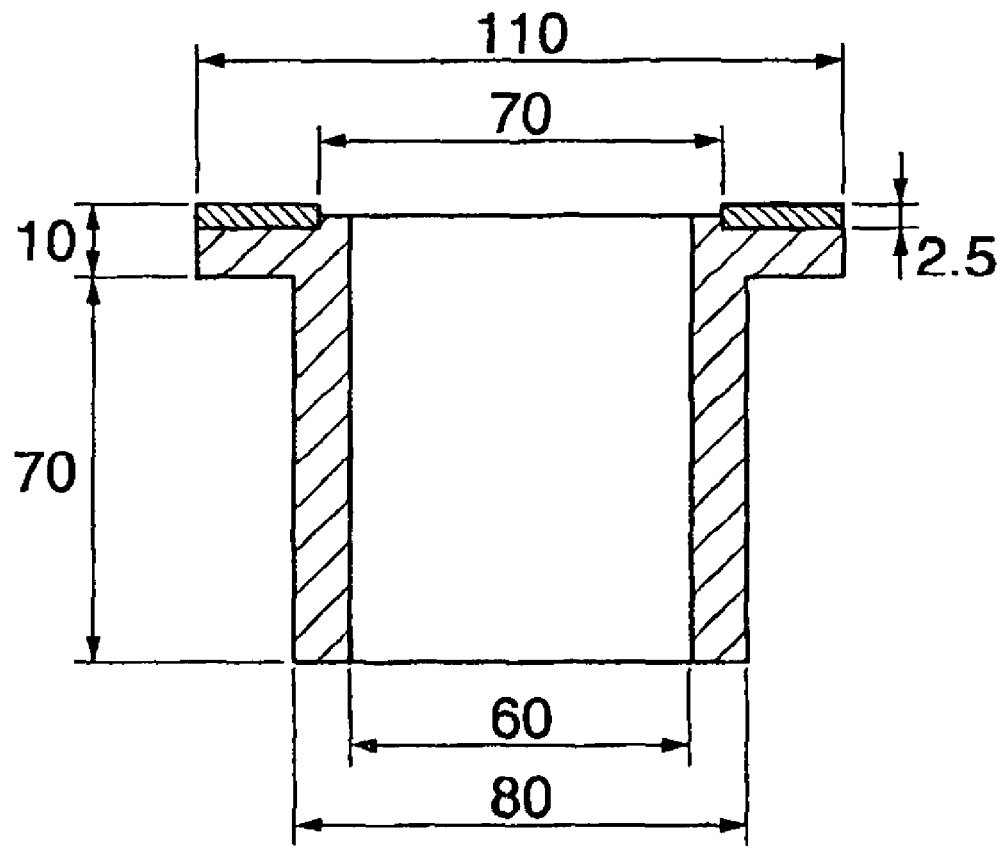
FIG. 18 is a cross sectional view showing a shape of specimen of a thrust bearing with collar.
Figure 19A:
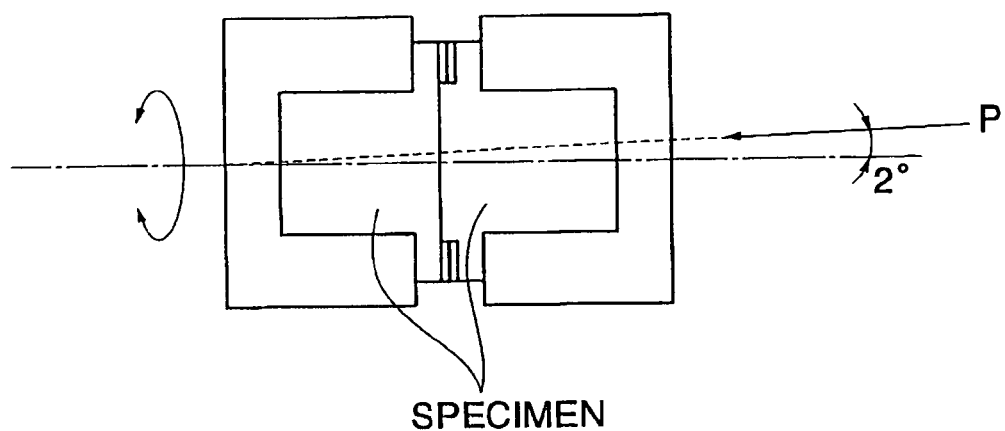
FIGS. 19A and 19B show an oscillating tester.
Figure 19B:
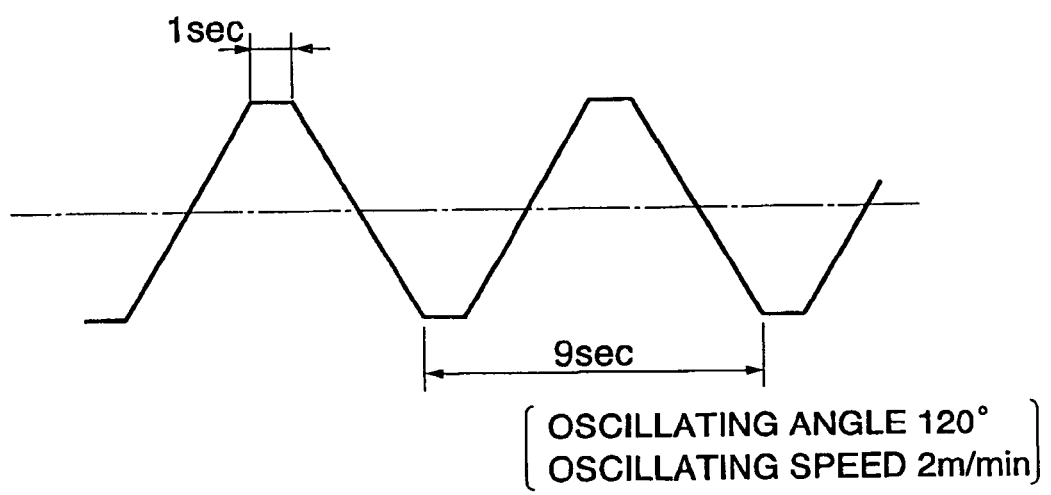

Sintering Bonding Test of Ferrous Sintered Sliding Material and Sliding Property Thereof FIG. 18 is a cross sectional view showing a shape of specimen of a thrust bearing with collar and FIGS. 19A and 19B show an oscillating tester.

In this example, a thrust bearing with a collar shown in FIG. 18 was prepared for an oscillating test using an oscillating tester shown in FIG. 19. The oscillating test was performed in such a manner that one pair of specimens were contacted with sliding surfaces thereof being faced each other and a rotating axis of one specimen being kept at an oblique angle of 2° with respect to the other specimen. And, the former specimen was oscillated around its rotating axis in both directions with applying a load (P) in an oscillating cycle, shown in FIG. 19B (an abscissa axis: period, a longitudinal axis: angle), in which an oscillating angle was 120° and an oscillating speed was 2 m/min. In this example, each specimen was kept at a biased contacting state (an oblique state) and oscillated being applied with a load, each of which was incremented by 1 ton every 500 times oscillation. The heat crack resistance and the seizing resistance were evaluated by using a load when heat crack or seizing occurred. For comparative specimens, thrust bearings made of conventionally quenched and tempered SUJ2, SKD6, SKD11 and SKH9, and SCM420H steel which was carburizing-quenched and tempered at 930° C. so as to have a surface carbon concentration of 0.8 wt %, were prepared.

Each of ferrous sintered sliding bodies shown in Table 5 and Table 6 was sintering-bonded to a collar of S50C carbon steel at 1130 to 1280° C. and then examined in sintering bonding ability thereof using an ultrasonic flaw detection method. No. 20 to No. 30 ferrous sintered sliding materials shown in Table 5 comprises No. 16 alloy steel powder mainly, to which Cu under #200 mesh, Cu-10 wt % Sn, Fe25 wt % P, Cu8 wt % P, $SiO_2$ milled powder, Si powder under #300 mesh, Cr powder under #300 mesh, Mo, Ni, Co, $Si_3N_4$, graphite (KS6, manufactured by RONZA) powder, each having an average grain size of 6 μm, and Mo/Cu plated particles and graphite/Cu plated particles, each having an average grain size of 0.03 to 0.5 mm, were added in suitable amounts.

TABLE 5

| Composition of Sintered Sliding Material in Example 2 | | | | | | | | | | | | | |
|---|---|---|---|---|---|---|---|---|---|---|---|---|---|
| | C | Si | Mn | Ni | Cr | Mo | W | V | Fe25P | Si3N4 | Co | Cu | Cu10Sn |
| No. 1 | 0.6 | 2 | 0.37 | | 2.5 | 1 | | 0.4 | 3.5 | | | | |
| No. 2 | 1.3 | 0.24 | 0.35 | | 2.5 | 1 | | 4.5 | 4 | | | | |
| No. 3 | 1.95 | 0.24 | 0.35 | | 2.5 | 1 | | 8.5 | 4.5 | | | | |
| No. 4 | 1.2 | 0.22 | 0.33 | | 2.5 | 3 | | 4.5 | 4 | | | | |
| No. 5 | 1.2 | 0.24 | 0.34 | | 6 | 1 | | 4.5 | 4 | | | | |
| No. 6 | 1.1 | 0.24 | 0.35 | | 2.5 | 1 | | 4.5 | 6.5 | 2.5 | | | |
| No. 7 | 1 | 0.28 | 0.36 | | 8 | 1.5 | | 0.4 | 2 | | | | |
| No. 8 | 1.5 | 0.28 | 0.36 | | 8 | 1.5 | | 0.4 | 1 | | | | |
| No. 9 | 1 | 3.5 | 0.36 | | 8 | 1.5 | | 0.4 | 2 | 2.5 | | | |
| No. 10 | 1.5 | 0.5 | 0.34 | | 12 | 1 | | 0.5 | 1 | | | | |
| No. 11 | 1.5 | 0.5 | 0.34 | | 12 | 1 | | 0.5 | 2 | | | | |
| No. 12 | 1.2 | 0.5 | 0.34 | | 12 | 5 | | 0.5 | 2 | | | | |
| No. 13 | 2.5 | 0.5 | 0.34 | | 12 | 1 | | 2 | 1 | | | | |
| No. 14 | 1.5 | 0.5 | 0.34 | | 15 | 1 | | 2.5 | 1 | | | | |
| No. 15 | 2.4 | 0.5 | 0.34 | | 15 | 1 | | 5 | 2 | | | | |
| No. 16 | 3 | 0.6 | 0.37 | 2 | 15 | 3 | | 1.3 | 1 | | | | |
| No. 17 | 1.5 | 0.6 | 0.37 | 2 | 15 | 3 | | 1.3 | 1 | | | | |
| No. 18 | 1 | 0.6 | 0.37 | 2 | 15 | 3 | | 1.3 | 2 | | | | |
| No. 19 | 2 | 2.5 | 0.37 | 2 | 15 | 3 | | 1.3 | 1 | | | | |
| No. 20 | 3 | 0.6 | 0.32 | | 25 | | | 2.5 | 0.5 | | | | |
| No. 21 | 3 | 0.6 | 0.32 | 2 | 30 | 3 | | 1.3 | 0.5 | | | | |
| No. 22 | 2.5 | 0.6 | 0.37 | | 15 | 12 | 3.5 | 3 | | | | | |

TABLE 5-continued

Composition of Sintered Sliding Material in Example 2

| | | | | | | | | | | | | |
|---|---|---|---|---|---|---|---|---|---|---|---|---|
| No. 23 | 2.5 | 0.6 | 0.32 | 4 | 15 | 12 | 3.5 | 3 | | | 6 | |
| No. 24 | 3 | 0.6 | 0.37 | 2 | 15 | 3 | | 1.3 | 1 | | | 10 |
| No. 25 | 3 | 0.6 | 0.37 | 2 | 15 | 3 | | 1.3 | 1 | | | 10 |
| No. 26 | 3 | 0.6 | 0.37 | 2 | 15 | 3 | | 1.3 | | | | |
| No. 27 | 2 | 0.6 | 0.37 | 2 | 15 | 3 | | 1.3 | 1 | | | |
| No. 28 | 2 | 1.77 | 0.37 | 2 | 15 | 3 | | 1.3 | 1 | 2.5 | | |
| No. 29 | 2 | 0.6 | 0.37 | 2 | 15 | 3 | | 1.3 | 1 | | | 5 |
| No. 30 | 2 | 0.6 | 0.37 | 2 | 15 | 3 | | 1.3 | 1 | | | 5 |
| No. 31 | 1.2 | 0.23 | 0.29 | | 4.5 | 5.1 | 6.2 | 2 | | | | |

| | Cu8P | SiO2 | Gr/Cu | Mo/Cu | BONDING RATE | WITHSTANDING LOAD | PV VALUE |
|---|---|---|---|---|---|---|---|
| No. 1 | | | | | 96% | 9 | 2.4 |
| No. 2 | | | | | 98% | 15 | 3.1 |
| No. 3 | | | | | 99% | 23 | 4.6 |
| No. 4 | | | | | 99% | 19 | 4 |
| No. 5 | | | | | 99% | 16 | 3.4 |
| No. 6 | | | | | 98.5% | 16 | |
| No. 7 | | | | | 86% | 13 | |
| No. 8 | | | | | 95% | 7 | |
| No. 9 | | | | | 98% | 17 | |
| No. 10 | | | | | 97% | 13 | |
| No. 11 | | | | | 99% | 15 | 3.1 |
| No. 12 | | | | | | 19 | 3.8 |
| No. 13 | | | | | 99% | 7 | 2 |
| No. 14 | | | | | | 19 | 4.1 |
| No. 15 | | | | | | 24 | 4.8 |
| No. 16 | | | | | 99% | 7 | 2.1 |
| No. 17 | | | | | 99% | 16 | 3.3 |
| No. 18 | | | | | 98% | 19 | 3.8 |
| No. 19 | | | | | 87% | 18 | 3.4 |
| No. 20 | | | | | 98% | 24 | 4.8 |
| No. 21 | | | | | | 29 | 5 |
| No. 22 | | | | | | 33 | 5.7 |
| No. 23 | | | | | | 37 | 6.2 |
| No. 24 | | | | | 99% | 10 | 2.8 |
| No. 25 | | | | | 99% | 14 | 3.5 |
| No. 26 | 10 | | | | 99% | 10 | 2.9 |
| No. 27 | | | | | 97% | 20 | 3.2 |
| No. 28 | | 2.5 | | | 98% | 26 | 5.2 |
| No. 29 | | | 1 | | 99% | 28 | 4.8 |
| No. 30 | | | | 10 | 99% | 25 | 4.7 |
| No. 31 | | | | | 93% | 11 | 2.5 |

TABLE 6

Composition of Sintered Sliding Material in Example 2

| | C | Si | Mn | Ni | Cr | Mo | W | V | Fe25P | Si3N4 | Co | Cu | Cu10Sn |
|---|---|---|---|---|---|---|---|---|---|---|---|---|---|
| No. 32 | 0.9 | 0.23 | 0.29 | | 4.5 | 5.1 | 6.2 | 2 | 2 | | | | |
| No. 33 | 0.9 | 0.23 | 0.29 | | 4.5 | 5.1 | 6.2 | 2 | 4 | | | | |
| No. 34 | 1.2 | 0.23 | 0.29 | | 2 | 10 | 6.2 | 2 | 2 | | | | |
| No. 35 | 1 | 0.25 | 0.31 | | 4 | 12 | | 2 | 1 | | | | |
| No. 36 | 1.7 | | | | 4 | 12 | | 6 | 2 | | | | |
| No. 37 | 3 | 0.6 | 0.21 | 0 | 9 | 6 | 4 | 2 | 1 | | | | |
| No. 38 | 1.5 | 0.6 | 0.21 | 0 | 9 | 6 | 4 | 2 | 2 | | | | |
| No. 39 | 1.5 | 0.6 | 0.21 | 4 | 9 | 6 | 4 | 2 | 1 | | | | |
| No. 40 | 1.1 | 0.24 | 0.35 | | 2.5 | 1 | | 4.5 | 4.8 | | | | |
| SUJ2 | | | | | | | | | | | | | |
| SKD6 | | | | | | | | | | | | | |
| SKD11 | | | | | | | | | | | | | |
| SKH9 | | | | | | | | | | | | | |
| CARBURIZED SCM420H | | | | | | | | | | | | | |
| FC15Cr3Mo | | | | | | | | | | | | | |
| FC9Cr6Mo | | | | | | | | | | | | | |

| | Cu8P | SiO2 | Gr/Cu | Mo/Cu | BONDING RATE | WITHSTANDING LOAD | PV VALUE |
|---|---|---|---|---|---|---|---|
| No. 32 | | | | | 99% | 20 | 3.9 |
| No. 33 | | | | | 99% | 24 | 4.8 |
| No. 34 | | | | | | 31 | 5.6 |

TABLE 6-continued

Composition of Sintered Sliding Material in Example 2

| | | | |
|---|---|---|---|
| No. 35 | 97% | 26 | 4.9 |
| No. 36 | 99% | 30 | 5.5 |
| No. 37 | 99% | 11 | 2.4 |
| No. 38 | 99% | 26 | 4.4 |
| No. 39 | 99% | 27 | 4.8 |
| No. 40 | 99% | 13 | 2.9 |
| SUJ2 | | 5 | |
| SKD6 | | 9 | |
| SKD11 | | 6 | 1.6 |
| SKH9 | | 8 | 2.2 |
| CARBURIZED SCM420H | | 4 | 1.3 |
| FC15Cr3Mo | | | 1.6 |
| FC9Cr6Mo | | | 1.8 |

And, each material, shown in Table 5 and Table 6, to which wax of 3 wt % was added were mixing-granulated at 100° C. for 10 minutes using a high-speed mixer. Then, each granulated material was formed on a doughnut-shaped plate on an upper surface of the thrust bearing with a collar, shown in FIG. 18, at a press pressure of 1 ton/cm² and sintering-bonded thereto at the aforesaid sintering temperature using a vacuum incinerator. After cooling in the incinerator down to 960° C., each compact was cooling quenched with $N_2$ gas at 500 torr and then tempered at 200° C. for two hours.

Table 5 and Table 6 show sintering-bonding rate and loads when heat crack or seizing occurs.

No. 1 to No. 6 alloys are alloys in which P is contained in a large amount of 0.9 to 1.6 wt % so as to improve sintering ability of a ferrous sintered sliding material and sintering-bonding ability thereof to a steel back metal, and martensite phase has a lowered solid soluble carbon concentration and contains MC-type carbide and $Si_3N_4$ dispersed and precipitated therein by addition of V. Comparison of the No. 1 alloy (a solid soluble carbon concentration; 0.6 wt %) with No. 2, No 4 and No. 5 alloys shows that dispersion of MC-type carbide and $Si_3N_4$ improves heat crack resistance remarkably. And, comparison of the No. 2 alloy with No. 4 and No. 5 alloys shows that increasing concentrations of Mo and Cr in martensite phase improves tempering-softening resistance and thus heat crack resistance remarkably.

Furthermore, comparison of the No. 1 and No. 2 alloys containing phosphor compound, such as $Fe_3P$ and $V_2P$, dispersed therein, with SUJ2, SKD6, SKD11, SHH9 and carburizing-quenching steel shows that dispersing phosphor compound and MC-type carbide and lowering a solid soluble carbon concentration in martensite improve heat crack resistance remarkably.

In addition, comparison of No. 7 to No. 23 alloys shows that the alloys other than No. 8, No. 10, No. 13 and No. 16 alloys each having a solid soluble carbon concentration in martensite of 0.5 wt % or more are improved in heat crack resistance. And, No. 20 and No. 21 alloys having increased amount of $Cr_7C_3$-type carbide are improved in heat crack resistance. Comparison No. 17 alloy with No. 19 alloy shows that an addition of Si decreases a solid soluble carbon concentration in martensite thereby to improve heat crack resistance. And, in No. 14 and No. 15 alloys, lowering a solid soluble carbon concentration in martensite phase and increasing a content of MC-type carbide to be dispersed improve heat crack resistance. In No. 22 alloy, dispersing $M_6C$-type carbide by addition of Mo and W improves heat crack resistance. Further, in No. 23 alloy, addition of Ni and Co improves heat crack resistance remarkably.

The No. 16 alloy has been used in a standard material excellent in corrosion resistance and abrasion resistance for a sintered sliding material used in a floating seal. No. 24 to No. 26 alloys are alloys in which the No. 16 alloy (a solid soluble carbon concentration in martensite is 0.9 wt %) contains Cu particles or Cu alloy particles dispersed therein. Addition of the Cu particles or the Cu alloy particles does not cause disadvantage in sintering ability and sintering bonding ability. Comparison of the No. 24 to No. 26 alloys with the No. 16 alloy shows that the No. 24 to No. 26 alloys are improved in heat crack resistance remarkably. As shown in FIG. 20A showing a structure of the No. 25 alloy, Cu particles are dispersed in a granular form. Such configuration is preferred to improve conformability at sliding. The No. 25 alloy to which Cu 10 wt % Sn alloy is added is more effective for heat crack resistance. In which case, the Cu particles dispersed therein preferably contain one or more alloy elements of Sn, Ni, Ti and P, which are positively added to a copper based sliding material, in an amount of 5 to 15 wt %.

No. 27 alloy is an alloy in which $Si_3N_4$ is dispersed in addition to carbide, whereby a solid soluble carbon concentration of martensite phase thereof is lowered to 0.4 wt % or less and $Cr_7C_3$-type carbide coexists therein resulting in improving heat crack resistance remarkably. Compared with the No. 6 and No. 9 alloys, such result shows that dispersing $Si_3N_4$ particles is more effective on improvement in heat crack resistance.

Figure 20B:
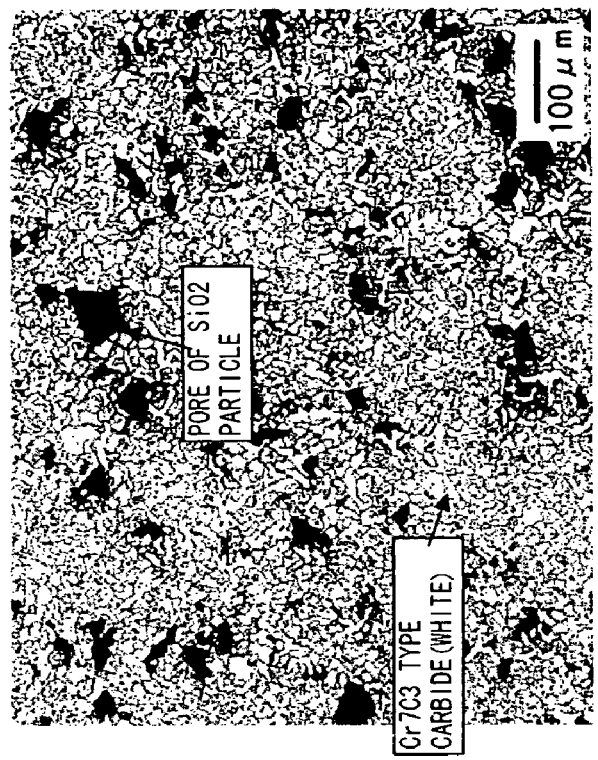
FIG. 20B is a photograph showing a sintered structure of the No. 28 alloy.
Figure 20A:
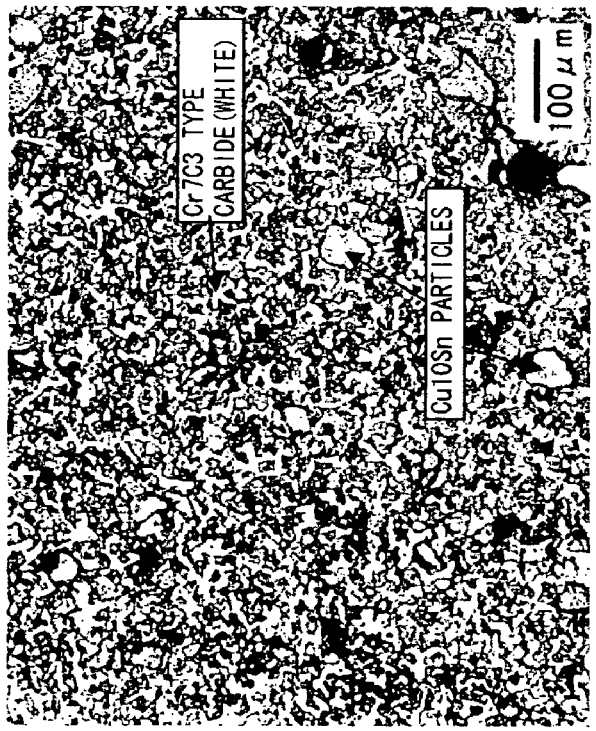
FIG. 20A is a photograph showing a sintered structure of the No. 25 alloy

As shown in FIG. 20B, No. 28 alloy is an alloy in which the No. 16 alloy to which $SiO_2$ of 2.5 wt % is added is sintered so that $SiO_2$ is reduced by intensive reduction action of carbon at sintering, resulting in producing pores at portions where the $SiO_2$ particles exist. In addition, after sintering, the No. 28 alloy is prepared to contain carbon of 2 wt % and Si of 1.77 wt %. The No. 28 alloy is improved in heat crack resistance remarkably because lubricating performance thereof is promoted by the pores produced by the reduction of $SiO_2$.

No. 29 and No. 30 alloys are alloys in which graphite and Mo metal phase are dispersed mainly as solid lubricant. The No. 29 and No. 30 alloys are improved in heat crack resistance remarkably. So, W and $CaF_2$ are expected to have the same effect as the graphite and Mo metal phase.

No. 31 to No. 36 alloys are alloys in which $M_6C$-type carbide is dispersed mainly. In these alloys, addition of P improves sintering ability and sintering-bonding ability thereof, and dispersion of phosphorus compound (FeMoP) improves heat crack resistance. Furthermore, increased amount of $M_6C$-type carbide also improves heat crack resistance.

Figures 21A, 21B, 21C:
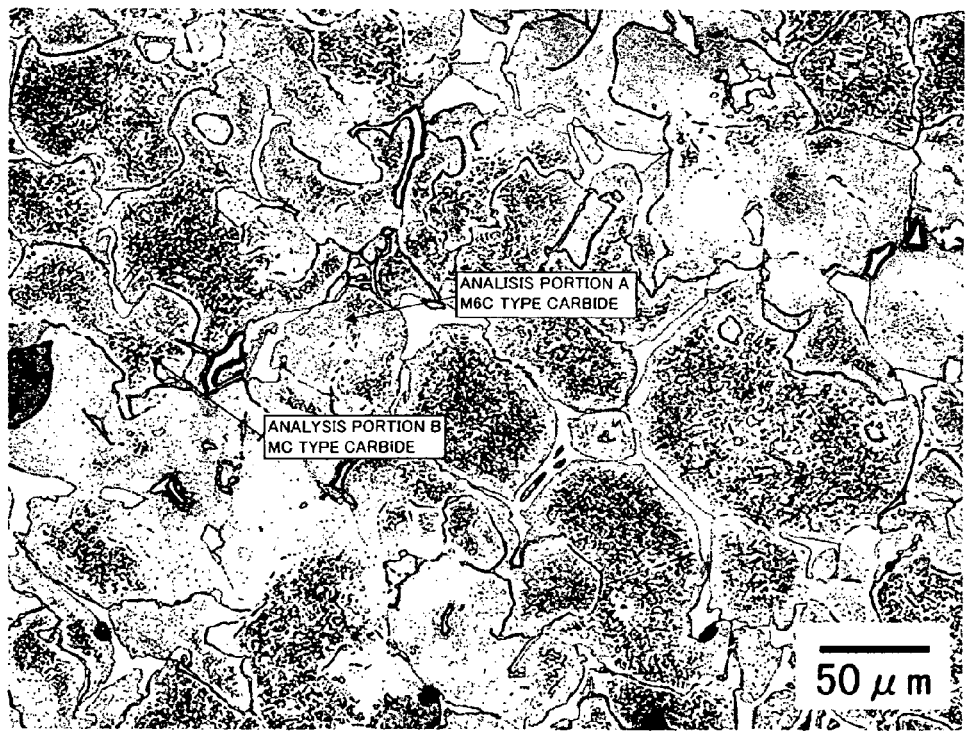
FIG. 21 is a photograph showing a sintered structure of No. 32 alloy and analysis thereof using X-ray micro analyzer.

FIG. 21 shows a photograph showing a sintered structure of No. 32 alloy and analysis thereof using X-ray micro analyzer.

The photograph shows that $M_6C$-type carbide and MC-type carbide, which are produced at sintering, are precipitated at grain boundaries. And, such carbide and phosphorus compound (FeMoP or $V_2P$) are precipitated in the particles at a process lowering a temperature down to a quenching temperature of 960° C. In addition, the X-ray micro analyzer analysis of the $M_6C$-type carbide and the MC-type carbide precipitated at the grain boundaries (shown in FIG. 21) shows a feature that Si and P are remarkably discharged from MC-type carbide and $Cr_7C_3$-type carbide; concentrated in $M_6C$-type carbide remarkably (distribution coefficients of Si and P are follows: $KSi_6$, $KP_6$=2, which are obtained by another analysis). In a conventional high-speed steel in which $M_6C$-type carbide is dispersed, a content of Si contained therein is limited to 0.4 wt % or less. Because, a large addition amount of Si moves a melting point of $M_6C$-type carbide to lower and therefore lowers a quenching temperature, resulting in that a sufficient amount of solid soluble for demonstrating tempering secondary hardening is hardly obtained. In addition, a large addition amount of Si promotes stable precipitating of $M_6C$-type carbide by tempering and therefore decreases effect of Mo and W for improving tempering-softening resistance. On the contrary, in a ferrous sintered sliding material in which $M_6C$-type carbide is dispersed mainly, according to the present invention, addition of Si and P increases sintering ability and sintering-bonding ability thereof. So, the upper limit of addition amount of Si is preferably limited to 1.5 wt % for obtaining necessary tempering-softening resistance, and the upper limit of addition amount of P is preferably limited to 0.35 wt % or less for improving sintering ability and sintering-bonding ability. And, P and B, which does not form a large amount of solid solution with martensite phase, and Cu component promoting age-hardening of Ni—Mo in martensite phase are preferably added.

No. 37 to No. 39 alloys are alloys in which $Cr_7C_3$-type carbide coexists with $M_6C$-type carbide. The No. 38 alloy, in which an addition amount of carbon is decreased and therefore an amount of $Cr_7C_3$-type carbide is decreased and also a solid soluble carbon concentration of martensite phase is lowered, and the No. 39 alloy, in which Ni is added so as to increase an amount of retained austenite, are improved in heat crack resistance.

Example 3

Floating Seal Property of Ferrous Sintered Sliding Material

Figure 22A:
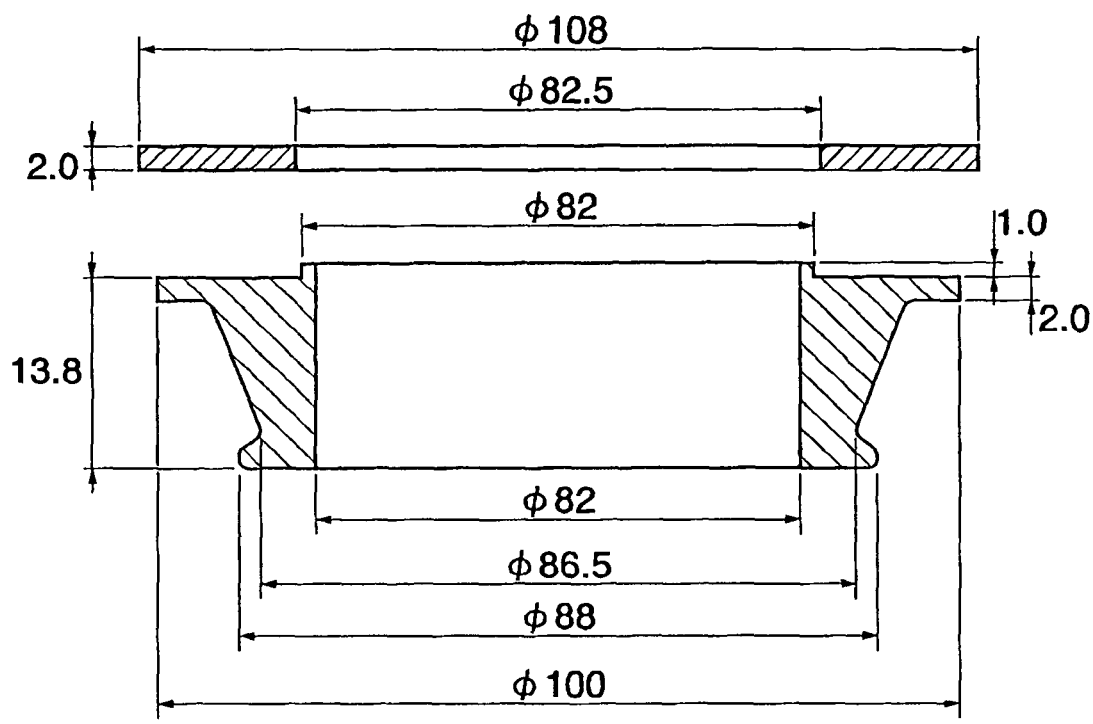
FIGS. 22A and 22B show a structure of a specimen for a sintering-bonding test.
Figure 22B:
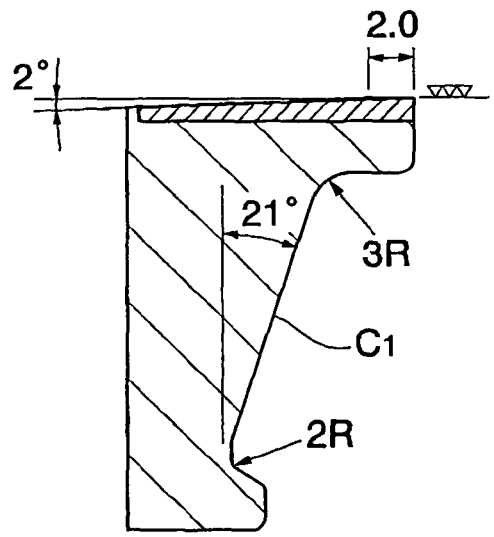
Figure 23:
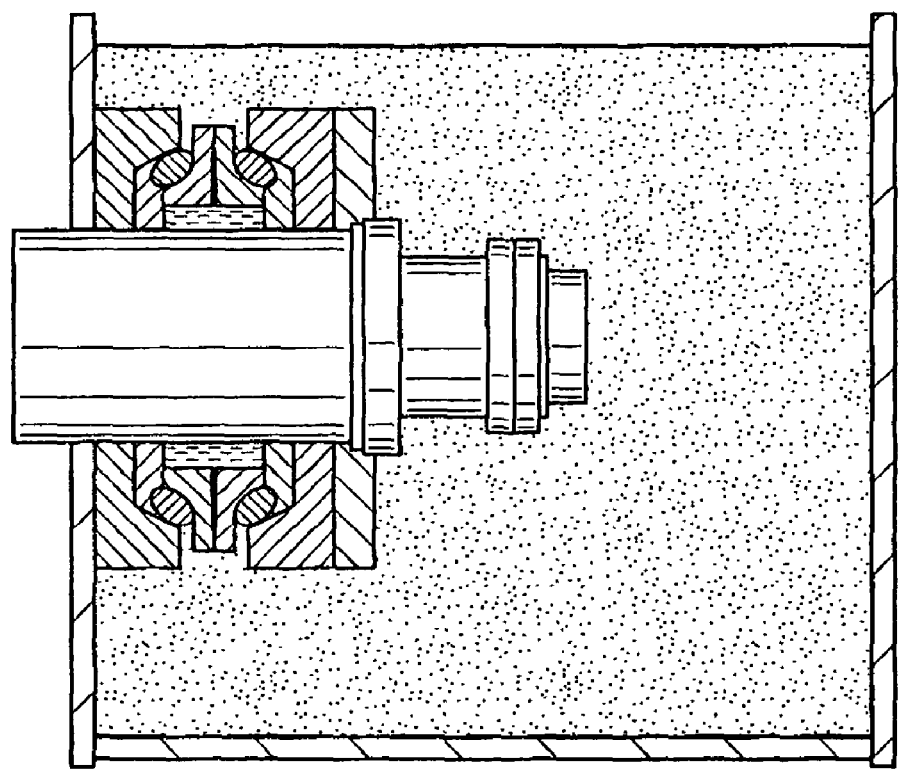
FIG. 23 schematically shows a floating seal tester.

FIGS. 22A and 22B show a structure of a specimen for a sintering-bonding test and FIG. 23 schematically shows a floating seal tester.

In this example, each of mixed powder having compositions, shown in Table 5 and Table 6 in Example 2, was formed into a ring-shaped compact, shown in FIG. 22A, at a forming pressure of 1 ton/cm², and each compact was placed on a base material machined from SS steel and then sintering-bonded thereto at 1100 to 1280° C. for two hours using a vacuum furnace so that a relative density of a sintered layer was 93% or more. After cooled in the furnace atmosphere down to 960° C. and maintained for 30 minutes, each compact was quenched in $N_2$ gas atmosphere at 400 torr. Then, each compact was tempered at 200° C. for two hours so as to prepare a specimen for sintering-bonding test.

The specimen for a sintering-bonding test was ground into a shape, shown in FIG. 22B showing a partially enlarged sectional view thereof, and then finished by lapping a sealing surface 2 mm width on an upper surface thereof. The specimens such finished were evaluated in heat crack resistance and seizing resistance in air by using a floating seal tester (a sliding tester) shown in FIG. 23. The floating seal test was performed such that each of the prepared specimens was used as a pair of seal rings with the seal surfaces thereof being contacted each other and rotated with varying a load applied to the seal surface and a rotating speed. Then, the same test was performed in muddy water containing $SiO_2$ of about 50 wt % for examination in abrasion resistance.

The heat crack resistance and the seizing resistance were evaluated by using a rotating speed at which sliding resistance rapidly increased under a condition in which a seal load (a line pressure=a load/a length in a seal surface) was kept at 2 kgf/cm. The abrasion resistance was evaluated by using a moving distance (mm) of a seal surface contact portion after the seal tester was continuously operated at a line pressure of 2 kgf/cm and a rotating speed of 1 m/sec for 500 hours. As for an alloy showing abnormal abrasion performance, a line pressure was decreased to 1 kgf/cm and then abrasion resistance was evaluated. The results are represented by "PV value" showing heat crack resistance in FIG. 24 and a right column of the Table 5.

For comparative specimens for abrasion resistance and seizing resistance, cast iron sealing materials (Fe15Cr3Mo, FC9Cr6Mo) each having a composition of Fe-3.4C-1.5Si-15Cr-2.5Mo-1.5Ni and Fe-3.5C-1.5Si-9Cr-6Mo-4.5W-2V-2Ni-3Co, and SKD11 and SKH9, shown in Table 6, were prepared. The results are shown in FIG. 24 and Table 6.

The PV value of each element shown in Table 5 and Table 6 has the same tendency as critical load against heat crack resistance evaluated in Example 2.

Figure 24:
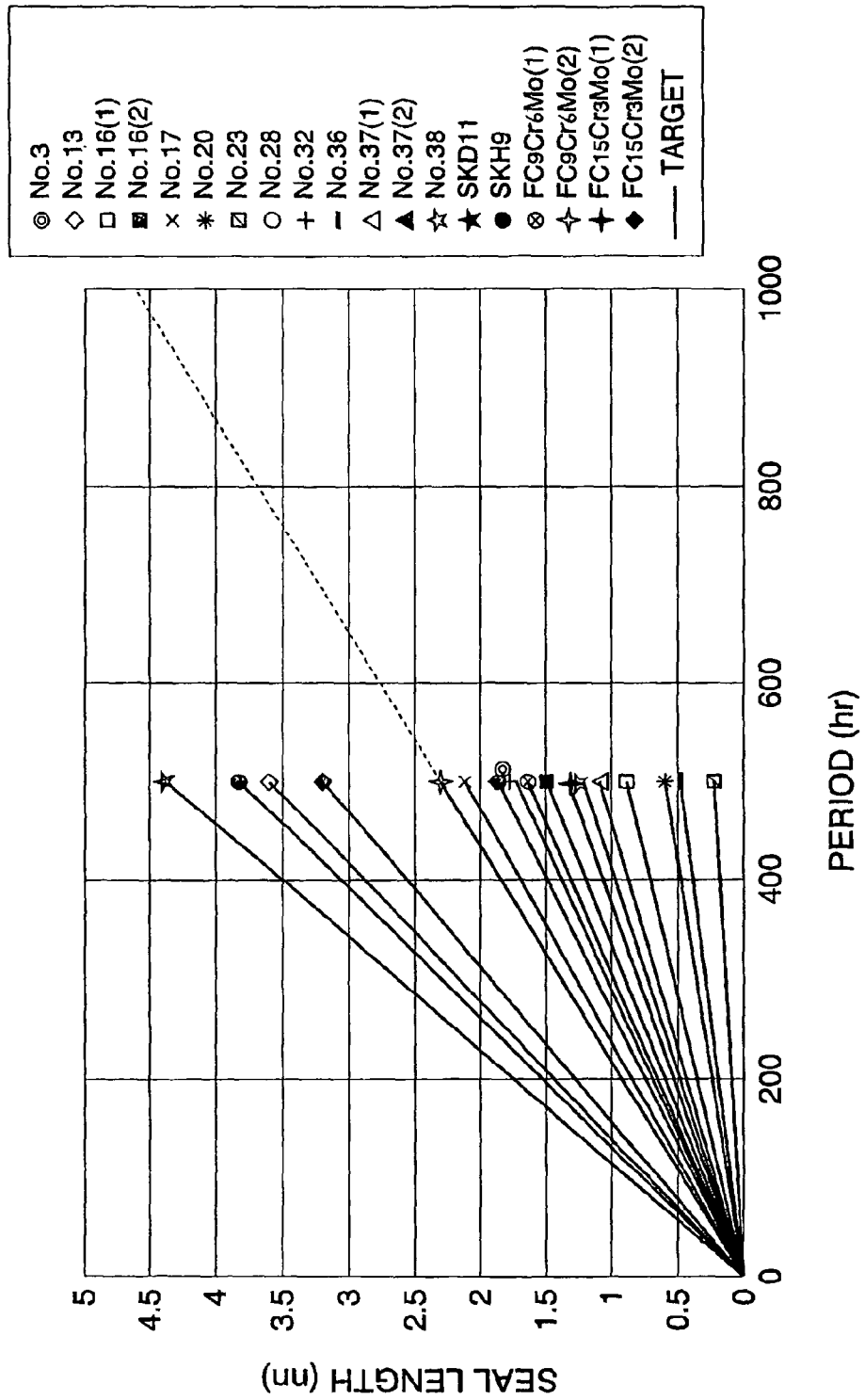
FIG. 24 shows a test result for abrasion resistance of a floating seal.

A broken line in FIG. 24 shows a standard abrasion resistance required for a floating seal of a construction machine. For example, for a floating seal of a construction machine, a sintered alloy such as No. 3 and No. 17 alloy, in which $Cr_7C_3$-type carbide and MC-type carbide are dispersed in a content of about 15% by volume and a solid soluble carbon concentration in martensite phase is adjusted to 0.45 wt %, is preferred in view of abrasion resistance. And, since abrasion resistance is improved with increasing an amount of carbide, it is preferable to contain one or more carbide selected from the group consisting of $Cr_7C_3$-type carbide $M_6C$-type carbide and MC-type carbide in a content of 20% or more by volume.

The No. 13, No. 16 and No. 37 alloys and the high-carbon and high-Cr, Mo cast iron, which have a trouble in heat crack resistance as shown in Example 2, show remarkable abnormal abrasion accompanied with fine heat crack from an evaluation in abrasion resistance at a line load of 2 kgf/cm; a sintered alloy in which a solid soluble carbon concentration in martensite is limited to 0.5 wt % or less does not show heat crack after test.

Example 4

Deflecting Strength and Toughness of Ferrous Sintered Sliding Material

Figure 25:
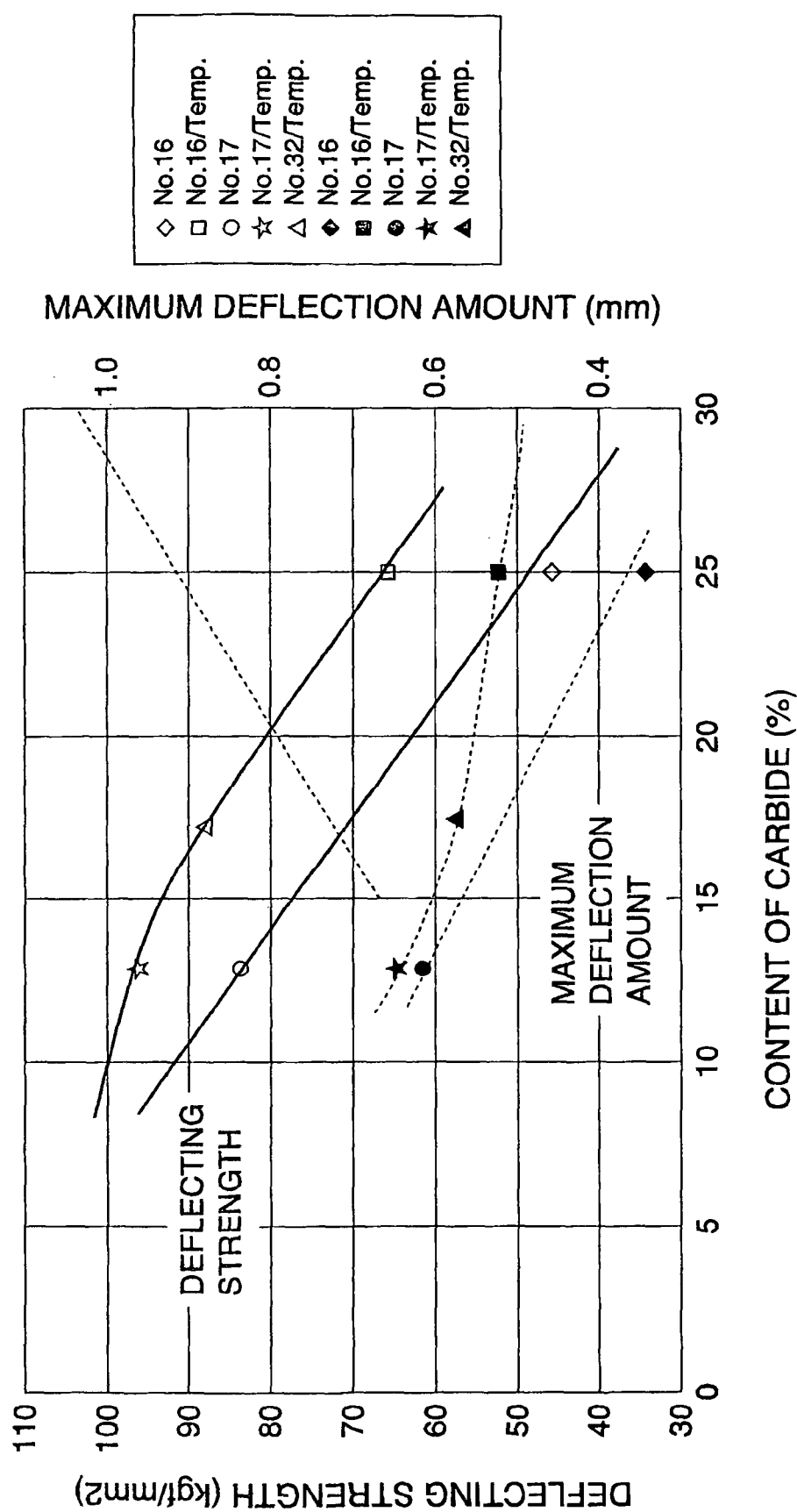
FIG. 25 shows a test result for deflection strength and toughness of a ferrous sintered sliding material.

In this example, No. 16, No. 17 and No. 32 ferrous sintered sliding materials, shown in Table 5 and Table 6 in Example 2, were examined in deflecting strength and toughness. The results are shown in FIG. 25 with respect to a content (% by volume) of carbide. In FIG. 25, a material marked with "/Temp" next to "No." (for example, No. 16/Temp.) shows that the material is tempered.

Tempering at 200° C. after quenching from 960° C. improves deflecting strength of the ferrous sintered sliding materials and increases a maximum deflection amount thereof thereby to improve toughness. Especially, such tendency is significantly demonstrated as a sintered alloy has a higher solid soluble carbon concentration in martensite and contains a larger amount of carbide, such as No. 16.

In a sintered sliding material tempered at 200° C., deflection strength decreases with increasing an amount of carbide. So, since a thrust bearing applied with a large offset load is often applied with bending stress of about 60 kgf/mm$^2$, it is preferable to suppress a content of carbide to 25% or less by volume, more preferably 20% or less by volume. As shown in FIG. 11, since a floating seal is equipped for a sealing mechanism via rubber O-rings, the bending stress does not exceed 10 kgf/mm$^2$. So, a content of carbide dispersed in a ferrous sintered sliding material can increase to about 50% by volume, however, it is preferably 40% or less by volume.

As described below, comparison of distribution coefficients $KM_7$ of each alloy element M in an equilibrium state of austenite with $Cr_7C_3$-type carbide (the distribution coefficient $KM_7$=a concentration of an alloy element M in the $Cr_7C_3$-type carbide/a concentration of the alloy element M in the austenite) shows that the elements concentrate the $Cr_7C_3$-type carbide more densely in the order of V>Cr>Mo>W. So, V makes the $Cr_7C_3$-type carbide into fine grains ($KV_7$:17, $KCr_7$:6.5, $KMo_7$:2.5 and $KM7$:2.9), and Si, Al, Ni and Co are discharged from $Cr_7C_3$-type carbide remarkably and concentrates in austenite.

And, comparison of distribution coefficients $KM_6$ of each alloy element M in an equilibrium state of austenite with $M_6C$-type carbide shows that the elements concentrate in $M_6C$-type more densely in the order of W>Mo>V>Si, ($KW_6$: 23, $KMo_6$:20, $KV_6$:5.5 and $KSi_6$:2.4). And, Cr is discharged from $M_6$-type carbide slightly and concentrates in austenite, and Ni and Co are discharged from $M_6C$-type carbide.

As described later, at an equilibrium state of austenite with $Cr_7C_3$-type carbide in a ferrous sintered sliding material, V concentrates in $Cr_7C_3$-type carbide to have a concentration 17 times a concentration of V in austenite. In order for austenite to contain V in an amount of 0.5 wt % or more so as to form MC-type carbide while the austenite coexisting with $Cr_7C_3$-type carbide in a content of 10, 20, 30 and 40% volume, V is necessarily added in an amount of 1.1, 1.7, 2.3 and 3.9 wt % or more, respectively, to the ferrous sintered sliding material. In a ferrous sintered sliding material in which $Cr_7C_3$-type carbide is mainly dispersed, it is not preferred economically that V is added thereto so as to precipitate MC-type carbide for the purpose of improvement in abrasion resistance. Instead, V is preferably added in a small amount as 0.5 to 4 wt % in order to prevent $Cr_7C_3$-type carbide from coarsening at sintering.

However, when MC-type carbide, in addition to $M_6C$-type carbide, is dispersed in a ferrous sintered sliding material, V does not significantly concentrate in the $M_6C$-type carbide. So, in order for austenite to contain V in an amount of 0.5 wt % so as to form MC-type carbide while the austenite coexisting with $M_6C$-type carbide in a content of 10, 20, 30 and 40% volume, V is necessarily added in an amount of 0.74, 0.97, 1.21 and 1.44 wt % or more, respectively, to the ferrous sintered sliding material. In a ferrous sintered sliding material in which $M_6C$-type carbide is mainly dispersed, it is understood that V is added thereto so as to precipitate MC-type carbide resulting in improving abrasion resistance effectively. This fact is corresponded to the fact that in a high speed steel SKH10 (SEAT15) containing $M_6C$-type carbide and MC-type carbide in a total content of about 13% by volume, V is added so as to increase a content of the MC-type carbide to about 10% by volume for improving abrasion resistance. In the present invention, the upper limit of addition amount of V is set to 10% by volume for disperse MC-type carbide in the maximum content of 20% by volume. When MC-type carbide is dispersed in a large content, it is necessary to add an alloy element, such as Ti, Nb and Zr, in addition to V. However, adding such alloy elements in a large amount is not preferred for a ferrous sintered sliding material from an economical viewpoint. Accordingly, in view of MC-type carbide dispersed in a high speed steel other than SKD10, MC-type carbide is preferably contained in a content of 5% or less by volume.

When alloy elements, such as Ti, Nb and Zr, are added to the ferrous sintered sliding material so as to disperse MC-type carbide, carbon is necessarily added to the ferrous sintered sliding material in a suitable amount containing a stoichiometric amount of carbon used for MC-type carbide.

What is claimed is:

1. A sintered sliding member comprising a back metal and a ferrous sintered sliding body, the ferrous sintered sliding body being connected to the back metal,
   wherein said ferrous sintered sliding body comprises martensite phase having a solid soluble carbon concentration of 0.15 to 0.5 wt % and contains carbide in a content of 5 to 50% by volume,
   wherein said ferrous sintered sliding body includes a sliding surface,
   wherein said ferrous sintered sliding body is formed with at least one of recesses and closed pores at the sliding surface in an area ratio of 1 to 10%, and
   wherein a composition of said ferrous sintered sliding body contains at least one carbide selected from the group consisting of Cr7C3 carbide, M6C carbide and MC carbide, said at least one carbide being coarsened to have an average grain size of at least 40 μm, dispersed and precipitated therein in a content of at least 5% by volume by adding Cr powder, Mo powder, W powder, V powder or ferrous alloy powder contained high alloying element.

2. A sintered sliding member comprising a back metal and a ferrous sintered sliding body, the ferrous sintered sliding body being connected to the back metal,
   wherein said ferrous sintered sliding body comprises martensite phase having a solid soluble carbon concentration of 0.15 to 0.5 wt % and contains carbide in a content of 5 to 50% by volume,
   wherein said ferrous sintered sliding body includes a sliding surface,
   wherein said ferrous sintered sliding body is formed with at least one of recesses and closed pores at the sliding surface in an area ratio of 1 to 10%,
   wherein said ferrous sintered sliding body contains at least one element selected from the group consisting of Cr of at least 9 wt %, Mo of at least 3.5 wt %, Mo and W in a total amount of at least 4.5 wt %, and V of at least 3 wt % such that said martensite phase contains at least one carbide selected from the group consisting of Cr7C3 carbide, M6C carbide, and MC carbide dispersed therein,
   wherein said ferrous sintered sliding body contains at least one element selected from the group consisting of Ni of 1 to 5 wt %, Mn of 1 to 2 wt %, Co of 2 to 12 wt % and Al of 0.2 to 1.5 wt %, and
   wherein said martensite phase contains retained austenite phase dispersed therein in a content of 5 to 40% by volume.

3. A sintered sliding member comprising a back metal and a ferrous sintered sliding body, the ferrous sintered sliding body being connected to the back metal, wherein said ferrous sintered sliding body comprises martensite phase having a solid soluble carbon concentration of 0.15 to 0.5 wt %, wherein said ferrous sintered sliding body includes a sliding surface, wherein said ferrous sintered sliding body is formed with at least one of recesses and closed pores at the sliding surface in an area ratio of 1 to 10%, wherein said ferrous sintered sliding body contains at least one element selected from the group consisting of Cr of at least 9 wt %, Mo of at least 3.5 wt %, Mo and W in a total amount of at least 4.5 wt %, and V of at least 3 wt % such that said martensite phase contains at least one carbide selected from the group consisting of Cr7C3 carbide, M6C carbide, and MC carbide dispersed therein, wherein said sintered sliding member is a floating seal, wherein said ferrous sintered sliding body contains Cr7C3 carbide, M6C carbide, and MC carbide dispersed therein in a total content of 20 to 40% by volume and said back metal has a hardness of at least Hv170, and wherein said martensite phase contains retained austenite dispersed therein in a content of 5 to 40% by volume.

* * * * *